United States Patent
Duan et al.

(10) Patent No.: US 12,492,212 B2
(45) Date of Patent: Dec. 9, 2025

(54) SUBSTITUTED PYRAZOLECARBOXAMIDES AS STING ACTIVATORS

(71) Applicants: Shanghai Institute of Materia Medica, Chinese Academy of Sciences, Shanghai (CN); China Pharmaceutical University, Jiangsu (CN)

(72) Inventors: Wenhu Duan, Shanghai (CN); Meiyu Geng, Shanghai (CN); Huibin Zhang, Jiangsu (CN); Zuoquan Xie, Shanghai (CN); Jinpei Zhou, Jiangsu (CN); Yifei Yang, Jiangsu (CN); Xiyuan Wang, Shanghai (CN); Xiaojun Yang, Jiangsu (CN); Yan Zhang, Shanghai (CN); Zhaoxue Hu, Jiangsu (CN); Jian Ding, Shanghai (CN)

(73) Assignees: SHANGHAI INSTITUTE OF MATERIA MEDICA, CHINESE ACADEMY OF SCIENCES, Shanghai (CN); CHINA PHARMACEUTICAL UNIVERSITY, Jiangsu (CN)

( * ) Notice: Subject to any disclaimer, the term of this patent is extended or adjusted under 35 U.S.C. 154(b) by 898 days.

(21) Appl. No.: 17/761,252

(22) PCT Filed: Sep. 21, 2020

(86) PCT No.: PCT/CN2020/116614
§ 371 (c)(1),
(2) Date: Mar. 17, 2022

(87) PCT Pub. No.: WO2021/052501
PCT Pub. Date: Mar. 25, 2021

(65) Prior Publication Data
US 2022/0389025 A1   Dec. 8, 2022

(30) Foreign Application Priority Data
Sep. 19, 2019   (CN) .......................... 201910891002.7

(51) Int. Cl.
| | |
|---|---|
| *A61K 31/4155* | (2006.01) |
| *A61P 35/00* | (2006.01) |
| *C07D 231/14* | (2006.01) |
| *C07D 491/048* | (2006.01) |
| *C07D 519/00* | (2006.01) |

(52) U.S. Cl.
CPC .......... *C07D 491/048* (2013.01); *A61P 35/00* (2018.01); *C07D 519/00* (2013.01)

(58) Field of Classification Search
CPC .......................... A61K 31/4155; C07D 231/14
USPC ....................................... 514/406; 548/356.1
See application file for complete search history.

(56) References Cited

FOREIGN PATENT DOCUMENTS

| | | |
|---|---|---|
| CN | 109071514 A | 12/2018 |
| CN | 112521394 A | 3/2021 |
| WO | 2019069275 A1 | 4/2019 |
| WO | 2019134705 A1 | 7/2019 |
| WO | 2020028566 A1 | 2/2020 |

OTHER PUBLICATIONS

Int'l Search Report issued Dec. 21, 2020 in Int'l Application No. PCT/CN2020/116614.
Office Action issued Apr. 14, 2023 in CN Application No. 202080066382.1.
Written Opinion issued Sep. 28, 2023 in SG Application No. 11202202827P.

*Primary Examiner* — Douglas M Willis
(74) *Attorney, Agent, or Firm* — Panitch Schwarze Belisario & Nadel LLP

(57) ABSTRACT

Provided are a heterocyclic amide compound of general formula (I), a pharmaceutically acceptable salt thereof and a preparation method therefor, and the use of the compound in the preparation of a drug for treating diseases related to the activity of STING, in the preparation of an immunologic adjuvant, and in the preparation of a drug for activating STING.

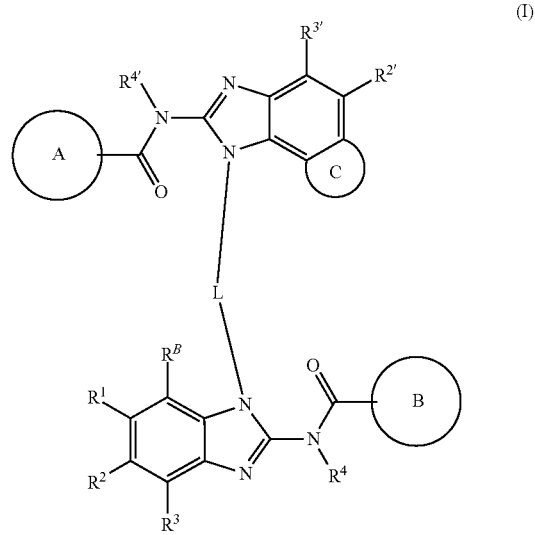

16 Claims, 1 Drawing Sheet

SUBSTITUTED PYRAZOLECARBOXAMIDES AS STING ACTIVATORS

CROSS-REFERENCE TO RELATED APPLICATIONS

This application is a Section 371 of International Application No. PCT/CN2020/116614, filed Sep. 21, 2020, which was published in the Chinese language on Mar. 25, 2021, under International Publication No. WO 2021/052501 A1, which claims priority under 35 U.S.C. § 119 (b) to Chinese Application No. 201910891002.7, filed Sep. 19, 2019, the disclosure of each of which is incorporated herein by reference in its entirety.

TECHNICAL FIELD

The invention relates to heterocyclic amide compound or pharmaceutically acceptable salt thereof, preparation method therefor and use thereof.

BACKGROUND OF THE INVENTION

In recent years, the emergence of immunotherapy has shown the potential to change the treatment of cancer. The anti-tumor T cell is released to act by blocking the immune checkpoints, which produces a significant response in untreatable tumors. One of the main areas of expanding the effectiveness of immunotherapy methods is to find methods that can immunologically transform "cold" to tumor "hot", and thereby overcoming local immunosuppressive mechanisms and increasing the effectiveness of methods such as immunoassay. These methods include the use of immunostimulatory monoclonal antibodies (e.g., anti-OX40, an agonistic monoclonal antibody against the receptor OX40 or BB1, targeting CD74) to directly stimulate T cell activity and oncolytic virus, which can selectively and specifically lyse tumor cells to establish an inflammatory microenvironment. One strategy for local immune stimulation is to activate the STING pathway, a key sensing system that allows the innate immune system to respond to infection and tumor growth and coordinate the immune response.

In the cytoplasm, cyclic GMP-AMP synthase (cGAS) binds to dsDNA from pathogen or damaged cells of the host to produce small molecule ligands, cyclic GMP-AMP (cGAMP). After cGAMP binds to the STING dimer on the endoplasmic reticulum (ER), STING is phosphorylated by SER/THR kinase—TANK-binding kinase 1 (TBK1). Phosphorylated STING recruits a transcription factor, interferon regulatory factor 3(IRF3), and promotes TBK1 to phosphorylate IRF3, resulting in the dimerization of IRF3. IRF3 dimerizes and then translocates to the nucleus, where it binds to the IFN-β promoter, leading to the production of IFN-β and other cytokines.

Since STING was discovered, it has been found to play an important role in infectious diseases, cancer and autoimmune diseases. Therefore, STING has gradually developed into a potential immunotherapy target. Direct activation of STING by bacterial CDN has been verified by X-ray crystallography (Burdette D L et al. Nature Immunolog, 2013 (14): 19-26). The new CDN signal transduction molecule cGAMP has been found to activate STING, and its interaction with STING has also been verified by X-ray crystallography (Cai X et al. Molecular Cell, 2014(54):289-296). Synthetic STING agonists with good druggability can be used as adjuvants, anti-tumor drugs or other immunotherapy preparations.

SUMMARY OF THE INVENTION

Object of the invention: The object of the present invention is to provide a heterocyclic amide compound with novel structure and a pharmaceutically acceptable salt thereof.

Another object of the present invention is to provide a pharmaceutical composition.

Another object of the present invention is to provide a method for preparing the heterocyclic amide compound and pharmaceutically acceptable salt thereof.

The last object of the present invention is to provide a use of the heterocyclic amide compound and its pharmaceutically acceptable salt.

In the first aspect of the present invention, it provides a heterocyclic amide compound, or a pharmaceutically acceptable salt thereof,

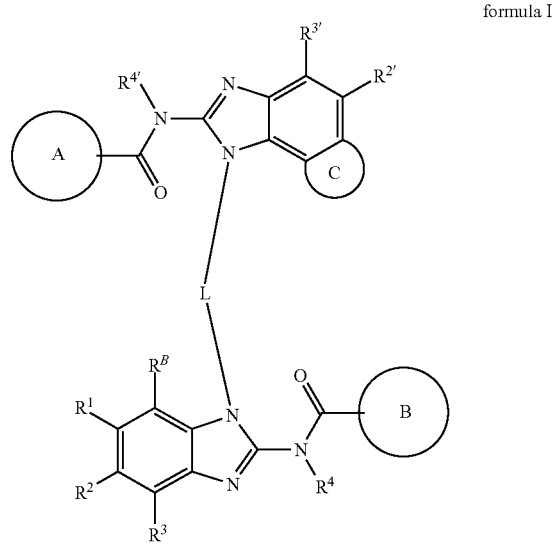

formula I wherein, ring A is selected from

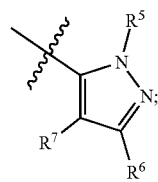

ring B is selected from

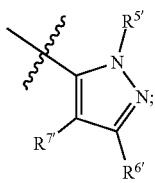

C is selected from saturated or unsaturated 4-6 membered carbocyclic or heterocyclic ring optionally substituted by 0-4 $R^i$;

$R^4$ and $R^{4'}$ are each selected from hydrogen, $C_1$-$C_6$ alkyl or halogen;

$R^5$ and $R^{5'}$ are each selected from hydrogen, $C_1$-$C_6$ alkyl, $C_3$-$C_6$ cycloalkyl, $C_3$-$C_6$ alkynyl, $C_3$-$C_6$ alkenyl, or halogenated $C_1$-$C_6$ alkyl;

$R^6$ and $R^7$ are each selected from hydrogen, $C_1$-$C_6$ alkyl, nitro, halogen, or halogenated $C_1$-$C_6$ alkyl, or $R^6$ and $R^7$ together with the atoms to which they are connected are cyclized into saturated or unsaturated 4-6 membered carbocyclic or heterocyclic ring;

$R^{6'}$ and $R^{7'}$ are each selected from hydrogen, $C_1$-$C_6$ alkyl, nitro, halogen, or halogenated $C_1$-$C_6$ alkyl, or $R^{6'}$ and $R^{7'}$ together with the atoms to which they are connected are cyclized into saturated or unsaturated 4-6 membered carbocyclic or heterocyclic ring;

$R^1$, $R^2$, $R^3$, $R^{2'}$ and $R^{3'}$ are each selected from hydrogen, —$OR^d$, —$NR^a R^c$, halogen, CN, $C(O)OR^d$, $C_1$-$C_6$ alkyl, halogenated $C_1$-$C_6$ alkyl, —$SO_2NH_2$, or —$C(O)NR^a R^b$;

$R^a$, $R^b$, $R^d$ and $R^c$ are each selected from hydrogen or $C_1$-$C_6$ alkyl;

$R^B$ is selected from hydrogen, halogen, $C_1$-$C_6$ alkyl substituted by 0-4 $R^h$, —$OR^f$, —$NR^f R^g$, —$C(O)R^f$, —$CO_2R^f$, —$C(O)NR^f R^g$, —$NR^f C(O)R^g$, or —$NR^f C(O)R$; $R^B$ and $R^1$ together with the atoms to which they are connected are cyclized into saturated or unsaturated 4-6 membered carbocyclic or heterocyclic ring;

$R^f$ and $R^g$ are each selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;

$R^h$ is selected from halogen, —$OR^j$, —$NR^j R^k$, —$C(O)R^j$, —$CO_2R^k$, —$C(O)NR^j R^k$, —$NR^j C(O)R^k$, —$NR^j C(O)R^k$, 3-6 membered cycloalkyl substituted by 0-4 $R^i$, or 3-6 membered heterocycloalkyl substituted by 0-4 $R^i$;

$R^i$ is selected from halogen, hydroxyl, amino, $C_1$-$C_6$ alkyl, $C_1$-$C_6$ alkoxy, $C_1$-$C_6$ alkylamino, halogenated $C_1$-$C_6$ alkyl, or cyano;

$R^j$ and $R^k$ are each selected from hydrogen, or $C_1$-$C_6$ alkyl;

L is selected from $C_4$-$C_6$ alkylene substituted by 0-4 $R^n$, $C_4$-$C_6$ alkenylene substituted by 0-4 $R^n$, or $C_4$-$C_6$ alkynylene substituted by 0-4 $R^n$; the carbon atoms on $C_4$-$C_6$ alkylene, $C_4$-$C_6$ alkenylene, or $C_4$-$C_6$ alkynylene are substituted by —O—, —S—, or —$NR^m$—;

$R^m$ is selected from hydrogen, or $C_1$-$C_6$ alkyl;

$R^n$ is selected from halogen, hydroxyl, amino, $C_1$-$C_6$ alkyl, $C_1$-$C_6$ alkoxy, $C_1$-$C_6$ alkylamino, or halogenated $C_1$-$C_6$ alkyl.

In another preferred embodiment, the heterocyclic amide compound of formula (I) or the pharmaceutically acceptable salt thereof has the following characteristics:

formula I

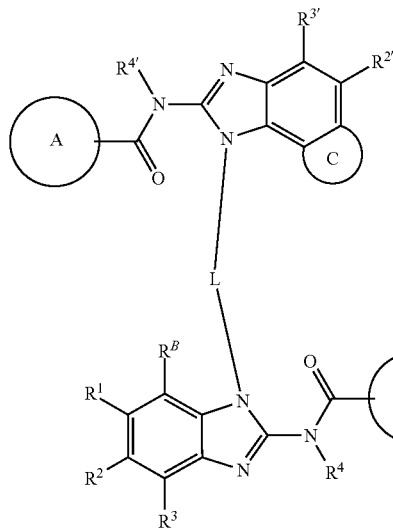

wherein,
ring A is selected from

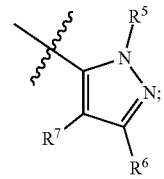

ring B is selected from

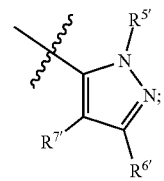

C is selected from saturated or unsaturated 4-6 membered carbocyclic or heterocyclic ring substituted by 0-4 $R^i$;

$R^4$ and $R^{4'}$ are each selected from hydrogen, $C_1$-$C_6$ alkyl or halogen;

$R^5$ and $R^{5'}$ are each independently selected from hydrogen, $C_1$-$C_6$ alkyl, $C_3$-$C_6$ cycloalkyl, $C_3$-$C_6$ alkynyl, $C_3$-$C_6$ alkenyl, halogenated $C_1$-$C_6$ alkyl, or —$(CH_2)_s$-$L_3$; wherein s is 1, 2 or 3, and $L_3$ is selected from $C_3$-$C_6$ cycloalkyl, or 3-6-membered heterocyclyl;

$R^6$ and $R^7$ are each selected from hydrogen, $C_1$-$C_6$ alkyl, nitro, halogen, or halogenated $C_1$-$C_6$ alkyl, or $R^6$ and $R^7$ together with the atoms to which they are connected are cyclized into saturated or unsaturated 4-6 membered carbocyclic or heterocyclic ring;

$R^{6'}$ and $R^{7'}$ are each selected from hydrogen, $C_1$-$C_6$ alkyl, nitro, halogen, or halogenated $C_1$-$C_6$ alkyl, or $R^{6'}$ and R⁷' together with the atoms to which they are connected are cyclized into saturated or unsaturated 4-6 membered carbocyclic or heterocyclic ring;

$R^1$, $R^2$, $R^3$, $R^{2'}$ and $R^{3'}$ are each selected from hydrogen, —OR$^d$, —NR$^a$R$^c$, halogen, CN, C(O)OR$^d$, $C_1$-$C_6$ alkyl, halogenated $C_1$-$C_6$ alkyl, —SO$_2$NH$_2$, —C(O)NR$^a$R$^b$, or -L$_1$-L$_2$-C(O)NR$^a$R$^b$;

$R^a$, $R^b$, $R^d$ and $R^c$ are each selected from hydrogen or $C_1$-$C_6$ alkyl;

$L_1$ is selected from —(CH$_2$)$_t$—, —C(O)—, —SO$_2$—, or —C(O)—; wherein t is 0, 1, 2 or 3;

$L_2$ is selected from $C_1$-$C_6$ alkyl, $C_2$-$C_6$ alkynyl, $C_2$-$C_6$ alkenyl, $C_3$-$C_6$ cycloalkyl, or 3-6 membered heterocyclyl;

$R^B$ is selected from hydrogen, halogen, $C_1$-$C_6$ alkyl substituted by 0-4 $R^h$, —OR, —NR$^f$R$^g$, —C(O)R$^f$, —CO$_2$R$^f$, or —C(O)NR$^f$R$^g$; or $R^B$ and $R^1$ together with the atoms to which they are connected are cyclized into saturated or unsaturated 4-6 membered carbocyclic or heterocyclic ring;

$R^f$ and $R^g$ are each selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;

$R^h$ is selected from halogen, —OR$^j$, —NR$^j$R$^k$, —C(O)R$^j$, —CO$_2$R$^k$, —C(O)NR$^j$R$^k$, 3-6 membered cycloalkyl substituted by 0-4 $R^i$, or 3-6 membered heterocycloalkyl substituted by 0-4 $R^i$;

$R^i$ is selected from halogen, hydroxyl, amino, $C_1$-$C_6$ alkyl, $C_1$-$C_6$ alkoxy, $C_1$-$C_6$ alkylamino, halogenated $C_1$-$C_6$ alkyl, or cyano;

$R^j$ and $R^k$ are each selected from hydrogen, or $C_1$-$C_6$ alkyl;

L is selected from $C_4$-$C_6$ alkylene substituted by 0-4 $R^n$, $C_4$-$C_6$ alkenylene substituted by 0-4 $R^n$, or $C_4$-$C_6$ alkynylene substituted by 0-4 $R^n$; the carbon atoms on $C_4$-$C_6$ alkylene, $C_4$-$C_6$ alkenylene, or $C_4$-$C_6$ alkynylene can be substituted by —O—, —S—, or —NR$^m$—;

$R^m$ is selected from hydrogen, or $C_1$-$C_6$ alkyl;

$R^n$ is selected from halogen, hydroxyl, amino, $C_1$-$C_6$ alkyl, $C_1$-$C_6$ alkoxy, $C_1$-$C_6$ alkylamino, or halogenated $C_1$-$C_6$ alkyl.

In another preferred embodiment, $R^5$ and $R^{5'}$ are each independently hydrogen, $C_1$-$C_6$ alkyl, $C_3$-$C_6$ alkenyl, halogenated $C_1$-$C_6$ alkyl, —CH$_2$—$C_3$-$C_6$ cycloalkyl, preferably, $R^5$ and $R^{5'}$ are each independently methyl, ethyl, propyl, butyl, CH$_2$F, CHF CF CH$_2$CH$_2$F, CH$_2$CHF$_2$, CH$_2$CF$_3$, CH$_2$CH$_2$CH$_2$F, CH$_2$CH$_2$CHF$_2$, CH$_2$CH$_2$CF$_3$, allyl, or

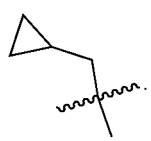 [SMILES: *CC1CC1]

In another preferred embodiment, C is saturated or unsaturated furyl or tetrahydrofuryl substituted by 0-4 $R^i$, wherein $R^i$ is selected from halogen, hydroxyl, amino, $C_1$-$C_6$ alkyl, or halogenated $C_1$-$C_6$ alkyl.

In another preferred embodiment, the heterocyclic amide compound of formula I or the pharmaceutically acceptable salt thereof, wherein ring A and ring B are the same or different, each is independently

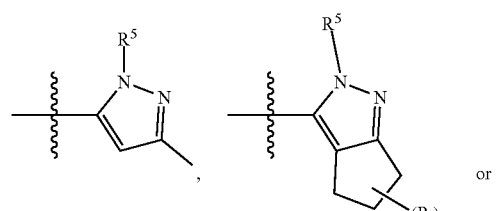

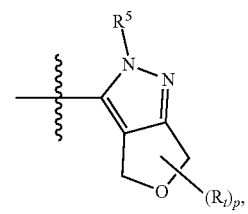

and each $R_t$ is independently selected from $C_1$-$C_6$ alkyl, halogenated $C_1$-$C_6$ alkyl, or $C_1$-$C_6$ alkoxy; p is 0, 1, 2, 3 or 4;

$R^5$ is as defined above.

In another preferred embodiment, the heterocyclic amide compound of formula I or the pharmaceutically acceptable salt thereof, wherein the ring A and the ring B are the same, and each is independently

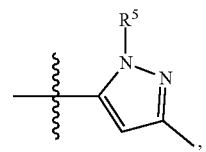

wherein $R^5$ is selected from hydrogen, $C_1$-$C_6$ alkyl, $C_3$-$C_6$ alkenyl, or halogenated $C_1$-$C_6$ alkyl.

In another referred embodiment, the ring A and the ring B are the same, and each is independently

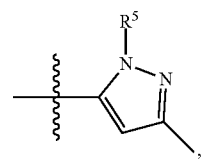

wherein $R^5$ is selected from methyl, ethyl, propyl, butyl, CH$_2$F, CHF$_2$, CF$_3$, CH$_2$CH$_2$F, CH$_2$CHF$_2$, CH$_2$CF$_3$, CH$_2$CH$_2$CH$_2$F, CH$_2$CH$_2$CHF$_2$, CH$_2$CH$_2$CF$_3$, or allyl.

In another preferred embodiment, the heterocyclic amide compound of formula I, or the pharmaceutically acceptable salt thereof, wherein the

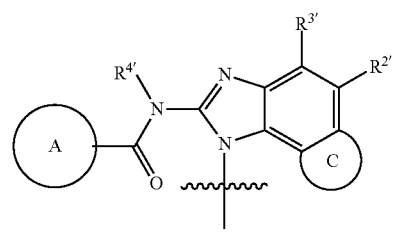

moiety is selected from

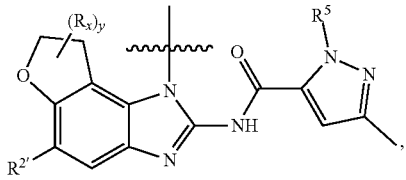

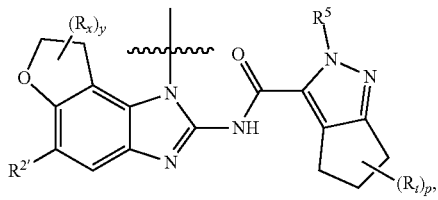

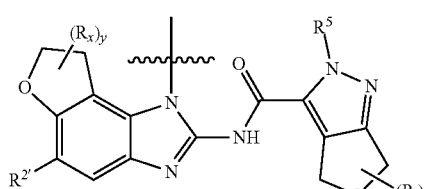

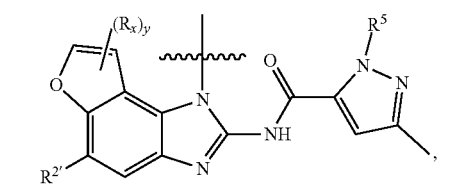

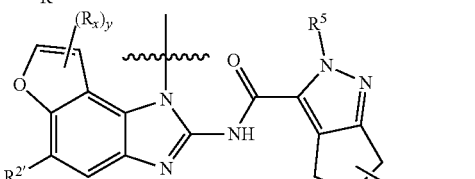

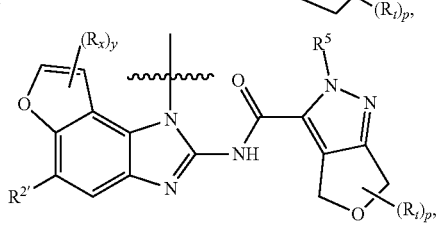

wherein y is 0, 1, 2, 3 or 4;
p is 0, 1, 2, 3 or 4;
each $R_x$ is independently selected from halogen, hydroxyl, amino, $C_1$-$C_6$ alkyl, or halogenated $C_1$-$C_6$ alkyl,
each $R_t$ is independently selected from $C_1$-$C_6$ alkyl, halogenated $C_1$-$C_6$ alkyl, or $C_1$-$C_6$ alkoxy,
$R^5$ and $R^{2'}$ are as defined above.

In another preferred embodiment, the

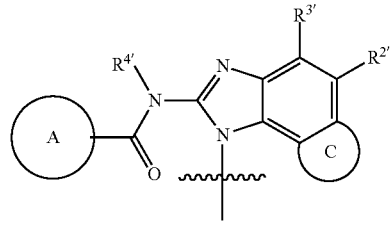

moiety is

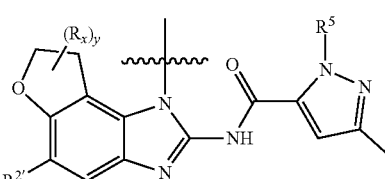

or

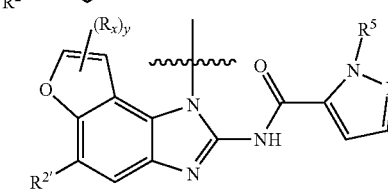

wherein,
y is 0, 1, 2, 3 or 4;
each $R_x$ is independently selected from halogen, hydroxyl, amino, $C_1$-$C_6$ alkyl, or halogenated $C_1$-$C_6$ alkyl;
each $R_t$ is independently selected from $C_1$-$C_6$ alkyl, halogenated $C_1$-$C_6$ alkyl, or $C_1$-$C_6$ alkoxy;
$R^5$ is selected from hydrogen, $C_1$-$C_6$ alkyl, $C_3$-$C_6$ alkenyl, or halogenated $C_1$-$C_6$ alkyl;
$R^{2'}$ is independently selected from hydrogen, —$SO_2NH_2$, or —$C(O)NR^aR^b$;
wherein, $R^a$ and $R^b$ are independently selected from hydrogen, or $C_1$-$C_6$ alkyl.

In another preferred embodiment, the

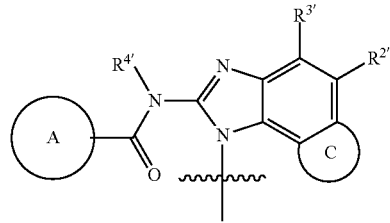

moiety is

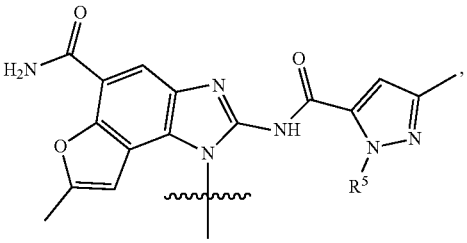

wherein $R^5$ is selected from hydrogen, $C_1$-$C_6$ alkyl, $C_3$-$C_6$ alkenyl, halogenated $C_1$-$C_6$ alkyl, preferably, methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, or allyl.

In another preferred embodiment, the heterocyclic amide compound of formula I, a pharmaceutically acceptable salt thereof, wherein the

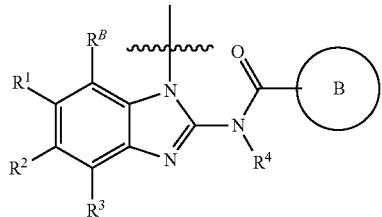

moiety is selected from

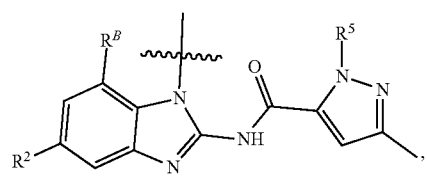

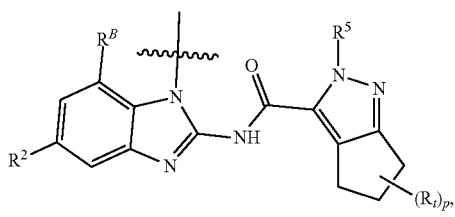

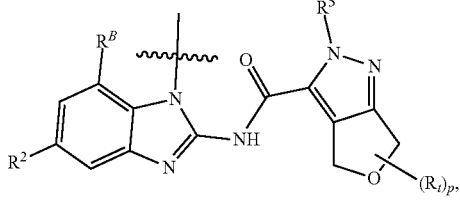

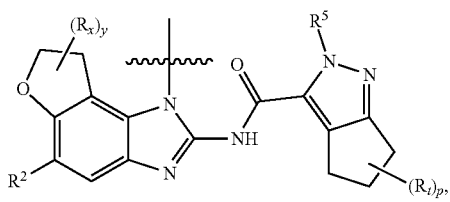

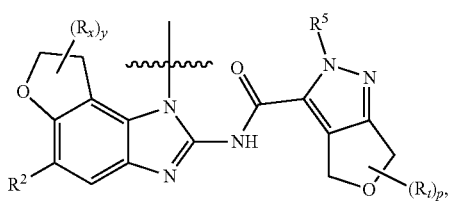

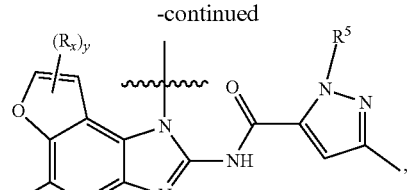

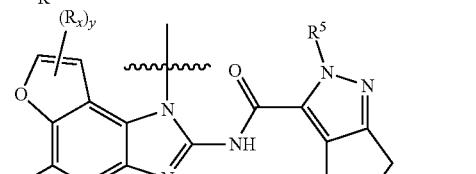

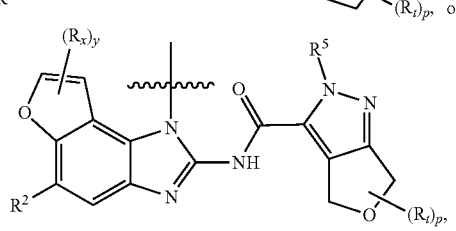

wherein,
y is 0, 1, 2, 3 or 4;
p is 0, 1, 2, 3 or 4;
each $R_x$ is independently selected from halogen, hydroxyl, amino, $C_1$-$C_6$ alkyl, or halogenated $C_1$-$C_6$ alkyl;
each $R_t$ is independently selected from $C_1$-$C_6$ alkyl, halogenated $C_1$-$C_6$ alkyl, or $C_1$-$C_6$ alkoxy;
$R^5$ is selected from hydrogen, $C_1$-$C_6$ alkyl, $C_3$-$C_6$ alkenyl, or halogenated $C_1$-$C_6$ alkyl;
$R^2$ is independently selected from hydrogen, —$SO_2NH_2$, or —$C(O)NR^aR^b$;
wherein, $R^a$ and $R^b$ are each independently selected from hydrogen, or $C_1$-$C_6$ alkyl;
$R^B$ is selected from hydrogen and —$OR^f$;
$R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;
$R^h$ is selected from halogen, —$OR^j$, —$NR^jR^k$, —$C(O)R^j$, —$CO_2R^k$, —$C(O)NR^jR^k$, —$NR^jC(O)R^k$, 3-6 membered cycloalkyl substituted by 0-4 $R^i$, or 3-6 membered heterocycloalkyl substituted by 0-4 $R^i$;
$R^i$ is selected from halogen, hydroxyl, amino, or $C_1$-$C_6$ alkyl;
$R^j$ and $R^k$ are each independently selected from hydrogen, or $C_1$-$C_6$ alkyl.

In another referred embodiment, the

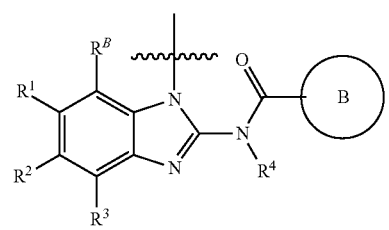

moiety is

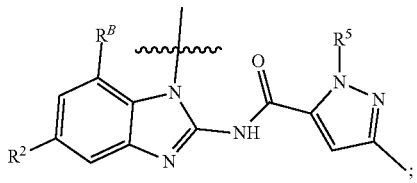

wherein $R^5$ is selected from hydrogen, $C_1$-$C_6$ alkyl, $C_3$-$C_6$ alkenyl, or halogenated $C_1$-$C_6$ alkyl;
  $R^2$ is independently selected from hydrogen, —$SO_2NH_2$, or —$C(O)NR^aR^b$;
  wherein $R^a$ and $R^b$ are each independently selected from hydrogen, or $C_1$-$C_6$ alkyl;
  $R^B$ is selected from hydrogen and —$OR^f$;
  $R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;
  $R^h$ is selected from halogen, —$OR^j$, —$NR^jR^k$, —$C(O)R^j$, —$CO_2R^k$, —$C(O)NR^jR^k$, —$NR^jC(O)R^k$, 3-6 membered cycloalkyl substituted by 0-4 $R^i$, or 3-6 membered heterocycloalkyl substituted by 0-4 $R^i$;
  $R^i$ is selected from halogen, hydroxyl, amino, or $C_1$-$C_6$ alkyl;
  $R^j$ and $R^k$ are each independently selected from hydrogen, or $C_1$-$C_6$ alkyl.

In another preferred embodiment, the

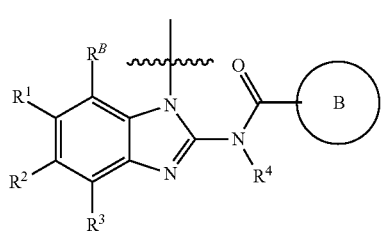

moiety is

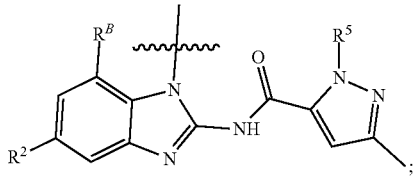

wherein $R^2$ is independently —$C(O)NH_2$;
  $R^5$ is selected from hydrogen, $C_1$-$C_6$ alkyl, $C_3$-$C_6$ alkenyl, halogenated $C_1$-$C_6$ alkyl, preferably methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, or allyl;
  $R^B$ is selected from hydrogen or —$OR^f$;
  $R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$; $R^h$ is selected from halogen, —$OR^j$, —$NR^jR^k$, —$C(O)R^j$, —$CO_2R^k$, —$C(O)NR^jR^k$, —$NR^jC(O)R^k$, 3-6 membered cycloalkyl substituted by 0-4 $R^i$, or 3-6 membered heterocycloalkyl substituted by 0-4 $R^i$;
  $R^i$ is selected from halogen, hydroxyl, amino, or $C_1$-$C_6$alkyl;
  $R^j$ and $R^k$ are each independently selected from hydrogen, or $C_1$-$C_6$ alkyl.

In another preferred embodiment, the

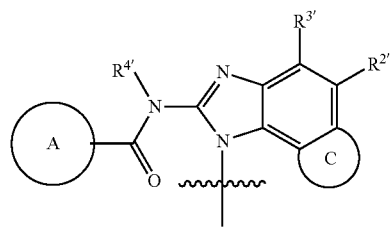

moiety and

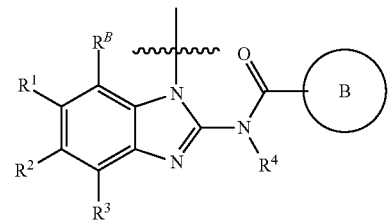

moiety are the same or different.

In another preferred embodiment, the

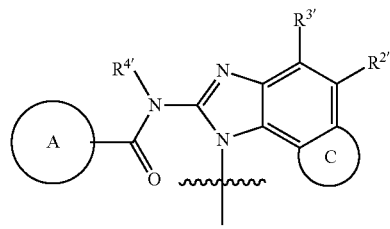

moiety and the

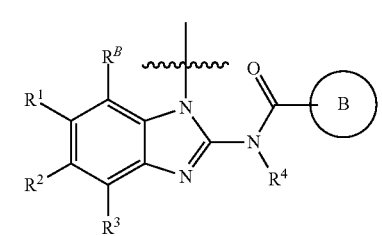

moiety are the same, and each is independently

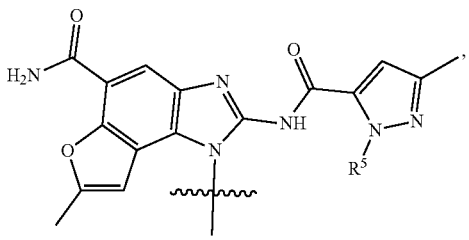

wherein $R^5$ is selected from hydrogen, $C_1$-$C_6$ alkyl, $C_3$-$C_6$ alkenyl, or halogenated $C_1$-$C_6$ alkyl, preferably, methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, or allyl.

In another preferred embodiment, L is selected from $C_4$-$C_6$ alkenylene substituted by 0-4 $R^n$, or $C_4$-$C_6$ alkylene substituted by 0-4 $R^n$, wherein $R^n$ is selected from halogen, hydroxyl, amino, $C_1$-$C_6$ alkyl, $C_1$-$C_6$ alkoxy, $C_1$-$C_6$ alkylamino, or halogenated $C_1$-$C_6$ alkyl.

In another preferred embodiment, the heterocyclic amide compound of formula (I), or the pharmaceutically acceptable salt thereof, wherein $R^B$ is selected from hydrogen, or —$OR^f$;
  $R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;
  $R^h$ is selected from halogen, —$OR^j$, —$NR^jR^k$, —$C(O)R^j$, —$CO_2R^k$, —$C(O)NR^jR^k$, —$NR^jC(O)R^k$, 3-6 membered cycloalkyl substituted by 0-4 $R^i$, or 3-6 membered heterocycloalkyl substituted by 0-4 $R^i$;
  $R^i$ is selected from halogen, hydroxyl, amino, or $C_1$-$C_6$alkyl;
  $R^j$ and $R^k$ are each independently selected from hydrogen, or $C_1$-$C_6$ alkyl.

In another preferred embodiment, the heterocyclic amide compound of formula I, or the pharmaceutically acceptable salt thereof, wherein $R^B$ is selected from H, methoxy,

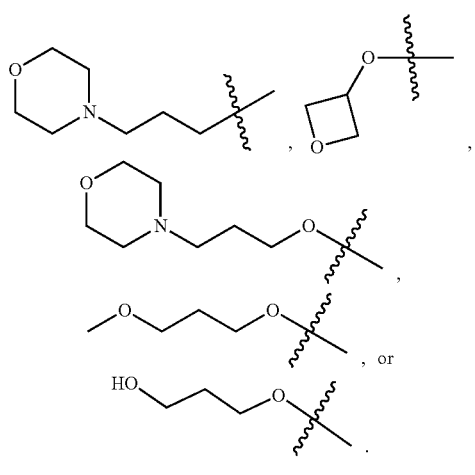

In another preferred embodiment, $R^4$ and $R^{4'}$ are each H.
In another preferred embodiment, $R^1$, $R^3$, $R^{1'}$ and $R^{3'}$ are each hydrogen.
In another preferred embodiment, $R^4$ and $R^{4'}$ are each hydrogen;
  $R^5$ and $R^{5'}$ are each selected from hydrogen, $C_1$-$C_6$ alkyl, $C_3$-$C_6$ cycloalkyl, $C_3$-$C_6$ alkynyl, $C_3$-$C_6$ alkenyl, or halogenated $C_1$-$C_6$ alkyl;
  $R^6$ and $R^7$ are each selected from hydrogen or $C_1$-$C_6$ alkyl, or $R^6$ and $R^7$ together with the atoms to which they are connected are cyclized into saturated or unsaturated 4-6 membered carbocyclic or heterocyclic ring;
  $R^{6'}$ and $R^{7'}$ are each selected from hydrogen, or $C_1$-$C_6$ alkyl, or $R^{6'}$ and $R^{7'}$ together with the atoms to which they are connected are cyclized into saturated or unsaturated 4-6 membered carbocyclic or heterocyclic ring;
  $R^1$, $R^3$ and $R^{3'}$ are each selected from hydrogen, $C_1$-$C_6$ alkyl, or —$OR^d$;
  $R^2$ and $R^{2'}$ are each selected from hydrogen, —$SO_2NH_2$, or —$C(O)NR^aR^b$;
  $R^a$ and $R^b$ are each selected from hydrogen, or $C_1$-$C_6$ alkyl;
  $R^d$ is selected from hydrogen, $C_1$-$C_6$ alkyl, $C_3$-$C_6$ cycloalkyl, $C_3$-$C_6$ alkynyl, $C_3$-$C_6$ alkenyl, or halogenated $C_1$-$C_6$ alkyl;
  $R^B$ is selected from hydrogen, $C_1$-$C_6$ alkyl substituted by 0-4 $R^h$, or —$OR^f$;
  $R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;
  $R^h$ is selected from halogen, —$OR^j$, —$NR^jR^k$, —$C(O)R^j$, —$CO_2R^k$, —$C(O)NR^jR^k$, —$NR^jC(O)R^k$, —$NR^jC(O)R^k$, 3-6 membered cycloalkyl substituted by 0-4 $R^i$, or 3-6 membered heterocycloalkyl substituted by 0-4 $R^i$;
  $R^i$ is selected from halogen, hydroxyl, amino, or $C_1$-$C_6$alkyl;
  $R^j$ and $R^k$ are each selected from hydrogen, or $C_1$-$C_6$ alkyl;
  L is selected from $C_4$-$C_6$ alkenylene or $C_4$-$C_6$ alkylene.

In another preferred embodiment, $R^6$ and $R^7$ are each independently selected from hydrogen, or $C_1$-$C_6$ alkyl;
  $R^{6'}$ and $R^{7'}$ are each independently selected from hydrogen, or $C_1$-$C_6$ alkyl;
  $R^1$, $R^3$ and $R^{3'}$ are each independently selected from hydrogen, or $C_1$-$C_6$ alkyl;
  $R^2$ and $R^{2'}$ are each independently selected from hydrogen, —$SO_2NH_2$, or —$C(O)NH_2$;
  $R^B$ is selected from hydrogen or —$OR^f$;
  $R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;
  $R^h$ is selected from halogen, —$OR^j$, —$NR^jR^k$, —$C(O)R^j$, —$CO_2R^k$, —$C(O)NR^jR^k$, —$R^jC(O)R^k$, —$NR^jC(O)R^k$, 3-6 membered cycloalkyl substituted by 0-4 $R^i$, or 3-6 membered heterocycloalkyl substituted by 0-4 $R^i$;
  $R^i$ is selected from halogen, hydroxyl, amino, or $C_1$-$C_6$alkyl;
  $R^j$ and $R^k$ are each independently selected from hydrogen, or $C_1$-$C_6$ alkyl.

In another preferred embodiment, L is

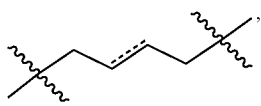

wherein === represents a single bond or a double bond.

In another preferred embodiment, A, B, C, L, $R^1$, $R^2$, $R^3$, $R^4$, $R^B$, $R^{2'}$, $R^{3'}$ and $R^{4'}$ are the specific groups corresponding to each specific compounds in the Examples.

In another preferred embodiment, the heterocyclic amide compound, or the pharmaceutically acceptable salt thereof, is any one of the following:

1

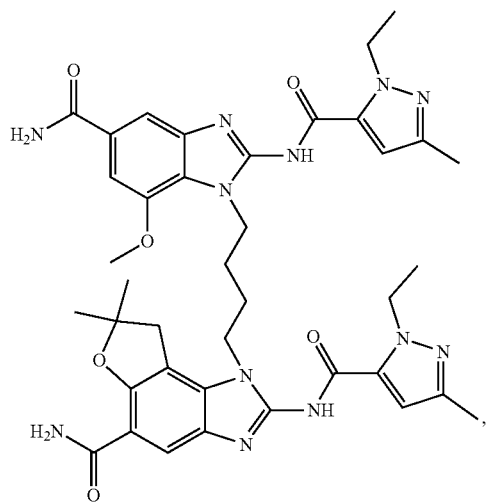

2

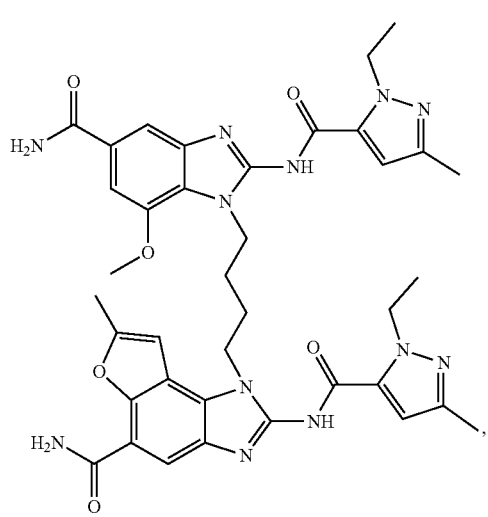

3

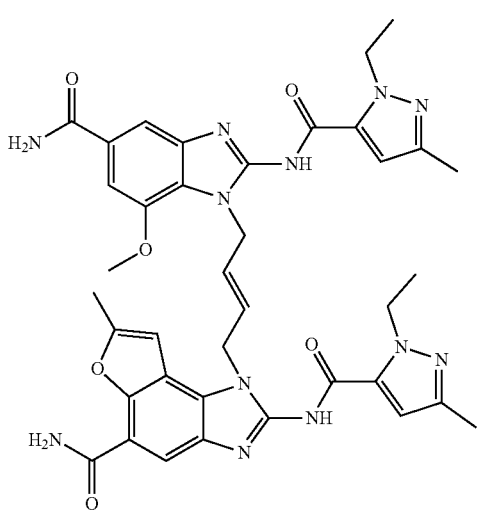

4

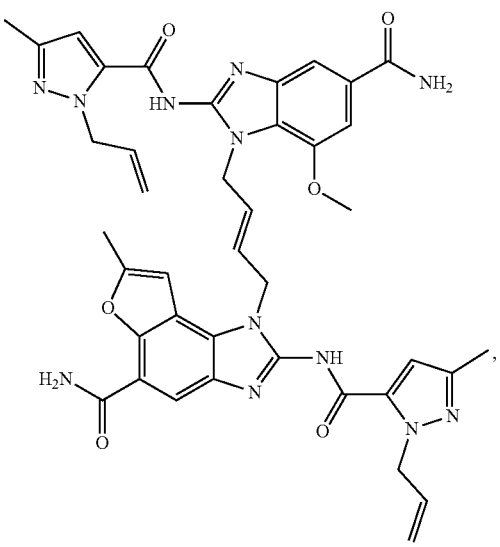

5

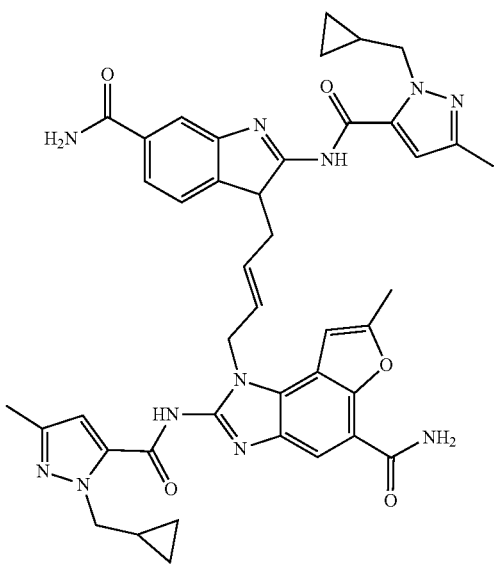

6
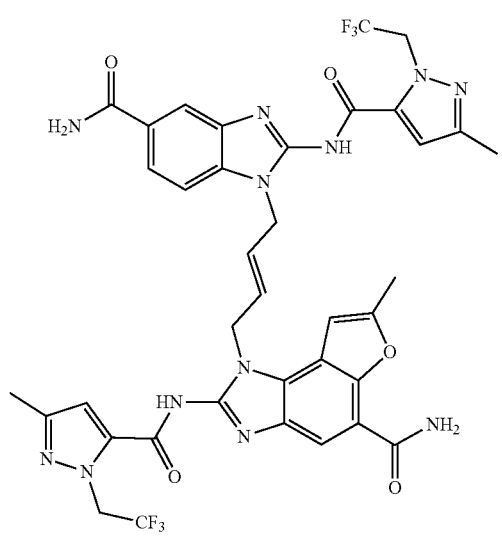
7
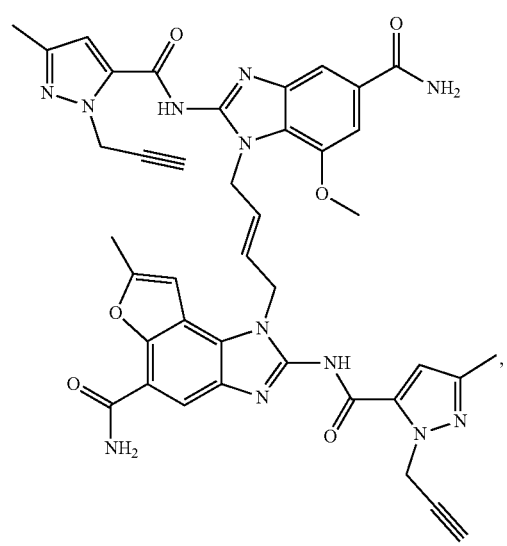
8
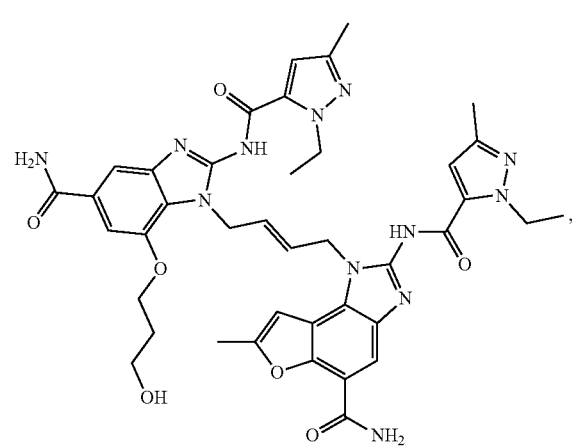
9
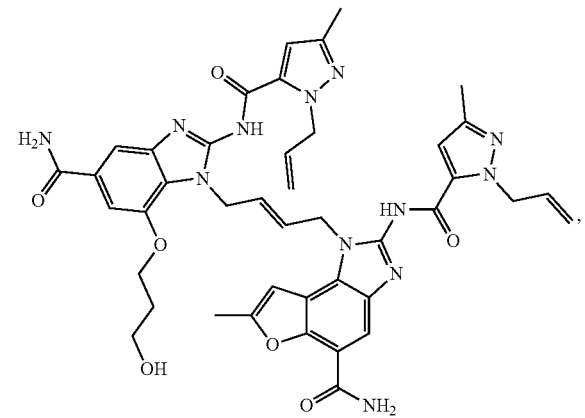
10
11
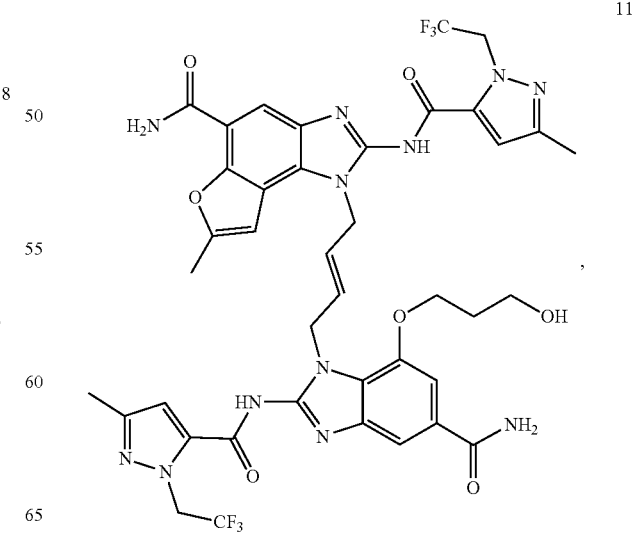

12
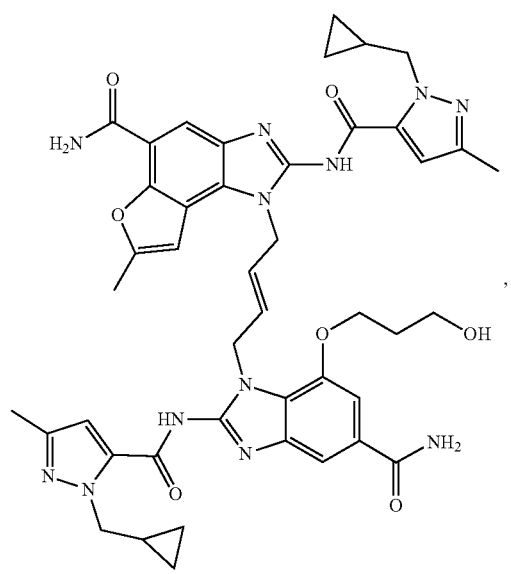
13
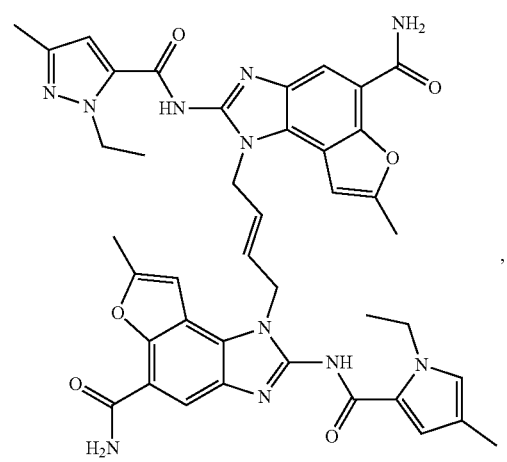
14
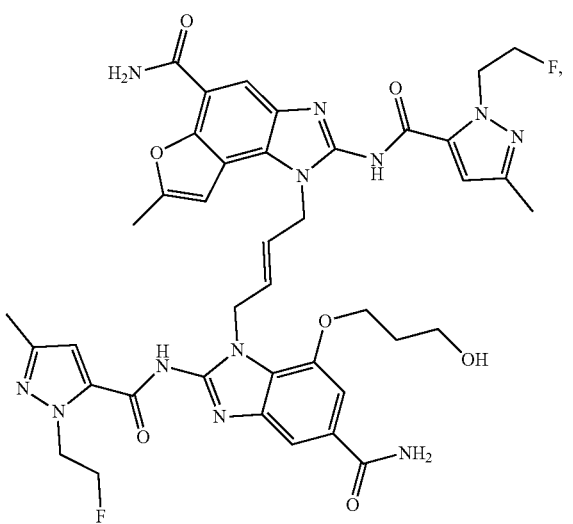
15
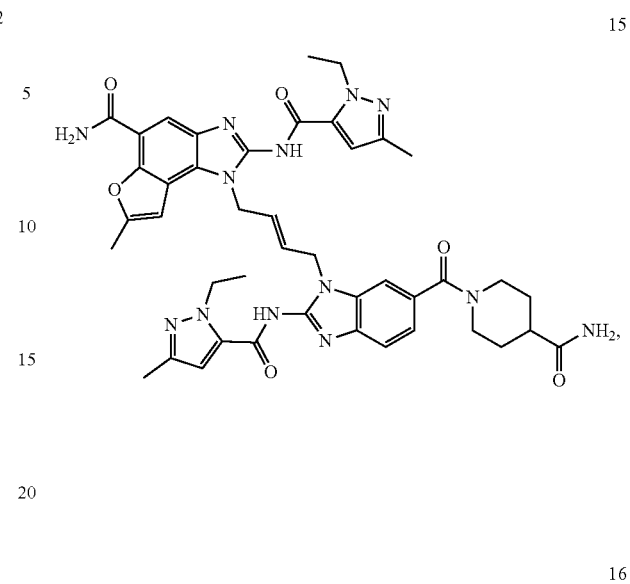
16
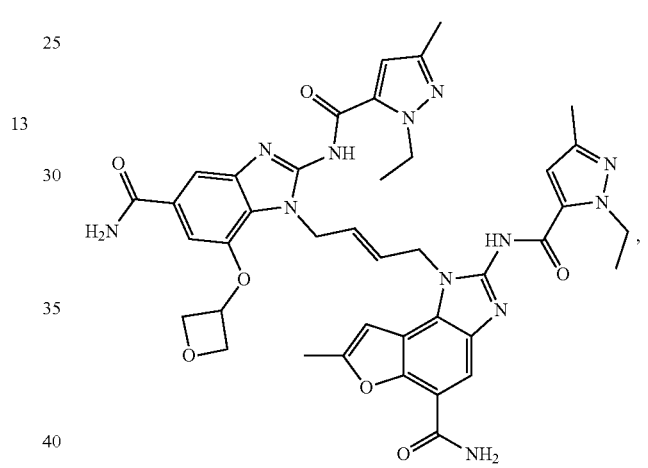
17
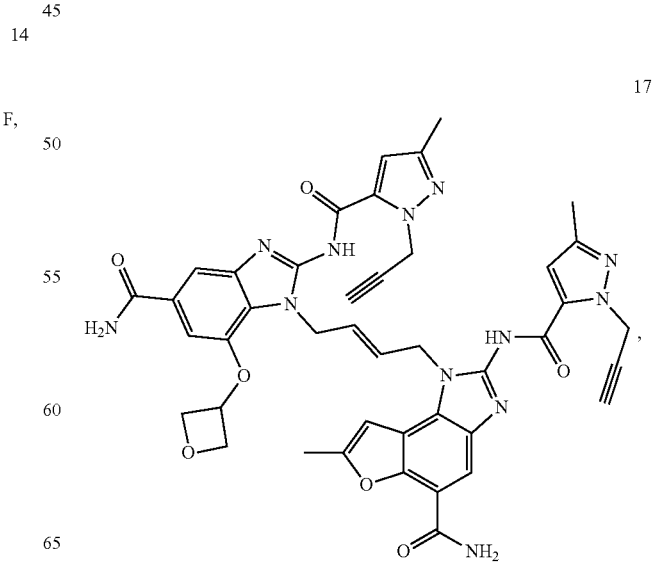

18

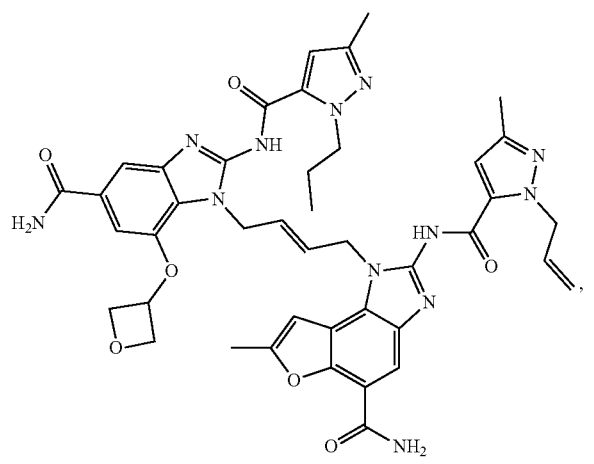

19

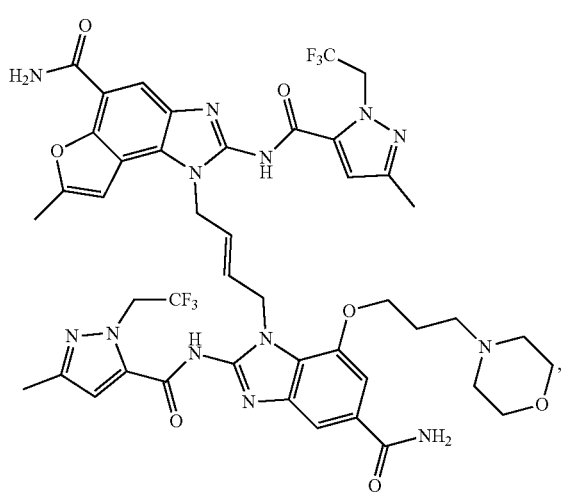

21

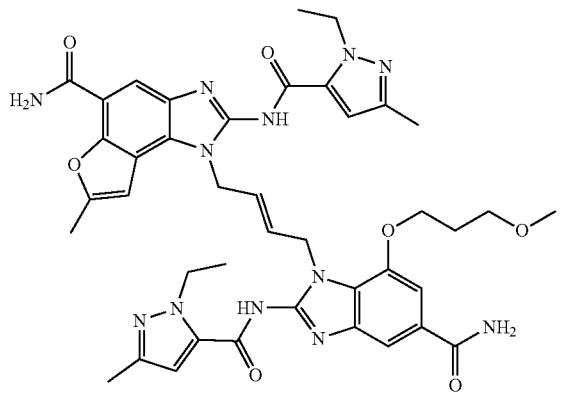

or

22

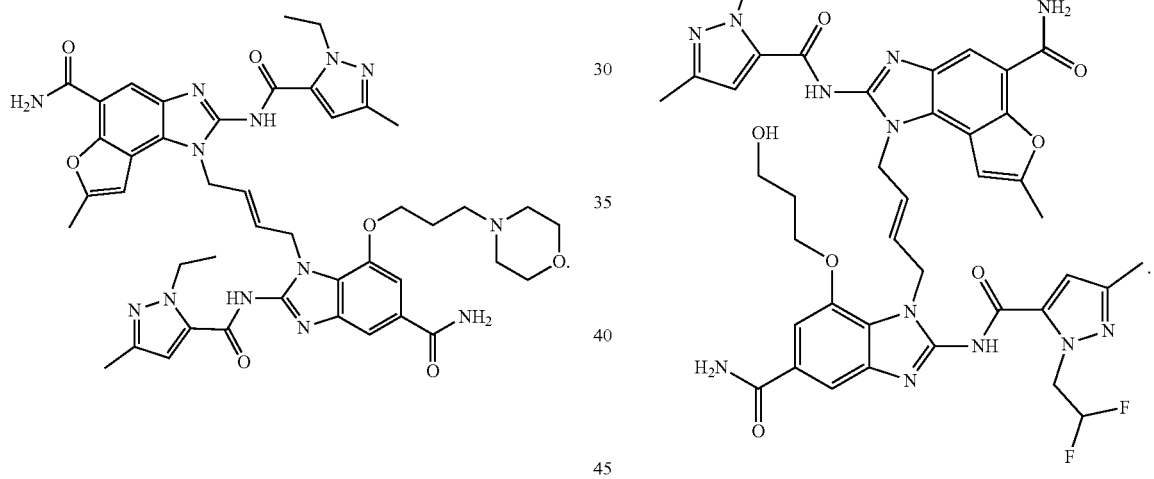

In another preferred embodiment, the compound is the compound shown in the Example.

In the second aspect of the present invention, it provides a pharmaceutical composition comprising a therapeutically effective amount of one or more of the heterocyclic amide compounds of formula (I) or the pharmaceutically acceptable salts thereof of the first aspect, and a pharmaceutically acceptable carrier.

In the third aspect of the present invention, it provides a pharmaceutical composition comprising a therapeutically effective amount of one or more of the heterocyclic amide compounds of formula (I) or the pharmaceutically acceptable salts thereof of the first aspect, and a pharmaceutically acceptable excipient.

In the fourth aspect of the present invention, it provides a preparation method for the heterocyclic amide compound of formula (I) or the pharmaceutically acceptable salt thereof of the first aspect, which comprises the following steps:

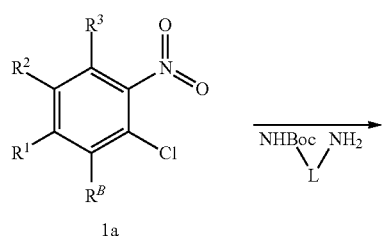

1a

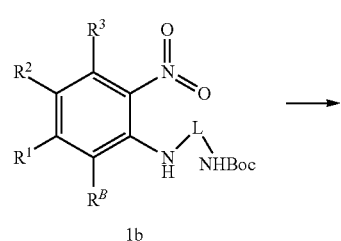

1b

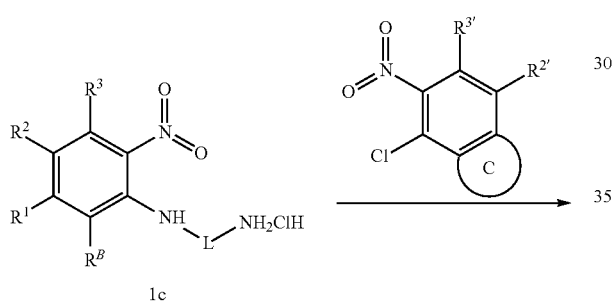

1c

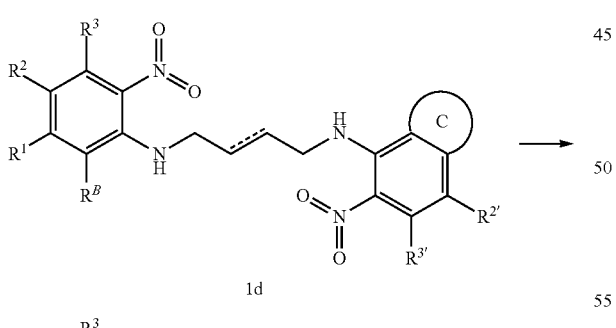

1d

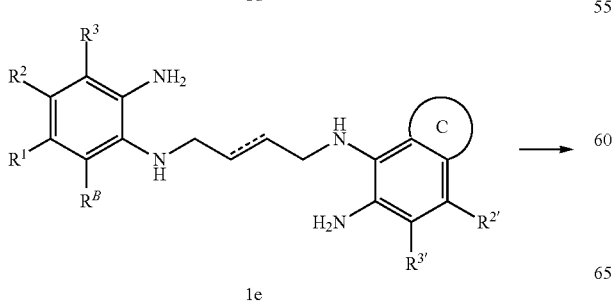

1e

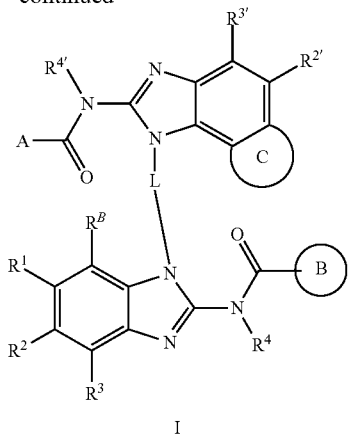

I (i) in an inert solvent, in the presence of a base, the raw material 1a reacts with monoBoc-protected diamine

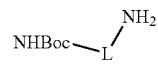

through nucleophilic substitution reaction to form compound 1b;
(ii) in an inert solvent, in the presence of an acid, Boc is deprotected from compound 1b to form intermediate 1c;
(iii) in an inert solvent, in the presence of a base, the intermediate 1c reacts with

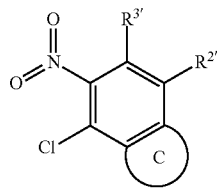

through a substitution reaction to form intermediate 1d;
(iv) in an inert solvent, in the presence of a reducing agent, the intermediate 1d reacts to form compound 1e;
(v) in an inert solvent, in the presence of a catalyst, compound 1e reacts with

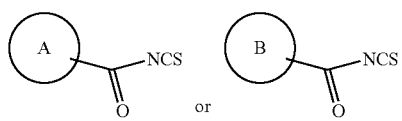

to obtain the target compound I;
in the formula, A, B, L, $R^1$, $R^2$, $R^3$, $R^4$, $R^B$, $R^{2'}$, $R^{3'}$ and $R^{4'}$ are as defined above.

In the fifth aspect of the present invention, it provides a use of the heterocyclic amide compound of formula (I) or the pharmaceutically acceptable salt thereof of the first aspect in the preparation of an immune adjuvant.

In the sixth aspect of the present invention, it provides a use of the heterocyclic amide compound of formula (I) or the pharmaceutically acceptable salt thereof of the first aspect in the preparation of a medicament for activating STING.

In the seventh aspect of the present invention, it provides a use of the heterocyclic amide compound of formula (I) or the pharmaceutically acceptable salt thereof of the first aspect in the preparation of a medicament for treating a disease related to the activity of STING, wherein the disease related to the activity of STING is one or more of the diseases related to inflammation, autoimmune disease, infectious disease, cancer, or precancerous syndrome.

In another preferred embodiment, the disease related to the activity of STING comprises inflammatory, allergic and autoimmune diseases, infectious disease, cancer, or precancerous syndrome.

In another preferred embodiment, the cancer is selected from the group consisting of colon cancer, breast cancer (e.g., invasive ductal cancer, non-invasive ductal cancer, and inflammatory breast cancer), lung cancer (e.g., non-small cell lung cancer, small cell lung cancer, and malignant mesothelioma) and ovarian cancer (e.g., ovarian epithelial carcinoma, ovarian germ cell tumor, low malignant potential tumor of ovary), brain cancer, fibrosarcoma and squamous cell carcinoma, and melanoma, etc.

In another preferred embodiment, the inflammatory disease is selected from the group consisting of acne vulgaris, asthma, celiac disease, chronic prostatitis, glomerulonephritis, inflammatory bowel disease, pelvic inflammatory disease, reperfusion injury, rheumatoid arthritis, sarcoidosis, vasculitis, airway inflammation caused by house dust mites, and interstitial cystitis.

In another preferred embodiment, the infectious disease is the infectious disease caused by a virus, wherein the virus is selected from the group consisting of hepatitis B virus, human papillomavirus, and nasopharyngeal carcinoma-associated EBV.

In another preferred embodiment, there is a significant overlap between the inflammatory disease and the autoimmune disease.

In another preferred embodiment, the inflammatory disease is asthma.

In the eighth aspect of the present invention, it provides a method of inducing an immune response in a subject, wherein the method comprising administering to the subject a therapeutically effective amount of the compound of the first aspect or the pharmaceutical composition of the second aspect.

In another preferred embodiment, the subject is a mammal, preferably a human.

In the ninth aspect of the present invention, it provides a method of activating the activity of STING, comprising the step of contacting the compound or the pharmaceutically acceptable salt thereof of the first aspect of the present invention with a somatic cell (or tissue), thereby activating the activity of STING.

In another preferred embodiment, the somatic cell (or tissue) is from a rodent (e.g., mouse, and rat), or a primate (e.g., human).

In the tenth aspect of the present invention, it provides a method for treating a disease related to the activity of STING, comprising administering to a subject in need thereof a therapeutically effective amount of the compound of the first aspect or the pharmaceutical composition of the second aspect.

The disease related to the activity of STING defined in the present invention is a disease in which STING plays a role in the pathological occurrence of the disease. The disease related to the activity of STING comprises inflammatory, allergic and autoimmune diseases, infectious disease, cancer, or precancerous syndrome, etc.

DETAILED DESCRIPTION OF THE INVENTION

Figure 1:
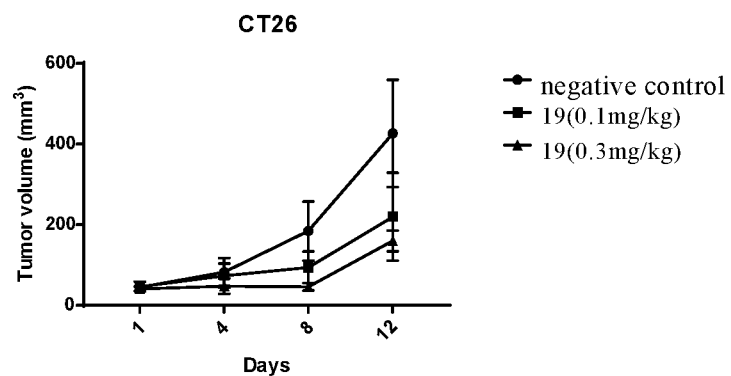
FIG. 1 shows the in vivo anti-tumor activity of compound 19 in a CT26 colon cancer model.

After extensive and in-depth research, a heterocyclic amide compound with a novel structure was accidentally developed for the first time, and the experimental results show that the compound of the present invention has a good activation effect on STING, and can be used to prepare a medicament for treating diseases related to the activation of STING or the activity of STING. On this basis, the present invention was completed.

Terms

In the present invention, unless otherwise specified, the terms used have the general meanings known to those skilled in the art.

When a substituent is described by a conventional chemical formula written from left to right, the substituent also includes a chemically equivalent substituent obtained by writing a structural formula from right to left. For example, —$CH_2O$— is equivalent to —$OCH_2$—.

The term "alkyl", itself or as a part of another substituent, refers to a straight or branched chain hydrocarbon group having a specified number of carbon atoms (i.e., C1-C6 refers to containing 1, 2, 3, 4, 5, or 6 carbon atoms). Examples of alkyl include, but are not limited to methyl, ethyl, n-propyl, isopropyl, n-butyl, t-butyl, isobutyl, sec-butyl, n-pentyl, n-hexyl, and similar alkyl. In the present application, alkyl is also intended to comprise a substituted alkyl, i.e. one or more positions in the alkyl are substituted, in particular 1-4 substituents, which may be substituted at any position.

The term "alkenyl" means a straight or branched-chain hydrocarbon group that contains one or more double bonds and typically contains 2 to 20 carbon atoms (or C2-C8) in length. For example, in the present invention, the "C2-C6 alkenyl" contains an alkenyl having 2, 3, 4, 5, or 6 carbon atoms, and "C3-C6 alkenyl". The alkenyl includes but is not limited to, for example, vinyl, propenyl, butenyl, 1-methyl-2-buten-1-yl, etc. In the present invention, the alkenyl includes substituted alkenyl.

The term "alkynyl" refers to a straight or branched-chain hydrocarbon group containing one or more triple bonds and typically containing 2 to 20 carbon atoms (or C2-C8) in length. In the present invention, "C2-6 alkynyl" refers to a straight or branched-chain alkynyl having 2, 3, 4, 5, or 6 carbon atoms, including but not limited to ethynyl, propynyl, or the like. In the present invention, the alkynyl also includes a substituted alkynyl, and the substituent may be a halogenated, hydroxyl, cyano, and nitro, etc.

The term "alkylamino" refers to an alkyl linked to the rest of the molecule via an amino. In the present invention, "$C_1$-$C_6$ alkylamino" has the structure of $C_1$-$C_6$alkyl-NH—.

The term "alkylene" itself or as a part of another substituent refers to a divalent group derived from an alkane, such as —$CH_2CH_2CH_2CH_2$—. The alkyl (or alkylene) typically has 1-24 carbon atoms, wherein the present invention preferably those groups has 10 or less carbon atoms (e.g., $C_4$-$C_6$ alkylene). Similarly, "alkenylene" or "alkynylene" refers to an unsaturated form of "alkylene" with double or triple bonds, respectively. Examples of "alkenylene" or "alkynylene" include, but are not limited to vinylidene, propenylene,

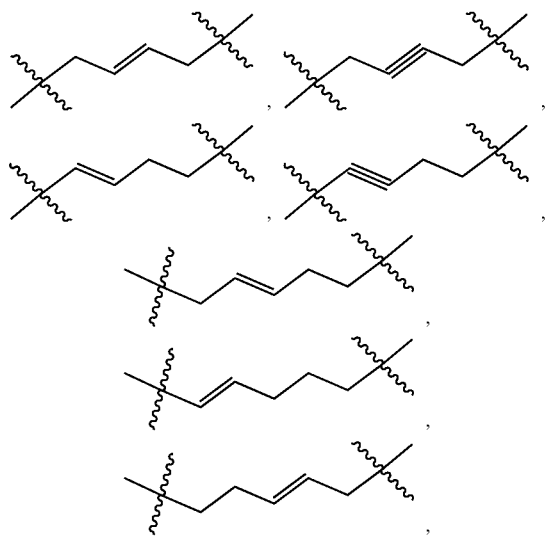

and the like.

In the present invention, "C1-C6 alkoxy" refers to a straight, branched-chain or cyclic alkoxy (e.g., C3-C6 cycloalkoxy) having 1 to 6 carbon atoms, and representative examples include (but are not limited to) methoxyl, ethoxyl, propoxyl, isopropoxyl and butoxyl, etc. Preferably, C1-C3 alkoxy.

The term "cycloalkyl" refers to cyclic alkyl that include saturated monocyclic or bicyclic rings (e.g., fused bicyclic or spiro bicyclic rings) or polycyclic rings. In the present invention, "3 to 6 membered cycloalkyl" refers to a cyclic alkyl containing 3, 4, 5, or 6 carbon atoms. Representative cycloalkyl of the present invention includes, but is not limited to cyclopropyl, cyclobutyl, cyclopentyl, cyclohexyl, and the like. It should be understood that substituted or unsubstituted cycloalkyl, such as branched cycloalkyl (such as 1-methylcyclopropyl and 2-methylcyclopropyl), are included in the definition of "cycloalkyl".

The term "heterocycloalkyl" refers to a cycloalkyl containing one to five heteroatoms selected from N, O and S, wherein the nitrogen and sulfur atoms are optionally oxidized and the nitrogen atoms are optionally quaternized. Heterocycloalkyl can be monocyclic, bicyclic or polycyclic systems. In the present invention, "3-6-membered heterocycloalkyl" refers to a group in which 1 or 2 ring C atoms in C3-6 cycloalkyl are substituted by heteroatoms selected from N, O and S. Examples of heterocycloalkyl include, but are not limited to pyrrolidine, imidazolidine, pyrazolidine, butyrolactam, valerolactam, imidazolidone, hydantoin, dioxolane, phthalimide, piperidine, 1,4-dioxane, morpholine, thiomorpholine, thiomorpholine-S-oxide, thiomorpholine-S,S-oxide, piperazine, pyran, pyridone, 3-pyrroline, thiapyran, pyrone, tetrahydrofuran, tetrahydrothiophene, or quinuclidine, etc. Heterocycloalkyl can be attached to the rest of the molecule via cyclic carbon or heteroatom.

The term "heterocyclyl" refers to a saturated or partially saturated cyclic group having a heteroatom selected from N, S, and O, which may be monocyclic or bicyclic form, such as bridged or spiro ring. The heterocyclyl is preferably a 3-8-membered heterocyclyl, more preferably a 4-6-membered heterocyclyl, more preferably a 5-6-membered heterocyclyl. Examples of heterocyclyl include, but are not limited to oxetane, azetidine, tetrahydro-2H-pyranyl, piperidinyl, piperazinyl, tetrahydrofuryl, morpholinyl, and pyrrolidyl, etc.

The term "heteroaryl" refers to a cyclic aromatic group having 1-3 heteroatoms selected from the group consisting of N, S and O, which may be monocyclic or fused ring. In the present invention, the heteroaryl is preferably a 5-6-membered heteroaryl. Examples of heteroaryl include, but are not limited to pyridyl, pyridazinyl, pyrimidinyl, pyrazinyl, triazinyl, pyrrolyl, pyrazolyl, imidazolyl, (1,2,3)-triazolyl, and (1,2,4)-triazolyl, tetrazolyl, furyl, thienyl, isoxazol, thiazolyl, or oxazolyl etc.

In the present invention, "carbocyclic or heterocyclic" alone or as part of other groups refers to monocyclic or bicyclic saturated, partially saturated or aromatic carbocyclic (e.g., cycloalkyl, cycloalkenyl, or phenyl, etc. as described above), or monocyclic or bicyclic saturated, partially saturated or aromatic heterocyclic (e.g., heteroalkyl, heterocyclyl, or heteroaryl, etc. as described above), wherein 4-6 membered carbocyclic or heterocyclic ring refers to a carbocyclic or heterocyclic ring containing 4-6 ring atoms, preferably 5-6 membered carbocyclic or heterocyclic ring. Examples of carbocyclic or heterocyclic ring include, but are not limited to cyclopropyl, cyclobutyl, cyclopentyl, cyclohexyl, cyclopentenyl, cyclohexenyl, cyclopentadienyl, cyclohexadienyl, oxetane, azetidine, tetrahydro-2H-pyranyl, piperidinyl, piperazinyl, tetrahydrofuryl, morpholinyl, pyrrolidyl, pyridyl, pyridazinyl, pyrimidinyl, pyrazinyl, triazinyl, pyrrolyl, pyrazolyl, imidazolyl, (1,2,3)-triazolyl and (1,2,4)-triazolyl, tetrazolyl, furyl, thienyl, isoxazol, thiazolyl, or oxazolyl, etc.

In the present invention, "amino" refers to a group with a structure of —N(R)(R'), R and R' may independently represent hydrogen, alkyl or substituted alkyl, cycloalkyl or substituted cycloalkyl, aryl or substituted aryl, heterocyclic or substituted heterocyclic, as defined above. R and R' can be the same or different in the dialkylamine fragment.

As used herein, each of the above-mentioned groups of alkyl, alkoxy, cycloalkyl, heteroaryl, cycloheteroalkyl, alkenyl, alkynyl, heterocyclicle, carbocyclic, or heterocyclyl, etc. may be substituted or unsubstituted.

Unless otherwise stated, it is assumed that any heteroatom with a lower valence state has enough hydrogen atoms to replenish its valence state.

In the present invention, the term "substituted" refers to the substitution of one or more hydrogen atoms on a specific group by specific substituent. The specific substituents are those described in the preceding paragraph or those present in each Example. Unless otherwise specified, a substituted group may have a substituent selected from a specific group at any substitutable position of the group, and the substituent may be the same or different in each position. Those skilled in the art should understand that the combinations of substituents contemplated by the present invention are those that are stable or chemically achievable. Typical substituents include but are not limited to one or more of the following groups: such as hydrogen, deuterium, halogen (such as monohalogenated substituent or polyhalogenated substituents, and the latter such as trifluoromethyl or alkyl containing $Cl_3$), cyano, nitro, oxo (=O), trifluoromethyl, trifluoromethoxy, cycloalkyl, alkenyl, alkynyl, heterocyclic, aromatic ring, $OR_a$, $SR_a$, $S(=O)_2R_c$, $S(=O)_2R_c$, $P(=O)_2R_c$, $S(=O)_2OR_c$, $P(=O)_2OR_c$, $NR_bR_c$, $NR_bS(=O)_2R_c$, $NR_bP(=O)_2R_c$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_c$, $NR_dC(=O)NR_bR_c$, $NR_dS(=O)_2NR_bR_c$, $NR_dP(=O)_2NR_bR_c$, $NR_bC(=O)R_a$ or $NR_bP(=O)_2R_c$, wherein $R_a$ can independently represent hydrogen, deuterium, alkyl, cycloalkyl, alkenyl, alkynyl, carbocyclic or heterocyclyl, $R_b$, $R_c$ and $R_d$ can independently represent hydrogen, deuterium, alkyl, cycloalkyl, carbocyclic or heterocyclyl, or $R_b$ and $R_c$ together with the N atom form a heterocyclyl, $R_c$ can independently represent hydrogen, alkyl, cycloalkyl, alkenyl, alkynyl, heterocyclyl or aromatic ring. The above typical substituents, such as alkyl, cycloalkyl, alkenyl, cycloalkenyl, alkynyl, carbocyclic or heterocyclic ring can be optionally substituted. The substituent is such as (but is not limited to): halogen, hydroxy, cyano, carboxy (—COOH), C1-C6 alkyl, C2-C6 alkenyl, C2-C6 alkynyl, C3-C8 cycloalkyl, 3- to -12 membered heterocyclyl, aryl, heteroaryl, C1-C8 aldehydyl, C2-C10 acyl, C2-C10 ester, amino, C1-C6 alkoxy, C1-C10 sulfonyl, and C1-C6 uramido, etc.

The term "halogenated" or "halogen" includes fluorine, chlorine, bromine and iodine.

The term "hydroxyl" refers to —OH.

In the present invention, the "cyclized" in $R^6$ and $R^7$ together with the atoms to which they are connected are cyclized into saturated or unsaturated 4-6 membered carbocyclic or heterocyclic ring" refers to $R^6$ and $R^7$ together with the C atoms to which they are connected form a fused ring, similarly, the "cyclized" in $R^{6'}$ and $R^{7'}$, and $R^B$ and $R^1$ have the same meaning. Wherein, the 4-6-membered carbocyclic or heterocyclic ring is as defined above, and is intended to include substituted or unsubstituted 4-6-membered carbocyclic or heterocyclic ring, the "substituted" refers to being substituted by one or more (1, 2, 3, or 4) substituents selected from the group consisting of halogen, hydroxyl, amino, $C_1$-$C_6$ alkyl, $C_1$-$C_6$ alkoxy, $C_1$-$C_6$ alkylamino, halogenated $C_1$-$C_6$ alkyl, or cyano.

In the present invention, the —C(O)— in —C(O)$NR^aR^b$, —C(O)OR, —C(O)R, or —NRC(O)R— represents a carbonyl group (—C=O—) formed by two atoms of carbon and oxygen through a double bond.

Active Ingredient

As used herein, "the compound of the present invention" refers to the compound represented by the formula I, and further comprises the stereoisomer or optical isomer, pharmaceutically acceptable salt, prodrug or solvate of the compound of formula I.

The compound of formula I of the present invention has the following structure

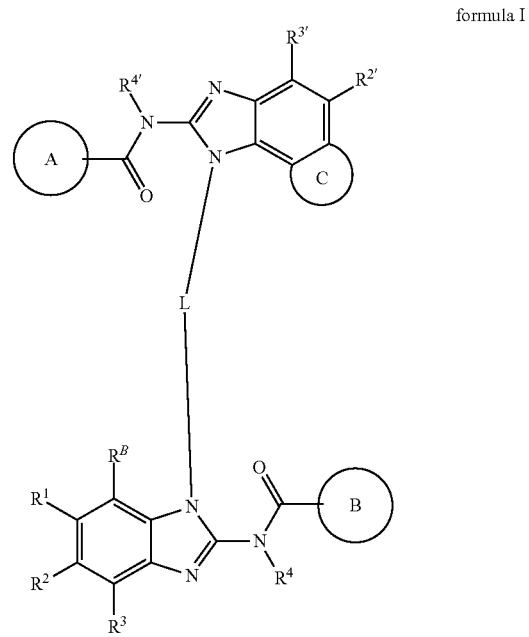

formula I wherein,
ring A is selected from

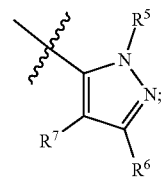

ring B is selected from

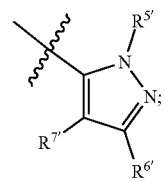

C is selected from saturated or unsaturated 4-6 membered carbocyclic or heterocyclic ring substituted by 0-4 $R^i$;

$R^4$ and $R^{4'}$ are each selected from hydrogen, $C_1$-$C_6$ alkyl or halogen;

$R^5$ and $R^{5'}$ are each selected from hydrogen, $C_1$-$C_6$ alkyl, $C_3$-$C_6$ cycloalkyl, $C_3$-$C_6$ alkynyl, $C_3$-$C_6$ alkenyl, or halogenated $C_1$-$C_6$ alkyl;

$R^6$ and $R^7$ are each selected from hydrogen, $C_1$-$C_6$ alkyl, nitro, halogen, or halogenated $C_1$-$C_6$ alkyl, or $R^6$ and $R^7$ together with the atoms to which they are connected are cyclized into saturated or unsaturated 4-6 membered carbocyclic or heterocyclic ring;

$R^{6'}$ and $R^{7'}$ are each selected from hydrogen, $C_1$-$C_6$ alkyl, nitro, halogen, or halogenated $C_1$-$C_6$ alkyl, or $R^{6'}$ and $R^{7'}$ together with the atoms to which they are connected are cyclized into saturated or unsaturated 4-6 membered carbocyclic or heterocyclic ring;

$R^1$, $R^2$, $R^3$, $R^{2'}$ and $R^{3'}$ are each selected from hydrogen, —$OR^d$, —$NR^aR^c$, halogen, CN, C(O)$OR^d$, $C_1$-$C_6$ alkyl, halogenated $C_1$-$C_6$ alkyl, —$SO_2NH_2$, or —C(O)$NR^aR^b$;

$R^a$, $R^b$, $R^d$ and $R^c$ are each selected from hydrogen or $C_1$-$C_6$ alkyl;

$R^B$ is selected from hydrogen, halogen, $C_1$-$C_6$ alkyl substituted by 0-4 $R^h$, —$OR^f$, —$NR^fR^g$, —C(O)$R^f$, —$CO_2R$, —C(O)$NR^fR^g$, or —$NR^fC(O)R^g$; or $R^B$ and $R^1$ together with the atoms to which they are connected are cyclized into saturated or unsaturated 4-6 membered carbocyclic or heterocyclic ring;

$R^f$ and $R^g$ are each selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;

$R^h$ is selected from halogen, —$OR^j$, —$NR^jR^k$, —C(O)$R^j$, —$CO_2R^k$, —C(O)$NR^jR^k$, —$NR^jC(O)R^k$, 3-6 membered cycloalkyl substituted by 0-4 $R^i$, or 3-6 membered heterocycloalkyl substituted by 0-4 $R^i$;

$R^i$ is selected from halogen, hydroxyl, amino, $C_1$-$C_6$ alkyl, $C_1$-$C_6$ alkoxy, $C_1$-$C_6$ alkylamino, halogenated $C_1$-$C_6$ alkyl, or cyano;

$R^j$ and $R^k$ are each selected from hydrogen, or $C_1$-$C_6$ alkyl;

L is selected from $C_4$-$C_6$ alkylene substituted by 0-4 $R^n$, $C_4$-$C_6$ alkenylene substituted by 0-4 $R^n$, or $C_4$-$C_6$ alkynylene substituted by 0-4 $R^n$; the carbon atoms on $C_4$-$C_6$ alkylene, $C_4$-$C_6$ alkenylene, or $C_4$-$C_6$ alkynylene can be substituted by —O—, —S—, or —$NR^m$—;

$R^m$ is selected from hydrogen, or $C_1$-$C_6$ alkyl;

$R^n$ is selected from halogen, hydroxyl, amino, $C_1$-$C_6$ alkyl, $C_1$-$C_6$ alkoxy, $C_1$-$C_6$ alkylamino, or halogenated $C_1$-$C_6$ alkyl.

In the present invention, the compound of formula I can also have the following structure:

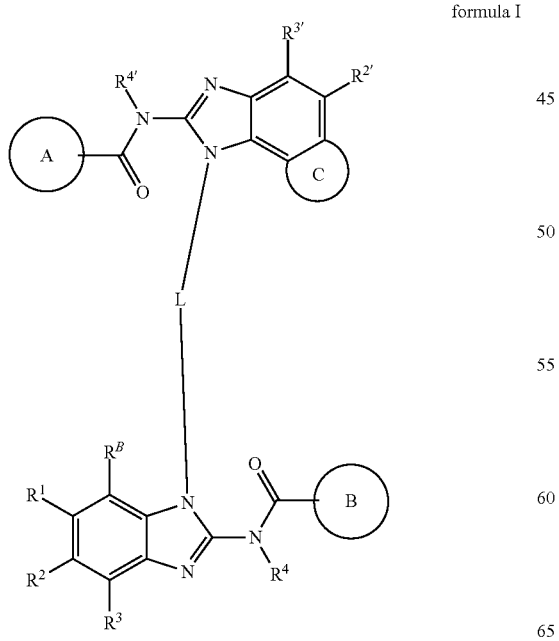

formula I wherein,
ring A is selected from

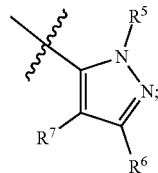

ring B is selected from

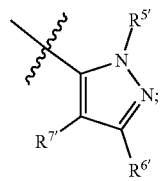

$R^1$, $R^2$, $R^3$, $R^{2'}$ and $R^{3'}$ are each selected from hydrogen, —$OR^d$, —$NR^aR^c$, halogen, CN, C(O)$OR^d$, $C_1$-$C_6$ alkyl, halogenated $C_1$-$C_6$ alkyl, —$SO_2NH_2$, —C(O)$NR^aR^b$, or -$L_1$-$L_2$-C(O)$NR^aR^b$;

$R^a$, $R^b$, $R^d$ and $R^c$ are each selected from hydrogen or $C_1$-$C_6$ alkyl;

$L_1$ is selected from —(CH$_2$)—, —C(O)—, —$SO_2$—, or —C(O)—; wherein t is 0, 1, 2 or 3;

$L_2$ is selected from $C_1$-$C_6$ alkyl, $C_2$-$C_6$ alkynyl, $C_2$-$C_6$ alkenyl, $C_3$-$C_6$ cycloalkyl, or 3-6 membered heterocyclyl;

$R^5$ and $R^{5'}$ are each independently selected from hydrogen, $C_1$-$C_6$ alkyl, $C_3$-$C_6$ cycloalkyl, $C_3$-$C_6$ alkynyl, $C_3$-$C_6$ alkenyl, halogenated $C_1$-$C_6$ alkyl, or —(CH$_2$)$_s$-$L_3$; wherein s is 1, 2 or 3, and $L_3$ is selected from $C_3$-$C_6$ cycloalkyl, or 3-6-membered heterocyclyl; preferably, $R^5$ and $R^{5'}$ are each independently hydrogen, $C_1$-$C_6$ alkyl, $C_3$-$C_6$ alkenyl, halogenated $C_1$-$C_6$ alkyl, —CH$_2$—$C_3$-$C_6$ cycloalkyl, more preferably, $R^5$ and $R^{5'}$ are each independently methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, allyl, or

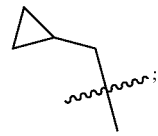 [SMILES: *CC1CC1]

A, B, C, L, $R^4$, $R^B$, $R^{4'}$, $R^6$, $R^{6'}$, $R^7$, $R^{7'}$ are as defined above.

Preferably, -$L_1$-$L_2$-C(O)$NR^aR^b$ is

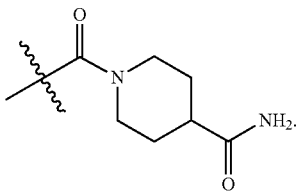 [SMILES: *C(=O)N1CCC(C(N)=O)CC1]

Preferably, C is saturated or unsaturated furyl or tetrahydrofuryl substituted by 0-4 $R^i$, wherein $R^i$ is selected from halogen, hydroxyl, amino, $C_1$-$C_6$ alkyl, or halogenated $C_1$-$C_6$ alkyl.

Preferably, ring A and ring B are the same or different, each is independently

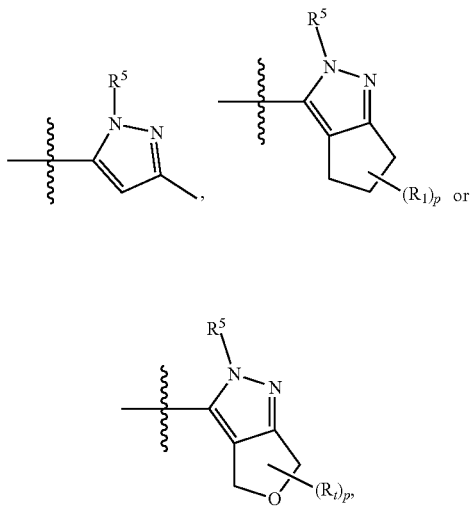

and each $R_t$ is independently selected from $C_1$-$C_6$ alkyl, halogenated $C_1$-$C_6$ alkyl, or $C_1$-$C_6$ alkoxy; p is 0, 1, 2, 3 or 4;

$R^5$ is selected from hydrogen, $C_1$-$C_6$ alkyl, $C_3$-$C_6$ cycloalkyl, $C_3$-$C_6$ alkynyl, $C_3$-$C_6$ alkenyl, or halogenated $C_1$-$C_6$ alkyl.

Preferably, in the above compound, the A ring and B ring are the same, and each is independently

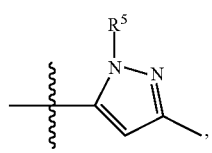

wherein, $R^5$ is selected from hydrogen, $C_1$-$C_6$ alkyl, $C_3$-$C_6$ alkenyl, halogenated $C_1$-$C_6$ alkyl, preferably, $R^5$ is selected from methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, or allyl.

Preferably, in the above compound, the

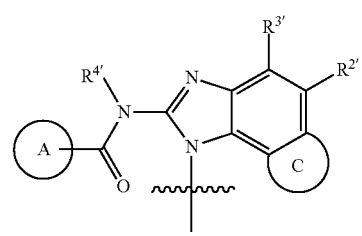

moiety is selected from

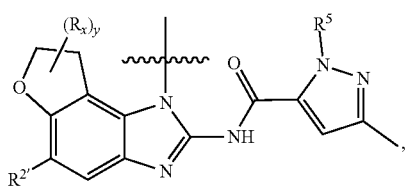

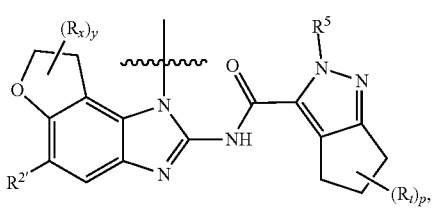

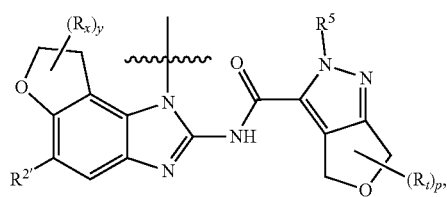

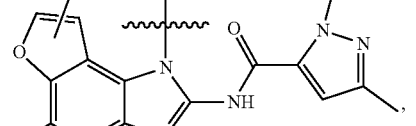

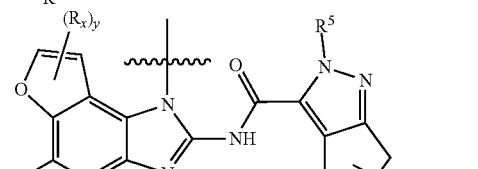

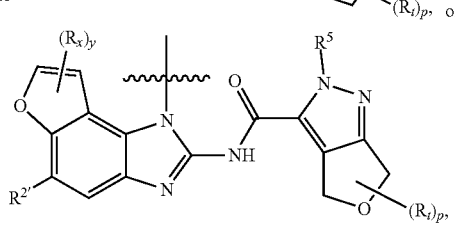

wherein y is 0, 1, 2, 3 or 4; p is 0, 1, 2, 3 or 4;

each $R_x$ is independently selected from halogen, hydroxyl, amino, $C_1$-$C_6$ alkyl, or halogenated $C_1$-$C_6$ alkyl, each $R_4$ is independently selected from $C_1$-$C_6$ alkyl, halogenated $C_1$-$C_6$ alkyl, or $C_1$-$C_6$ alkoxy, $R^5$ is selected from hydrogen, $C_1$-$C_6$ alkyl, $C_3$-$C_6$ alkenyl, or halogenated $C_1$-$C_6$ alkyl;

$R^{2'}$ is independently selected from hydrogen, $-SO_2NH_2$, or $-C(O)NR^aR^b$; wherein, $R^a$ and $R^b$ are each independently selected from hydrogen or $C_1$-$C_6$ alkyl. Preferably, in the above compound, the

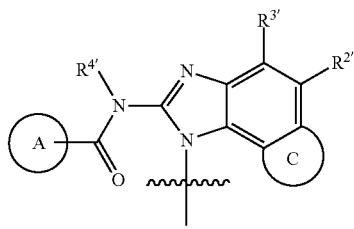

moiety is

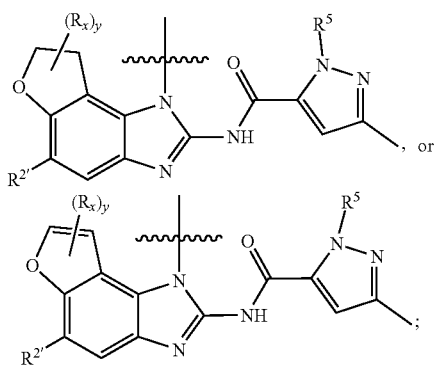

wherein,
y is 0, 1, 2, 3 or 4;
each $R_x$ is independently selected from halogen, hydroxyl, amino, $C_1$-$C_6$ alkyl, or halogenated $C_1$-$C_6$ alkyl;
each $R_t$ is independently selected from $C_1$-$C_6$ alkyl, halogenated $C_1$-$C_6$ alkyl, or $C_1$-$C_6$ alkoxy;
$R^5$ is selected from hydrogen, $C_1$-$C_6$ alkyl, $C_3$-$C_6$ alkenyl, or halogenated $C_1$-$C_6$ alkyl;
$R^{2'}$ is independently selected from hydrogen, —$SO_2NH_2$, or —$C(O)NR^aR^b$;
wherein, $R^a$ and $R^b$ are each independently selected from hydrogen, or $C_1$-$C_6$ alkyl.
Preferably, in the above compound, the

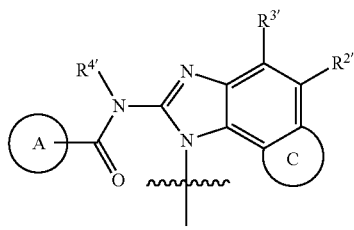

moiety is

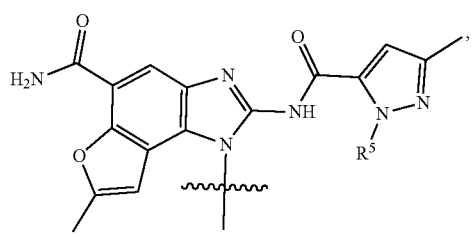

wherein $R^5$ is selected from hydrogen, $C_1$-$C_6$ alkyl, $C_3$-$C_6$ alkenyl, halogenated $C_1$-$C_6$ alkyl, preferably, methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, or allyl.

Preferably, in the above compound, the

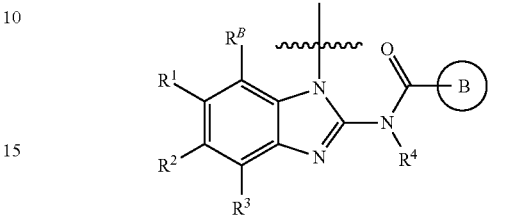

moiety is selected from

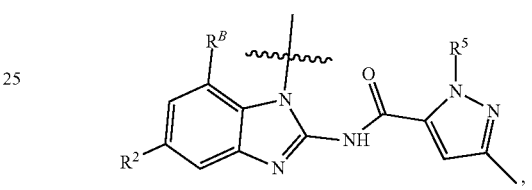

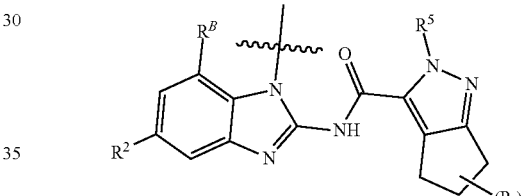

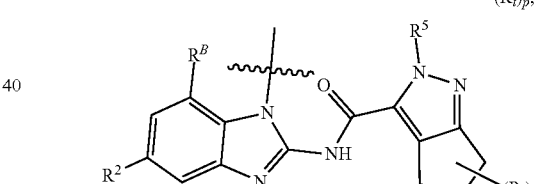

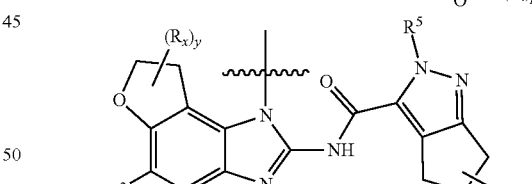

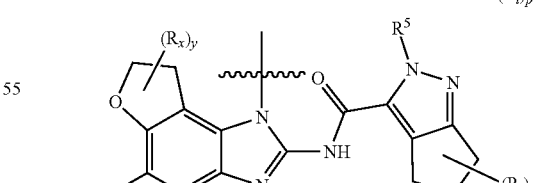

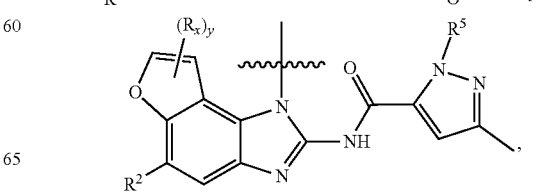

-continued

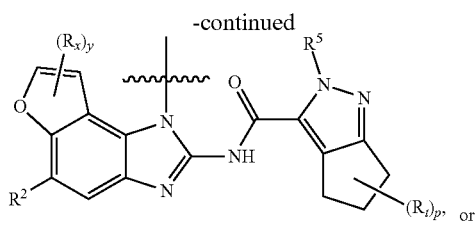

or

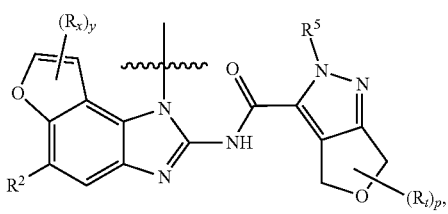

preferably

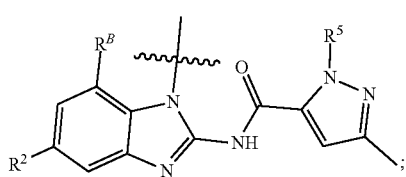

wherein, y is 0, 1, 2, 3 or 4;

p is 0, 1, 2, 3 or 4;

each $R_x$ is independently selected from halogen, hydroxyl, amino, $C_1$-$C_6$ alkyl, or halogenated $C_1$-$C_6$ alkyl;

each $R_t$ is independently selected from $C_1$-$C_6$ alkyl, halogenated $C_1$-$C_6$ alkyl, or $C_1$-$C_6$ alkoxy;

$R^5$ is selected from hydrogen, $C_1$-$C_6$ alkyl, $C_3$-$C_6$ alkenyl, halogenated $C_1$-$C_6$ alkyl; preferably methyl, ethyl, propyl, butyl, $CH_2F$, $CHF_2$, $CF_3$, $CH_2CH_2F$, $CH_2CHF_2$, $CH_2CF_3$, $CH_2CH_2CH_2F$, $CH_2CH_2CHF_2$, $CH_2CH_2CF_3$, or allyl;

$R^2$ is independently selected from hydrogen, —$SO_2NH_2$, or —$C(O)NR^aR^b$, preferably —$C(O)NH_2$;

wherein, $R^a$ and $R^b$ are each independently selected from hydrogen, or $C_1$-$C_6$ alkyl;

$R^B$ is selected from hydrogen or —$OR^f$;

$R^f$ is selected from hydrogen, $C_1$-$C_6$ alkyl substituted by 0-4 $R^h$, 3-6 membered cycloalkyl substituted by 0-4 $R^i$, or 3-6 membered heterocycloalkyl substituted by 0-4 $R^i$;

$R^h$ is selected from halogen, —$OR^j$, —$NR^jR^k$, —$C(O)R^j$, —$CO_2R^k$, —$C(O)NR^jR^k$, —$NR^jC(O)R^k$, 3-6 membered cycloalkyl substituted by 0-4 $R^i$, or 3-6 membered heterocycloalkyl substituted by 0-4 $R^i$;

$R^i$ is selected from halogen, hydroxyl, amino, or $C_1$-$C_6$ alkyl;

$R^j$ and $R^k$ are each independently selected from hydrogen or $C_1$-$C_6$ alkyl.

Preferably, the

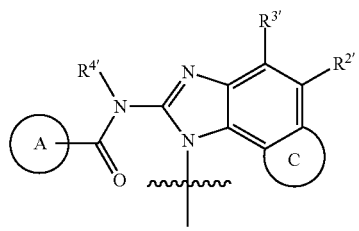

moiety and

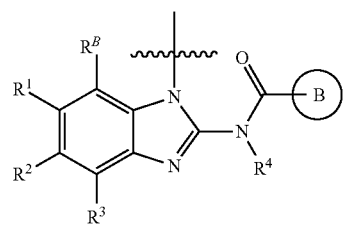

moiety are the same or different.
Preferably, the

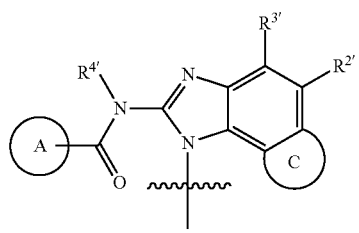

moiety and the

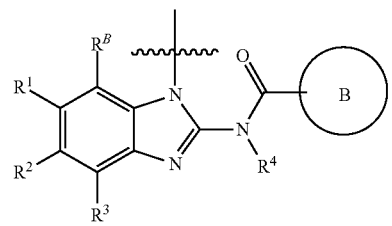

moiety are the same, and each is independently

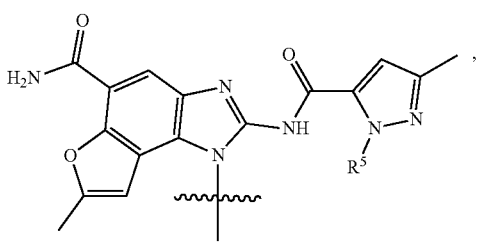

wherein $R^5$ selected from hydrogen, $C_1$-$C_6$ alkyl, $C_3$-$C_6$ alkenyl, or halogenated $C_1$-$C_6$ alkyl, preferably, methyl, ethyl, propyl, butyl, CH$_2$F, CHF$_2$, CF$_3$, CH$_2$CH$_2$F, CH$_2$CHF$_2$, CH$_2$CF$_3$, CH$_2$CH$_2$CH$_2$F, CH$_2$CH$_2$CHF$_2$, CH$_2$CH$_2$CF$_3$, or allyl.

Preferably, L is selected from C$_4$-C$_6$ alkenylene substituted by 0-4 R$''$, C$_4$-C$_6$ alkylene substituted by 0-4 R$''$, wherein R$''$ is selected from halogen, hydroxyl, amino, C$_1$-C$_6$ alkyl, C$_1$-C$_6$ alkoxy, C$_1$-C$_6$ alkylamino, or halogenated C$_1$-C$_6$ alkyl.

Preferably, in the above compound, R$^B$ is selected from hydrogen, or —OR$^f$;

R$^f$ is selected from hydrogen, C$_1$-C$_6$ alkyl substituted by 0-4 R$^h$, 3-6 membered cycloalkyl substituted by 0-4 R$^i$, or 3-6 membered heterocycloalkyl substituted by 0-4 R$^i$;

R$^h$ is selected from halogen, —OR$^j$, —NR$^j$R$^k$, —C(O)R$^j$, —CO$_2$R$^k$, —C(O)NR$^j$R$^k$, —NR$^j$C(O)R$^k$, 3-6 membered cycloalkyl substituted by 0-4 R$^i$, or 3-6 membered heterocycloalkyl substituted by 0-4 R$^i$;

R$^i$ is selected from halogen, hydroxyl, amino, or C$_1$-C$_6$ alkyl;

R$^j$ and R$^k$ are each independently selected from hydrogen, or C$_1$-C$_6$ alkyl; more preferably, R$^B$ is selected from H, methoxy,

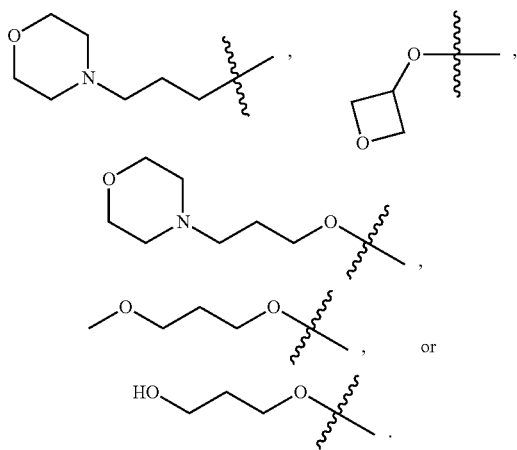

The salts that may be formed by the compound in the present invention are also within the scope of the present invention. Unless otherwise stated, the compound in the present invention is understood to include its salt. The term "salt" as used herein refers to a salt formed in the form of acid or base from inorganic or organic acid and base. Further, when the compound in the present invention contains a base fragment which includes, but is not limited to pyridine or imidazole, when it contains an acid segment which includes, but is not limited to carboxylic acid. The zwitter-ion that may be formed ("inner salt") is included within the scope of the term "salt". Pharmaceutically acceptable (i.e., non-toxic, physiologically acceptable) salt is preferred, although other salts are also useful and may be used, for example, in the separation or purification steps of the preparation process. The compound of the present invention may form a salt, for example, compound I is reacted with a certain amount (such as an equivalent amount) of an acid or base, and precipitated in a medium, or freeze-dried in aqueous solution.

The base fragment contained in the compounds of the present invention includes but is not limited to amines or pyridine or imidazole rings, and it may form salt with organic or inorganic acid. Typical acids that may form salts include acetate (such as acetate or trihalogenated acetic acid, such as trifluoroacetic acid), adipate, alginate, ascorbate, aspartate, benzoate, benzene sulfonate, disulfate, borate, butyrate, citrate, camphorate, camphor sulfonate, cyclopentane propionate, diethylene glycolate, lauryl sulfate, ethanesulphonate, fumarate, gluceptate, glycerophosphate, hemisulphate, enanthate, caproate, hydrochloride, hydrobromide, hydriodate, isethionate (such as 2-hydroxy-ethesulfonate), lactate, maleate, mesylate, naphthalenesulfonate (such as 2-naphthalenesulfonate), nicotinate, nitrate, oxalate, pectate, persulfate, phenylpropionate (such as 3-phenylpropionate), phosphate, picrate, pivalate, propionate, salicylate, succinate, sulfate (such as formed with sulfuric acid), sulfonate, tartrate, thiocyanate, toluenesulfonate (such as tosilate), dodecanoate, etc.

Some compounds of the invention may contain acidic fragments including, but not limited to carboxylic acid, which may form salts with various organic or inorganic bases. Salt formed by typical base includes ammonium salt, alkali metal salt (such as sodium, lithium and potassium salts), alkaline earth metal salt (such as calcium and magnesium salts), and salt formed by organic bases (such as organic amines), such as benzathine, dicyclohexylamine, hydrabamine (salt formed with N,N-bis (dehydroabietyl) ethylenediamine), N-methyl-D-glucanamine, N-methyl-D-glucoamide, tert-butyllamine, and the salt formed with amino acids such as arginine, lysine, etc. Basic nitrogen-containing groups can form quaternary ammonium salts with halides, such as small molecular alkyl halides (such as chlorides, bromides and iodides of methyl, ethyl, propyl and butyl), dialkyl sulfate (such as dimethyl, diethyl, dibutyl, and dipentyl sulfates), long chain halides (such as chlorides, bromides and iodides of decyl, dodecyl, tetradecyl, and tetradecyl), aralkyl halides (such as bromides of benzyl and phenyl), etc.

The prodrug and solvate of the compound in the present invention are also included within the scope of the present invention. The term "prodrug" herein refers to a compound resulting from the chemical transformation of a metabolic or chemical process to produce a compound, salt, or solvate in the present invention for the treatment of an associated disease. The compounds of the invention include solvates such as hydrates.

Compound, salt or solvate in the present invention, may be present in tautomeric forms such as amide and imino ether. All of these tautomers are part of the present invention.

Stereisomers of all compounds (such as those asymmetric carbon atoms that may be present due to various substitutions), including their enantiomeric forms and non-enantiomed forms, all belong to the protection scope of the present invention. The independent stereoisomer in the present invention may not coexist with other isomers (e.g., as a pure or substantially pure optical isomer with special activity), or may be a mixture (such as racemate), or a mixture formed with all other stereoisomers or a part thereof. The chiral center of the present invention has two configurations of S or R, which is defined by International Union of Pure and Applied Chemistry (IUPAC) founded in 1974. The racemization form can be solved by physical methods, such as fractional crystallization, or separation crystallization by derivation into diastereomers, or separation by chiral column chromatography. Individual optical isomer can be obtained from racemate by appropriate methods, including but not limited to conventional methods, such as recrystallization after salting with optically active acids.

Weight content of compound in the present invention obtained by preparation, separation and purification in turn is equal to or greater than 90%, such as equal to or greater than 95%, equal to or greater than 99% ("very pure" compound), and listed in the description of the text. The "very pure" compound herein of the present invention is also part of the present invention.

All configuration isomers of the compound of the present invention are within the scope, whether in mixture, pure or very pure form. The definition of the compound of the present invention comprises cis (Z) and trans (E) olefin isomers, and cis and trans isomers of carbocyclic and heterocyclic.

In the entire specification, the groups and substituents can be selected to provide stable fragments and compounds.

Specific functional groups and chemical term definitions are described below in detail. For the purposes of the present invention, the chemical elements are consistent with Periodic Table of the Elements, CAS version, *Handbook of Chemistry and Physics*, 75$^{th}$ Ed. The definition of a particular functional group is also described therein. In addition, the basic principles of Organic Chemistry as well as specific functional groups and reactivity are described in "Organic Chemistry", Thomas Sorrell, University Science Books, Sausalito: 1999, the entire content of which is incorporated herein by reference.

Some compounds of the present invention may exist in specific geometric or stereoisomer forms. The present invention covers all compounds, including their cis and trans isomers, R and S enantiomers, diastereomers, (D) type isomers, (L) type isomers, racemic mixtures and other mixtures. In addition, asymmetric carbon atom can represent substituent, such as alkyl. All isomers and mixtures thereof are included in the present invention.

According to the invention, mixtures of isomers may contain a variety ratios of isomers. For example, mixtures with only two isomers may have the following combinations: 50:50, 60:40, 70:30, 80:20, 90:10, 95:5, 96:4, 97:3, 98:2, 99:1, or 100:0, all ratios of the isomers are within the scope of the present invention. Similar ratios readily understood by those of ordinary skill in the art and ratios for mixtures of more complex isomers are also within the scope of the present invention.

The invention also includes isotope labeled compounds, which are equivalent to the original compounds disclosed herein. However, in fact, it usually occurs when one or more atoms are replaced by atoms with a different atomic weight or mass number. Examples of compound isotopes that may be listed in the present invention include hydrogen, carbon, nitrogen, oxygen, phosphorus, sulfur, fluorine and chlorine isotopes, such as $^2H$, $^3H$, $^{13}C$, $^{11}C$, $^{14}C$, $^{15}N$, $^{18}O$, $^{17}O$, $^{31}P$, $^{32}P$, $^{35}S$, $^{18}F$ and $^{36}Cl$. Compound, or enantiomer, diastereomer, isomer, or pharmaceutically acceptable salt or solvate, the above compound containing isotopes or other isotope atoms are all within the scope of the invention. Some isotope-labeled compounds in the present invention, such as the radioactive isotopes of $^3H$ and $^{14}C$, are also included and are useful in experiments on the tissue distribution of drugs and substrates. Tritium ($^3H$) and Carbon-14 ($^{14}C$), which are relatively easy to prepare and detect, and are the preferred choice. In addition, heavier isotope substitutions such as deuterium, i.e. $^2H$, have advantages in certain therapies due to their good metabolic stability, such as increased half-life or reduced dosage in vivo, and thus may be preferred in certain situations. Isotope-labeled compounds can be prepared by conventional methods through replacing readily available isotope-labeled reagents with non-isotopic reagents that can be prepared using the disclosed scheme shown in the Example.

If the synthesis of a specific enantiomer of the compound of the invention is to be designed, it can be prepared by asymmetric synthesis, or derivatized with chiral auxiliary reagent, separating the resulting diastereomeric mixture and removing the chiral adjunct to obtain a pure enantiomer. In addition, if a molecule contains a basic functional group, such as an amino acid, or an acidic functional group, such as a carboxyl group, a diastereomer salt can be formed with suitable optically active acids or bases, which can be separated by conventional means, such as separation crystallization or chromatography, to obtain a pure enantiomer.

As described herein, the compound in the present invention may be substituted with any number of substituents or functional groups to extend its scope. In general, whether the term "substituted" appears before or after the term "optional", the general formula that includes substituents in the compound of the present invention means the substitution of a specified structural substituent for a hydrogen radical. When multiple locations in a particular structure are replaced by multiple specific substituents, each location of the substituents can be the same or different. The term "substituted" as used herein includes all substitution that allows organic compounds to be substituted. Broadly speaking, the allowable substituents include non-cyclic, cyclic, branched, non-branched, carbocyclic and heterocyclic, aromatic ring and non-aromatic organic compounds. In the present invention, such as heteroatomic nitrogen, its valence state may be supplemented by a hydrogen substituent or by any permitted organic compound described above. Furthermore, the invention is unintentionally limited to the substituted organic compounds in any way. The present invention considers that a combination of substituents and variable groups is good for the treatment of diseases in the form of stable compounds. The term "stable" herein refers to a stable compound which is sufficient for maintaining the integrity of the compound structure within a sufficiently long time, preferably effective in a sufficiently long time, which is hereby used for the above purposes.

The metabolite of the compounds and their pharmaceutically acceptable salts of the present application, and prodrugs that can be converted into the compounds and their pharmaceutically acceptable salts thereof of the present application in vivo, are also included in the claims.

Preparation Method of Compound

Methods for preparing compound of formula I are described in the following schemes and examples. Raw materials and intermediates are purchased from commercial sources, prepared by known steps, or otherwise described. In some cases, the sequence of steps to perform the reaction scheme may be changed to facilitate the reaction or avoid unwanted side reaction products.

Generally, in the preparation process, each reaction is usually carried out in an inert solvent at room temperature to reflux temperature such as 0° C. to 150° C., preferably 10° C. to 100° C. The reaction time is usually 0.1-60 hours, preferably 0.5-48 hours.

Preferably, the compound of formula I of the present invention can be prepared by the following steps

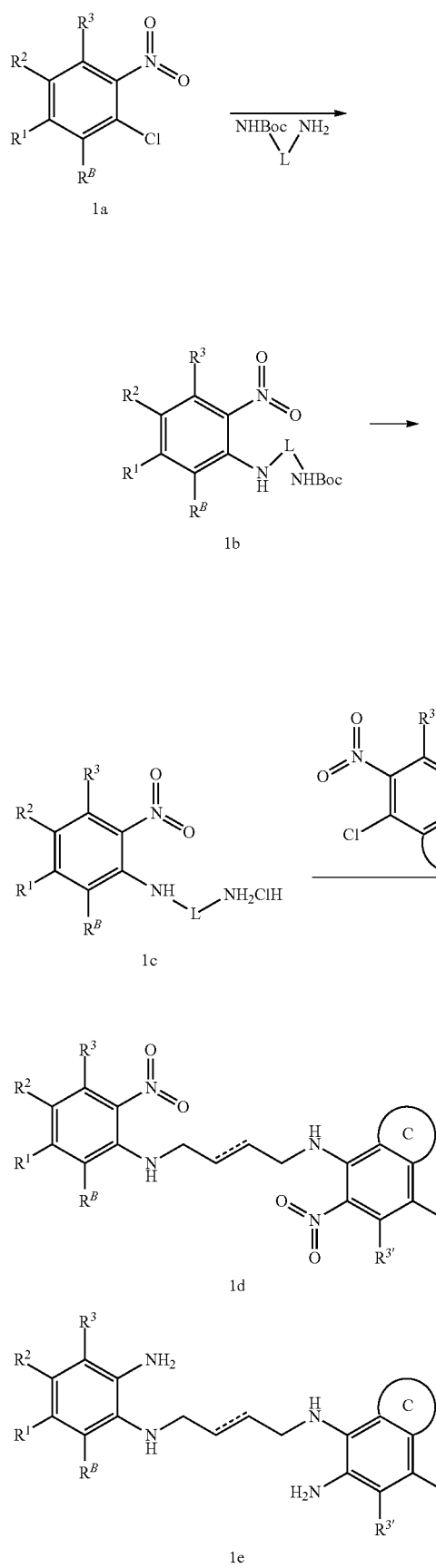

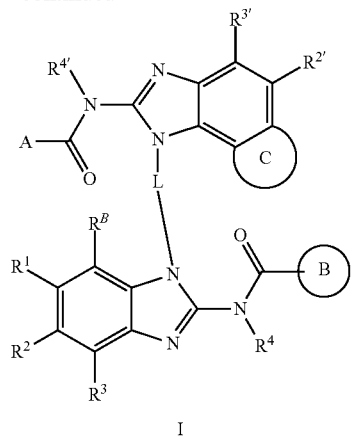

I (i) in an inert solvent (such as n-butanol), in the presence of a base (N,N-diisopropylethylamine), the raw material 1a reacts with monoBoc-protected diamine

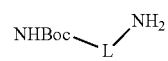

through nucleophilic substitution reaction to form compound 1b;

(ii) in an inert solvent (such as ethyl acetate), in the presence of an acid (hydrochloric acid), Boc is deprotected from compound 1b to form intermediate 1c;

(iii) in an inert solvent (such as n-butanol), in the presence of a base (N,N-diisopropylethylamine), the intermediate 1c reacts with

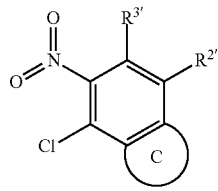

through a substitution reaction to form intermediate 1d;

(iv) in an inert solvent (methanol), in the presence of a reducing agent (sodium dithionite), the intermediate 1d reacts to form compound 1e;

(v) in an inert solvent (such as N,N-dimethylformamide and/or dioxane in the presence of a catalyst (such as EDCI), compound 1e reacts with

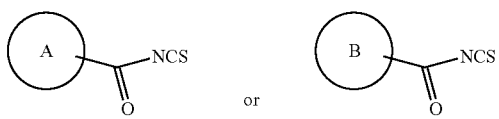

to obtain the target compound I;

in the formula, A, B, L, $R^1$, $R^2$, $R^3$, $R^4$, $R^B$, $R^{2'}$, $R^{3'}$ and $R^{4'}$ are defined as above.

Preferably, the compound of the present invention can be obtained by the following steps:

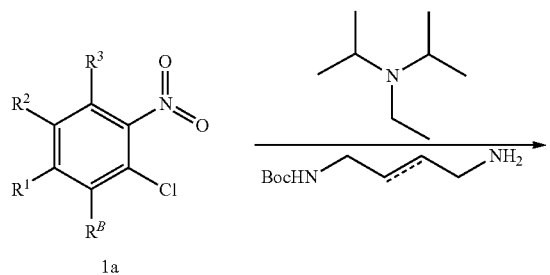

1a

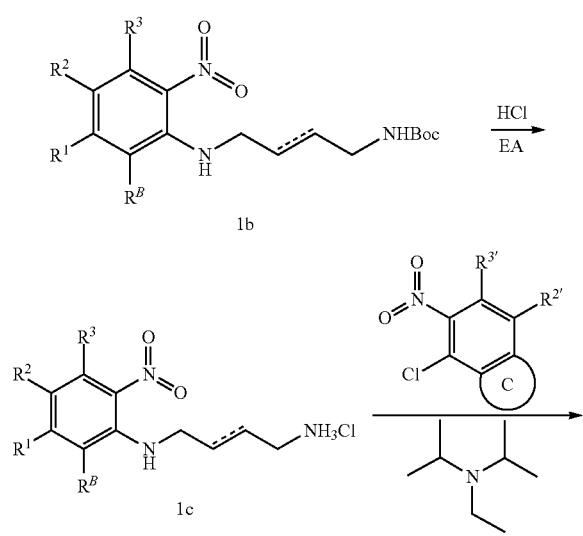

1b

1c

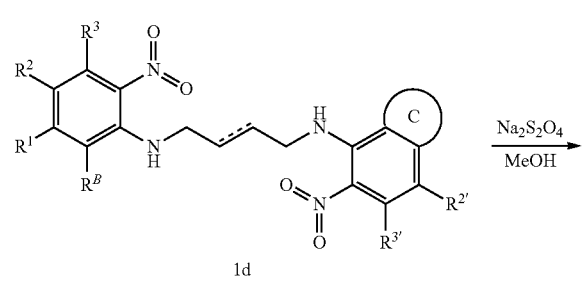

1d

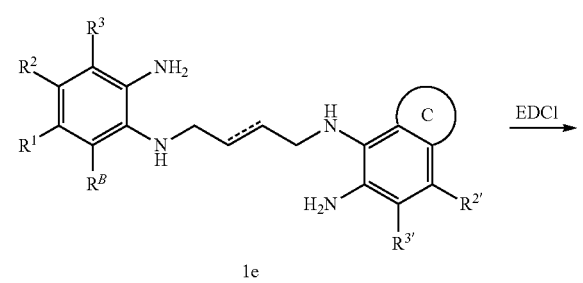

1e

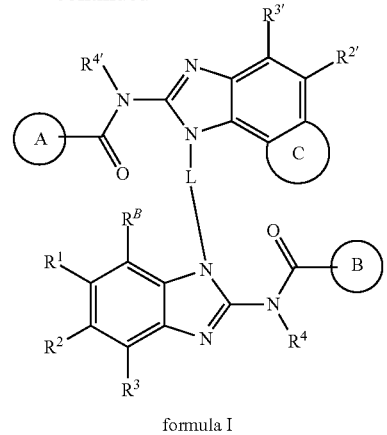

formula I

Raw material 1a reacts with monoBoc-protected butanediamine or trans-buten-1,4-diamine through nucleophilic substitution reaction in the presence of N,N-diisopropylethylamine in n-butanol to form compound 1b, then Boc was deprotected in a solution of hydrochloric acid in ethyl acetate to form intermediate sc, and then reacts with

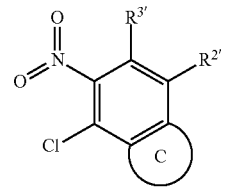

through a substitution reaction in the presence of N,N-diisopropylethylamine in n-butanol to form intermediate 1d which is reduced by sodium dithionite in methanol to form compound 1e, and then condensed with different isothiocyanates

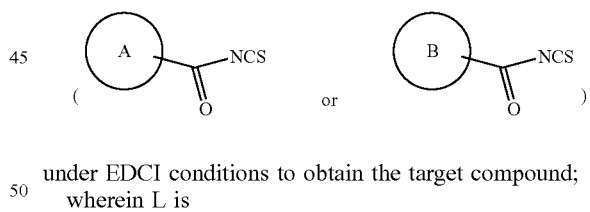

under EDCI conditions to obtain the target compound; wherein L is wherein === represents a single or double bond;
A, B, $R^1$, $R^2$, $R^3$, $R^4$, $R^B$, C, $R^{2'}$, $R^{3'}$ and $R^{4'}$ are defined as above.

Pharmaceutical Composition and Method of Administration

Since the compounds of the present invention have excellent agonistic activity for STING kinase, the compound of the present invention or the stereoisomer or optical isomer, pharmaceutically acceptable salt, prodrugs or solvate thereof, and pharmaceutical composition containing the compound of the present invention as the main active ingredients can be used to prevent and/or treat (stabilize, reduce or cure) diseases related to STING kinase, such as inflammatory diseases (acne vulgaris, asthma, celiac disease, chronic prostatitis, glomerulonephritis, inflammatory bowel disease, pelvic inflammatory disease, reperfusion injury, rheumatoid arthritis, sarcoidosis, vasculitis, airway inflammation caused by house dust mites and interstitial cystitis), autoimmune diseases, infectious diseases (such as infectious diseases caused by hepatitis B virus, human papillomavirus, nasopharyngeal cancer-related EB virus, etc.), cancer (such as colon cancer, brain cancer, breast cancer, fibrosarcoma and squamous cell carcinoma, melanoma, breast cancer, colon cancer, lung cancer and ovarian cancer), precancerous syndrome related diseases.

The pharmaceutical composition of the present invention comprises a safe and effective amount of the compound of the present invention and a pharmaceutically acceptable excipient or carrier. In which, "safe and effective amount" refers to the amount of compound is sufficient to significantly improve the condition, not to produce severe side effects. Typically, the pharmaceutical composition contains 1-2000 mg of the compound of the present invention/dose, and preferably contains 10-200 mg of the compound of the present invention/dose. Preferably, "one dose" is a capsule or a pill.

"Pharmaceutically acceptable carrier" refers to one or more compatible solid or liquid filler or gel substances, which are suitable for human use, and must be sufficiently pure and of sufficiently low toxicity. "Compatible" herein refers to ability of each component of a composition can be mixed with the compound of the present invention and can be mixed with each other without appreciably reducing the efficacy of the compound. Examples of pharmaceutically acceptable carrier include cellulose and derivatives thereof (such as sodium carboxymethylcellulose, sodium ethylcellulose, or cellulose acetate, etc.), gelatin, talc, solid lubricant (such as stearic acid, or magnesium stearate), calcium sulfate, vegetable oil (such as soybean oil, sesame oil, peanut oil, or olive oil, etc.), polyol (such as propylene glycol, glycerol, mannitol, or sorbitol, etc.), emulsifier (such as Tween®), wetting agent (such as lauryl sodium sulfate), colorant, flavoring, stabilizer, antioxidant, preservative, or pyrogen-free water, etc.

There is no special limitation of administration mode for the compound or pharmaceutical compositions of the present invention, and the representative administration mode includes (but is not limited to) oral, and parenteral (intravenous, intramuscular or subcutaneous) administration.

Solid dosage forms for oral administration include capsules, tablets, pills, powders and granules. In these solid dosage forms, the active compounds are mixed with at least one conventional inert excipient (or carrier), such as sodium citrate or dicalcium phosphate, or mixed with any of the following components: (a) fillers or compatibilizer, such as starch, lactose, sucrose, glucose, mannitol and silicic acid; (b) binders, such as hydroxymethyl cellulose, alginate, gelatin, polyvinylpyrrolidone, sucrose and arabic gum; (c) humectant, such as, glycerol; (d) disintegrating agent, such as agar, calcium carbonate, potato starch or tapioca starch, alginic acid, certain composite silicates, and sodium carbonate; (e) dissolution-retarding agents, such as paraffin; (f) absorption accelerators, such as quaternary ammonium compounds; (g) wetting agents, such as cetyl alcohol and glyceryl monostearate; (h) adsorbents, for example, kaolin; and (i) lubricants such as talc, calcium stearate, magnesium stearate, solid polyethylene glycol, lauryl sodium sulfate, or the mixtures thereof. In capsules, tablets and pills, the dosage forms may also contain buffering agents.

The solid dosage forms such as tablets, sugar pills, capsules, pills and granules can be prepared by using coating and shell materials, such as enteric coatings and any other materials known in the art. They can contain an opaque agent. The release of the active compounds or compounds in the compositions can be released in a delayed mode in a given portion of the digestive tract. Examples of the embedding components include polymers and waxes. If necessary, the active compounds and one or more above excipients can form microcapsules.

Liquid dosage forms for oral administration include pharmaceutically acceptable emulsions, solutions, suspensions, syrups or tinctures. In addition to the active compounds, the liquid dosage forms may contain any conventional inert diluents known in the art such as water or other solvents, solubilizers and emulsifiers, such as ethanol, isopropanol, ethyl carbonate, ethyl acetate, propylene glycol, 1,3-butanediol, dimethyl formamide, as well as oil, in particular, cottonseed oil, peanut oil, corn germ oil, olive oil, castor oil and sesame oil, or the combination thereof.

Besides these inert diluents, the composition may also contain additives such as wetting agents, emulsifiers, and suspending agent, sweetener, flavoring agents and perfume.

In addition to the active compounds, the suspension may contain suspending agent, for example, ethoxylated isooctadecanol, polyoxyethylene sorbitol and sorbitan esters, microcrystalline cellulose, methanol aluminum and agar, or the combination thereof.

The compositions for parenteral injection may comprise physiologically acceptable sterile aqueous or anhydrous solutions, dispersions, suspensions or emulsions, and sterile powders which can be re-dissolved into sterile injectable solutions or dispersions. Suitable aqueous and non-aqueous carriers, diluents, solvents or excipients include water, ethanol, polyols and any suitable mixtures thereof.

The compounds of the present invention can be administered alone or in combination with other pharmaceutically acceptable compounds (such as STING agonists).

In combination administration, the pharmaceutical composition further comprises one or more (2, 3, 4, or more) of other pharmaceutically acceptable compounds (e.g., STING agonists). The one or more (2, 3, 4, or more) of other pharmaceutically acceptable compound may be used simultaneously, separately or sequentially with the compound of the present invention for the prevention and/or treatment of diseases related to the activity or expression of STING kinase.

When the pharmaceutical compositions are used, a safe and effective amount of compound of the present invention is administrated to a mammal (such as human) in need thereof, wherein the dose of administration is a pharmaceutically effective dose. For a person weighed 60 kg, the daily dose is usually 1-2000 mg, preferably 20-500 mg. Of course, the particular dose should also depend on various factors, such as the route of administration, patient healthy status, which are well within the skills of an experienced physician.

The main advantages of the present invention are:
1. The compound of the invention has a novel structure and excellent STING kinase activation;
2. The compound of the invention can be prepared a STING agonist, which has better efficacy and pharmacokinetic characteristics.
3. The compound prepared by the present invention has a better or equivalent activation effect on STING than positive controls (ADU-S100, GSK compound 3, or GSK compound 1) in macrophages (such as THP1-Dual cells, Raw-lucia cells, etc.), providing a new choice for clinical screening and/or preparation of medicament for diseases related to the activity of STING.

The present invention will be further illustrated below with reference to the specific examples. It should be understood that these examples are only to illustrate the invention but not to limit the scope of the invention. The experimental methods without specific conditions in the following examples usually follow conventional conditions, or according to the conditions recommended by the manufacturer. Unless indicated otherwise, parts and percentage are calculated by weight.

The experimental materials and reagents used in the following examples can be obtained from commercial sources without special instructions.

EXAMPLE

The structure of the compound is determined by nuclear magnetic resonance ($^1$H-NMR) or mass spectrometry (MS). NMR is determined by BrukerAV-300-type nuclear magnetic resonance instrument. The determination solvent is deuterated dimethyl sulfoxide (DMSO-$D_6$) or deuterated chloroform (CDCl$_3$), and TMS is the internal standard.

Preparation of the Compound of the Invention

Synthesis of Intermediate Compound 1

1-ethyl-3-methyl-1H-pyrazol-5-carbonylisothiocyanate

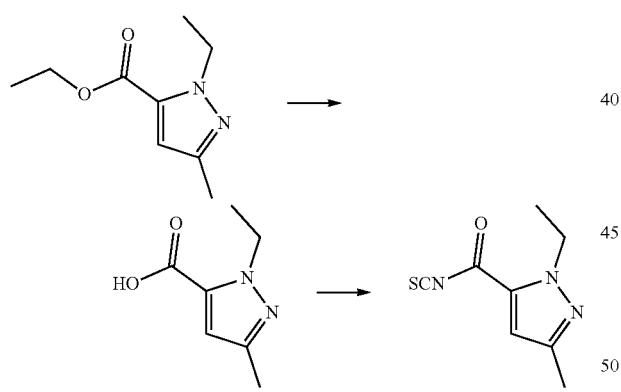

Ethyl 1-ethyl-3-methyl-1H-pyrazol-5-carboxylate (1 g, 5.49 mmol) was dissolved in a mixed solution of methanol (10 mL) and water (5 mL). After stirring at room temperature for ten minutes, lithium hydroxide (0.263 g, 10.98 mmol) was added to the above reaction solution. The reaction solution was continued to react at room temperature for 3 hours, methanol was distilled to be removed under reduced pressure, and pH to adjust to be 5-6 with dilute hydrochloric acid, filtered by suction to obtain a white solid which was not purified, and directly used in the next reaction.

1-ethyl-3-methyl-1H-pyrazol-5-carboxylic acid (0.8 g, 5.19 mmol) was dissolved in dichloromethane (5 mL) solution, 3 drops of N,N-dimethylformamide was added dropwise, stirred for 10 minutes under ice bath. Oxalyl chloride (0.527 mL, 6.23 mmol) diluted by dichloromethane (5 mL) was slowly added into the above reaction solution. After stirring under the ice bath for ten minutes, the ice bath was removed, and the reaction mixture was reacted at room temperature for two hours. The reaction was monitored by TLC until it was completed, then the reaction solution was concentrated by distillation under reduced pressure, and the residue was used for the next reaction. Potassium thiocyanate (0.61 g, 6.26 mmol) was dissolved in acetone (10 mL) solution under an ice bath, stirred under the ice bath for 10 minutes. The residue diluted by acetone (5 mL) was slowly added into the above reaction solution, and the reaction was continued for 30 minutes under the ice bath. The reaction was monitored by TLC until it was completed, n-hexane (15 mL) was added to the above reaction solution, the solution volume was distilled and concentrated to ½ under reduced pressure, then n-hexane (15 mL) was added, and the solution volume was distilled and concentrated to ½ under reduced pressure. The solution was filtered by suction under reduced pressure, the filtrate was collected to make sand, and separated and purified by column chromatography (petroleum ether: ethyl acetate=6:1) to obtain a colorless transparent oily compound, i.e. intermediate compound 1. MS (ESI) m/z=196[M+H]$^+$; $^1$H NMR (300 MHz, CDCl$_3$) δ 6.76 (s, 1H), 4.52 (s, 2H), 2.32 (s, 3H), 1.42 (s, 3H).

Synthesis of Intermediate Compound 2

1-propargyl-3-methyl-1H-pyrazol-5-carbonylisothiocyanate

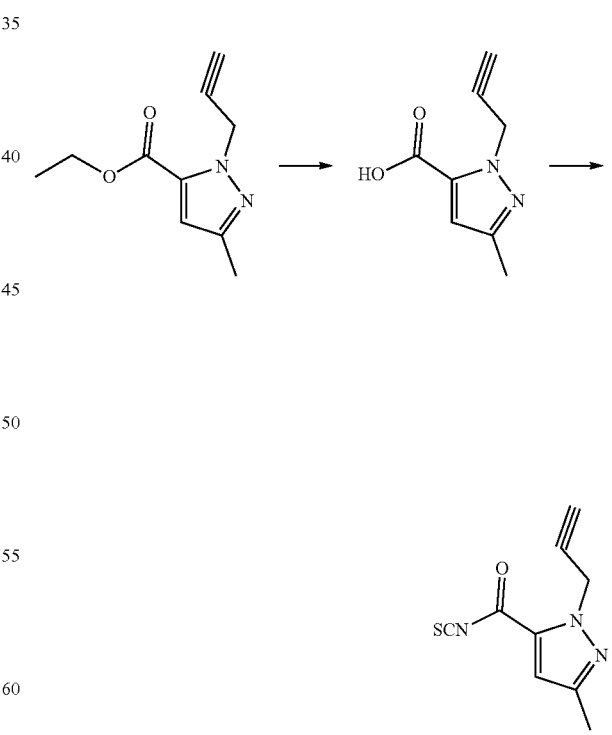

The operation procedures and reaction conditions were the same as those of intermediate compound 1, except that the raw material was ethyl 1-propargyl-3-methyl-1H-pyrazol-5-carboxylate, MS (ESI) m/z=206[M+H]$^+$.

Synthesis of Intermediate Compound 3

1-allyl-3-methyl-1H-pyrazol-5-carbonylisothiocyanate

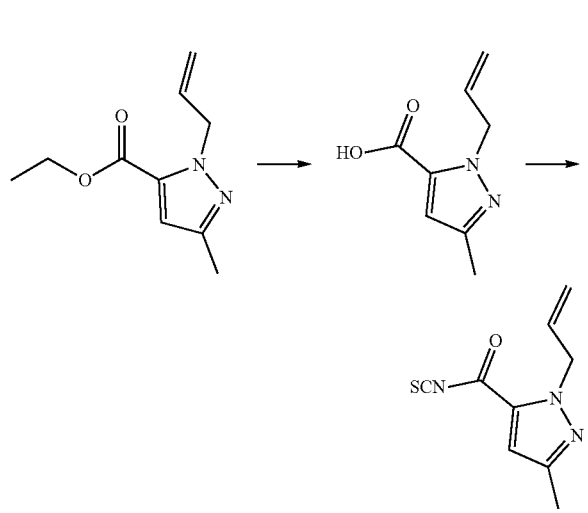

The operation procedures and reaction conditions were the same as those of intermediate compound 1, except that the raw material was ethyl 1-allyl-3-methyl-1H-pyrazol-5-carboxylate, MS (ESI) m/z=208[M+H]$^+$.

Synthesis of Intermediate Compound 4: 1-(cyclopropylmethyl)-3-methyl-1H-pyrazol-5-carbonyl isothiocyanate

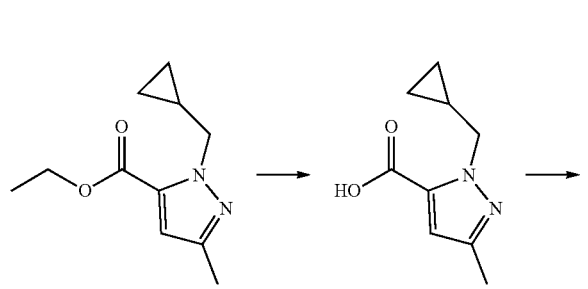

The operation procedures and reaction conditions were the same as those of intermediate compound 1, except that the raw material was ethyl 1-(cyclopropylmethyl)-3-methyl-1H-pyrazole-5-carboxylate, MS (ESI) m/z=222[M+H]$^+$.

Synthesis of Intermediate Compound 5: 3-methyl-1-(2,2,2-trifluoroethyl)-1H-pyrazol-5-carbonylisothiocyanate

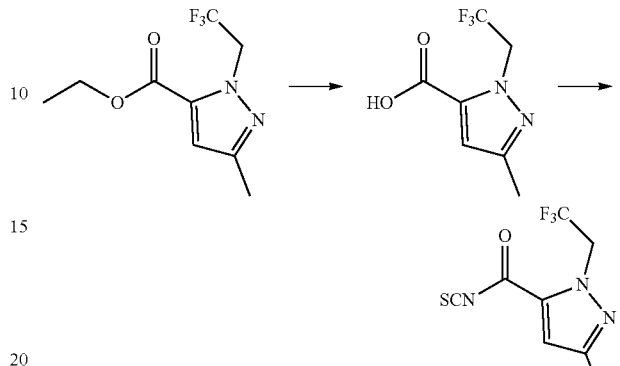

The operation procedures and reaction conditions were the same as those of intermediate compound 1, except that the raw material was ethyl 3-methyl-1-(2,2,2-trifluoroethyl)-1H-pyrazol-5-carboxylate, MS (ESI) m/z=250[M+H]$^+$.

Synthesis of Intermediate Compound 6

1-(2-fluoroethyl)-3-methyl-1H-pyrazol-5-carbonylisothiocyanate

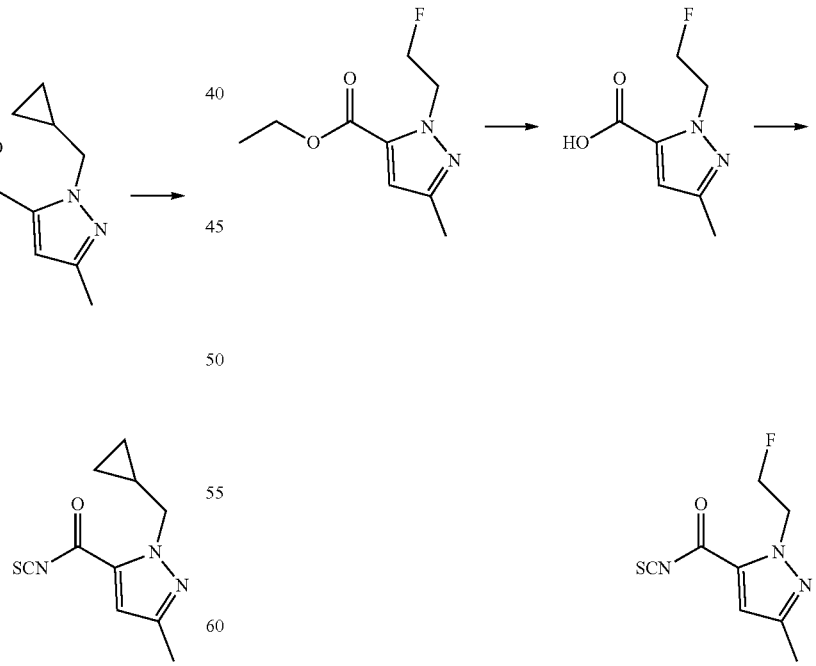

The operation procedures and reaction conditions were the same as those of intermediate compound 1, except that the raw material was ethyl 1-(2-fluoroethyl)-3-methyl-1H-pyrazol-5-carboxylate, MS (ESI) m/z=214[M+H]$^+$.

Synthesis of Intermediate Compound 7: 4-chloro-3-methoxy-5-nitrobenzamide

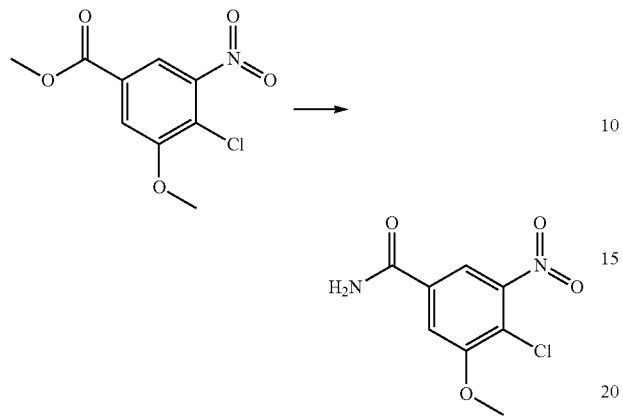

Methyl 4-chloro-3-methoxy-5-nitrobenzoate (4 g, 16.3 mmol) was dispersed in ammonia water (20 mL) solution, heated to 50° C., and reacted overnight. The next day, TLC monitored that the reaction was completed. The reaction was filtered by suction, washed with pure water (10 ml), to obtain intermediate compound 7 as a yellowish solid. $^1$H NMR (300 MHz, DMSO-$d_6$) δ 8.31 (s, 1H), 8.05 (d, J=2.1 Hz, 1H), 7.85 (d, J=21.0 Hz, 2H), 4.02 (d, J=2.1 Hz, 3H).

Synthesis of intermediate compound 8: 4-chloro-3-hydroxy-5-nitrobenzamide

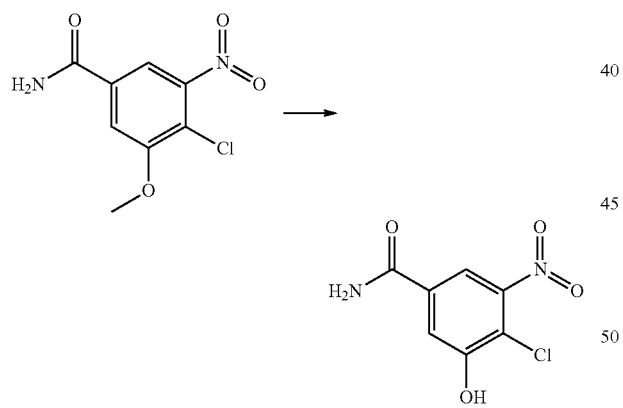

4-chloro-3-methoxy-5-nitrobenzamide (4 g, 8.67 mmol) was dispersed in dichloromethane (30 mL) solution, stirred at room temperature for 10 minutes. 1 M/L boron tribromide in dichloromethane solution (52 mL, 52 mmol) was slowly added into the above reaction solution, and continued stirring at room temperature overnight. The reaction was monitored by TLC until it was completed. The above reaction solution was slowly added into ice water (100 mL). After addition, the reaction solution was continued to be stirred for two hours, filtered by suction to obtain intermediate compound 8 as a gray-white solid. $^1$H NMR (300 MHz, DMSO-$d_6$) δ 11.51 (s, 1H), 8.16 (s, 1H), 7.92 (s, 1H), 7.72 (s, 1H), 7.65 (s, 1H).

Synthesis of Intermediate Compound 9: 3-(3-((tert-butyldimethylsilyl)oxy) propoxy)-4-chloro-5-nitrobenzamide

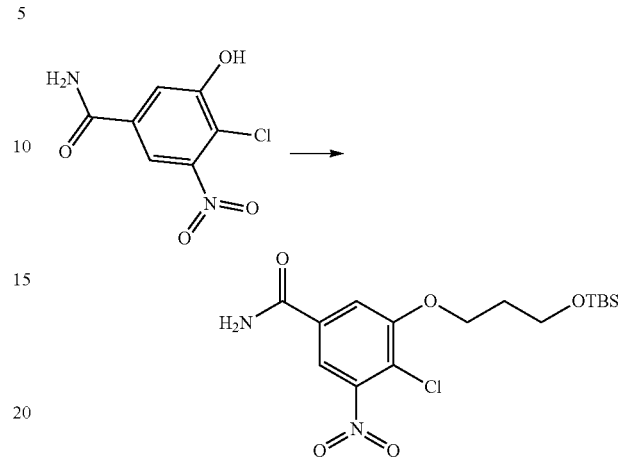

4-chloro-3-hydroxy-5-nitrobenzamide (1 g, 4.62 mmol) was dissolved in N-dimethylformamide (10 mL) solution, and then (3-bromopropoxy) (tert-butyl) dimethylsilane (1.29 mL, 5.54 mmol) and potassium carbonate (0.83 g, 6.0 mmol) were added to the above solution, respectively. The reaction solution was stirred at room temperature for ten minutes, and the temperature was heated to 80° C. under oil bath and reacted overnight. The reaction was monitored by TLC until it was completed. The above reaction solution was added into water (20 mL), and ethyl acetate (20 mL) was added. The organic phase was separated, extracted twice with ethyl acetate (20 mL) again, the organic phases were combined, and dried over anhydrous sodium sulfate. It was concentrated under reduced pressure to make sand, separated and purified by column chromatography (petroleum ether: ethyl acetate=8:1-3:1) to obtain intermediate compound 9 as a white solid. $^1$H NMR (400 MHz, DMSO) δ 8.30 (s, 1H), 8.09-7.98 (m, 1H), 7.88 (t, J=9.0 Hz, 1H), 7.79 (s, 1H), 4.30 (t, J=5.9 Hz, 2H), 3.80 (dd, J=7.8, 4.2 Hz, 2H), 1.97 (dd, J=12.0, 6.0 Hz, 2H), 0.84 (s, 9H), 0.07-0.04 (m, 6H).

Synthesis of Intermediate Compound 10: 4-chloro-3-nitro-5-(oxetan-3-yloxy)benzamide

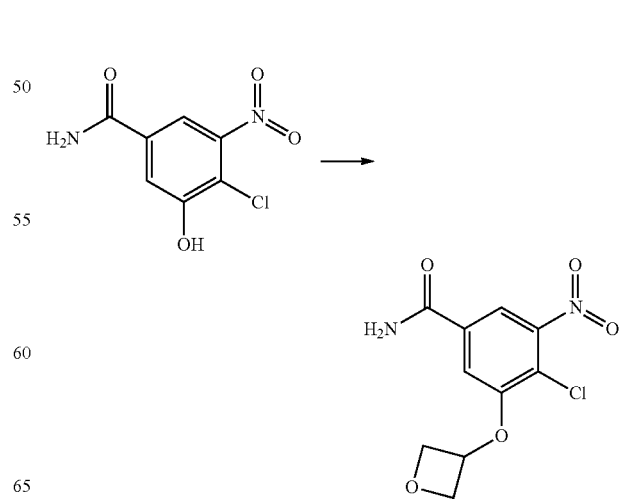

4-chloro-3-hydroxy-5-nitrobenzamide (1 g, 4.62 mmol) was dissolved in N.N-dimethylformamide (10 mL) solution, and then 3-iodoxetane (0.48 mL, 5.54 mmol) and potassium carbonate (1.28 g, 9.23 mmol) were added to the above solution, respectively. After stirring at room temperature for 10 minutes, the reaction solution was transferred to an oil bath to be heated up to 80° C., and reacted overnight. The reaction was monitored by TLC until it was completed. The above reaction solution was added into water (20 mL), and ethyl acetate (20 mL) was added. The organic phase was separated, extracted twice with ethyl acetate (20 mL) again, the organic phases were combined, and dried over anhydrous sodium sulfate. It was concentrated under reduced pressure to make sand, separated and purified by column chromatography (petroleum ether: ethyl acetate=8:1-3:1) to obtain intermediate compound 10 as a yellow solid. $^1$H NMR (400 MHz, DMSO) δ 8.29 (s, 1H), 8.11 (d, J=1.7 Hz, 1H), 7.89-7.78 (m, 1H), 7.45 (d, J=1.6 Hz, 1H), 5.56 (dt, J=10.3, 5.2 Hz, 1H), 5.00 (dd, J=13.4, 7.4 Hz, 2H), 4.63 (dd, J=7.4, 4.6 Hz, 2H).

Synthesis of intermediate compound 11: 4-chloro-2-hydroxy-5-nitrobenzamide

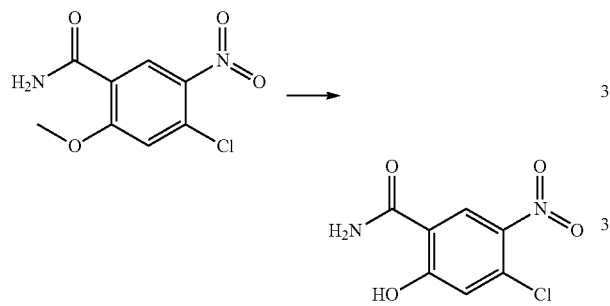

4-chloro-2-methoxy-5-nitrobenzamide (4 g, 8.67 mmol) was dispersed in dichloromethane (30 mL) solution, stirred at room temperature for 10 minutes. 1 M/L boron tribromide in dichloromethane solution (52 mL, 52 mmol) was slowly added into the above reaction solution, and continued stirring at room temperature overnight. The reaction was monitored by TLC until it was completed. The above reaction solution was slowly added into ice water (100 mL). After addition, the reaction solution was continued to be stirred for two hours, filtered by suction to obtain intermediate compound 11 as a gray-white solid. $^1$H NMR (400 MHz, DMSO) δ 14.11 (s, 1H), 8.77 (s, 1H), 8.69 (s, 1H), 8.33 (s, 1H), 7.27 (s, 1H).

Synthesis of Intermediate Compound 12

4-chloro-2-methyl-5-nitrobenzofuran-7-formamide

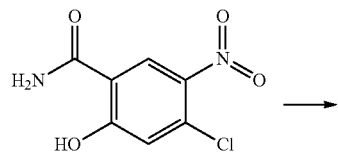

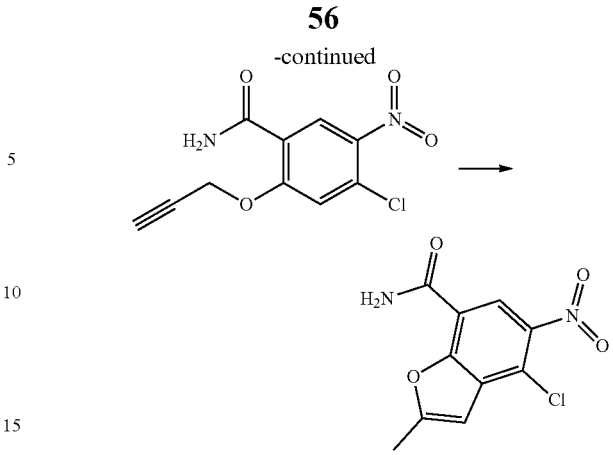

4-chloro-2-hydroxy-5-nitrobenzamide (2.4 g, 11.08 mmol) was dissolved in N,N-dimethylformamide (10 mL) solution, stirred at room temperature, then 3-bromopropyne (1.04 mL, 13.3 mmol) and potassium carbonate (3.06 g, 22.16 mmol) were added to the above reaction solution. The reaction solution was transferred to an oil bath to be heated to 80° C., and reacted overnight. The reaction was monitored by TLC until it was completed. The reaction solution was cooled to room temperature, and then the reaction solution was added into water (50 mL), stirred at room temperature, and filtered by suction to obtain a light yellow solid for the next reaction. $^1$H NMR (400 MHz, DMSO) δ 8.42 (s, 1H), 7.91 (s, 1H), 7.76 (s, 1H), 7.57 (s, 1H), 5.16 (s, 2H), 3.79 (d, J=2.1 Hz, 1H).

2-(propargyloxy)-4-chloro-5-nitrobenzamide (0.7 g, 2.75 mmol) was dissolved in N,N-diethylaniline (10 mL) solution, cesium fluoride (0.63 g, 4.12 mmol) was added, stirred at room temperature for 10 minutes, and then transferred to an oil bath to be heated to 220° C. After the reaction solution was reacted for 4 hours, TLC monitor showed that the reaction was completed. The reaction solution was cooled to room temperature, ethyl acetate (30 mL) was added to dilute the reaction solution, and then washed several times with 1 M dilute hydrochloric acid solution, and dried over anhydrous sodium sulfate. The reaction solution was distilled under reduced pressure and concentrated to make sand, and purified by column chromatography (petroleum ether: ethyl acetate=5:1-1:1) to obtain intermediate compound 12 as a light yellow solid. $^1$H NMR (400 MHz, DMSO) δ 8.29 (s, 1H), 8.07 (s, 1H), 7.95 (s, 1H), 6.97 (s, 1H), 2.57 (s, 3H).

Synthesis of Intermediate Compound 13

4-chloro-2-methyl-5-nitrobenzofuran-7-formamide

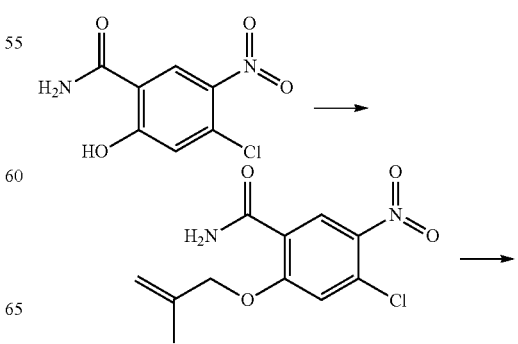

-continued

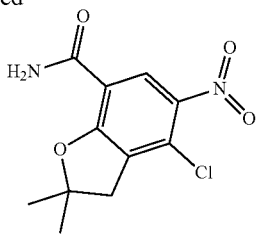

4-chloro-2-hydroxy-5-nitrobenzamide (2.4 g, 11.08 mmol) was dissolved in N,N-dimethylformamide (10 mL) solution, stirred at room temperature, then 3-bromo-2-methyl propylene (1.34 mL, 13.3 mmol) and potassium carbonate (3.06 g, 22.16 mmol) were added to the above reaction solution, transferred to an oil bath to be heated to 80° C., and reacted overnight. The reaction was monitored by TLC until it was completed. The reaction solution was cooled to room temperature, water (50 mL) was added, stirred at room temperature, and filtered by suction to obtain a light yellow solid for the next reaction. $^1$H NMR (300 MHz, DMSO-$d_6$) δ 8.53 (s, 1H), 7.83 (s, 2H), 6.53 (s, 1H), 5.20 (s, 1H), 5.00 (s, 1H), 4.50 (s, 2H), 3.76 (s, 3H), 1.81 (s, 3H).

4-chloro-2-((2-methylallyl) oxy)-5-nitrobenzamide (0.7 g, 2.59 mmol) was dissolved in N,N-diethylaniline (10 mL) solution, cesium fluoride (0.59 g, 3.88 mmol) was added, stirred at room temperature for 10 minutes, then transferred to an oil bath and heated to 220° C. After the reaction solution was reacted for 4 hours, TLC monitor showed that the reaction was completed. The reaction solution was cooled to room temperature, ethyl acetate (30 mL) was added to dilute the reaction solution, and then washed several times with 1 M dilute hydrochloric acid solution, and dried over anhydrous sodium sulfate. The reaction solution was distilled under reduced pressure and concentrated to make sand, and purified by column chromatography (petroleum ether: ethyl acetate=5:1-1:1) to obtain intermediate compound 13 as a light yellow solid. $^1$H NMR (300 MHz, DMSO-$d_6$) δ 8.52 (s, 1H), 7.48 (s, 2H), 3.81-3.72 (m, 3H), 2.89 (s, 2H), 1.49 (d, J=1.8 Hz, 6H).

Example 1

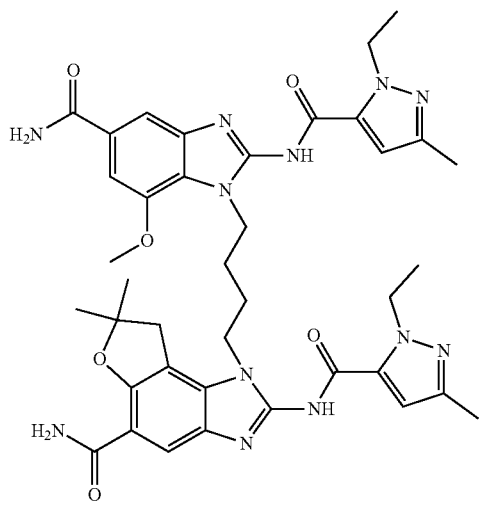

1

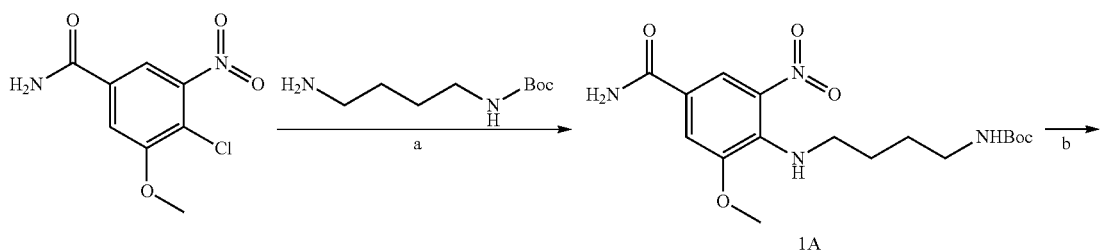

1A

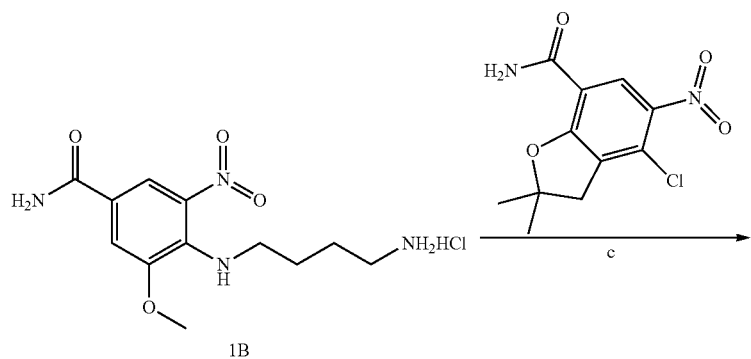
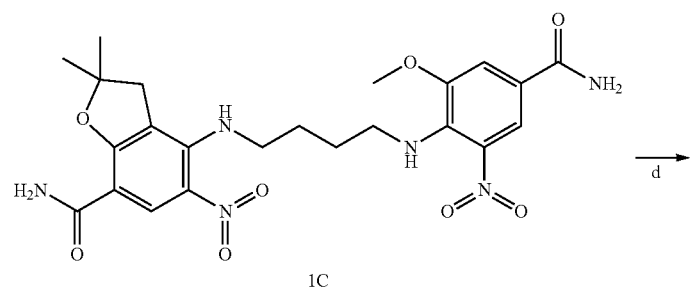
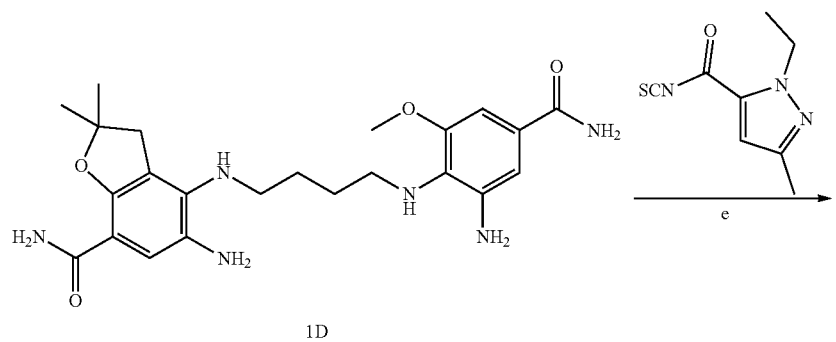
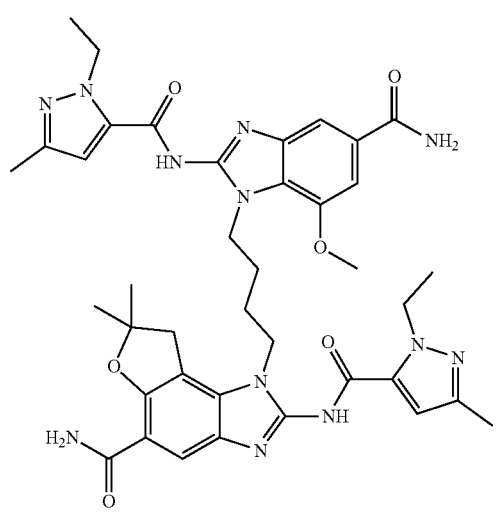

Step a: Synthesis of tert-butyl (4-((4-carbamoyl-2-methoxy-6-nitrophenyl)amino) butyl) carbamate 4-chloro-3-methoxy-5-nitrobenzamide (1 g, 4.34 mmol) was dissolved in n-butanol (10 mL) solution, stirred at room temperature, and then N-(tert-butoxycarbonyl)-1,4-diaminobutane (1.1 mL, 5.64 mmol) and N,N-diisopropylethylamine (2.15 mL, 13.0 mmol) were added to the above reaction solution. The temperature in the sealed tube was raised to 110° C., the reaction solution was reacted for 12 hours. The reaction was filtered by suction the next day, and washed with an appropriate amount of ethyl acetate to obtain tert-butyl (4-((4-carbamoy-2-methoxy-6-nitrophenyl) amino) butyl carbamate (compound 1A) as a light yellow solid with a yield of 89%. $^1$H NMR (300 MHz, DMSO-$d_6$) δ 8.23-8.17 (m, 1H), 8.02 (s, 1H), 7.72 (d, J=5.9 Hz, 1H), 7.55 (s, 1H), 7.33 (s, 1H), 6.81 (s, 1H), 3.92-3.86 (m, 3H), 3.46 (d, J=6.3 Hz, 2H), 2.89 (d, J=6.4 Hz, 2H), 1.49 (s, 4H), 1.37-1.32 (in, 9H).

Step b: Synthesis of 4-((4-aminobutyl)amino)-3-methoxy-5-nitrobenzamide hydrochloride Compound 1A (2 g, 5.23 mmol) was dispersed in ethyl acetate (20 mL) solution, stirred under an ice bath for 10 minutes, and the newly prepared HCl gas was introduced into the above solution to saturation. After continuing reacting for 10 minutes under the ice bath, the ice bath was removed, and the reaction solution was reacted at room temperature for 2 hours. The reaction was monitored by TLC until it was completed. Ethyl acetate was removed by distilling under reduced pressure. Ether (15 mL) was added to the residue, stirred at room temperature for two hours, and filtered by suction to obtain 4-((4-aminobutyl)amino)-3-methoxy-5-nitrobenzamide hydrochloride (compound 1B) as a reddish-brown solid with a yield of 93%. $^1$H NMR (300 MHz, DMSO-$d_6$) δ 8.21 (dd, J=3.9, 2.0 Hz, 1H), 8.04 (s, 1H), 7.73 (s, 1H), 7.57 (d, J=3.0 Hz, 1H), 7.34 (s, 1H), 3.89 (d, J=4.0 Hz, 3H), 3.50 (s, 2H), 2.78 (s, 2H), 1.61-1.51 (in, 4H).

Step c: Synthesis of 4-((4-(4-carbamoyl-2-methoxy-6-nitrophenyl) amino) butyl) amino)-2,2-dimethyl-5-nitro-2,3-dihydrobenzofuran-7-formamide The compound 4-((4-aminobutyl)amino)-3-methoxy-5-nitrobenzamide hydrochloride (1 g, 3.14 mmol) was dissolved in n-butanol (10 mL) solution, and stirred at room temperature. Then 4-chloro-2,2-dimethyl-5-nitro-2,3-dihydrobenzofuran-7-formamide (1.02 g, 3.76 mmol) and N,N-diisopropylethylamine (1.56 mL, 9.41 mmol) was added into the above reaction solution. The temperature in the sealed tube was raised to 110° C., and the reaction solution was reacted for 12 hours. The reaction was filtered by suction the next day, and washed with an appropriate amount of ethyl acetate to obtain 4-((4-((4-carbamoyl-2-methoxy-6-nitrophenyl) amino) butyl) amino)-2,2-dimethyl-5-nitro-2,3-dihydrobenzofuran-7-formamide (compound 1C) as a reddish-brown solid with a yield of 81%. $^1$H NMR (300 MHz, DMSO-$d_6$) δ 8.56 (s, 1H), 8.35 (s, 1H), 8.17 (s, 1H), 8.02 (s, 1H), 7.78 (s, 1H), 7.61 (s, 1H), 7.53 (s, 1H), 7.33 (s, 1H), 7.14 (s, 1H), 3.87 (s, 3H), 3.53 (s, 4H), 3.31 (s, 2H), 1.58 (d, J=7.2 Hz, 4H), 1.50 (s, 6H).

Step d: Synthesis of 5-amino-4-((4-((2-amino-4-carbamoyl-6-methoxyphenyl) amino) butyl) amino)-2,2-dimethyl-2,3-dihydrobenzofuran-7-formamide Compound 1C (1 g, 1.94 mmol) was dispersed in methanol (30 mL) solution, sodium dithionite (3.37 g, 19.36 mmol) and ammonia (2 mL) were added to the above reaction solution, stirred at room temperature for 10 minutes. Then the reaction solution was transferred to an oil bath to be heated up to 60° C., and reacted for 4 hours. The reaction was monitored by TLC until it was completed. The reaction solution was filtered by suction, and the filter cake was washed with methanol. The collected filtrates were combined. It was distilled under reduced pressure and concentrated to make sand, separated and purified by column chromatography (dichloromethane: methanol=30: 1-7: 1) to obtain 5-amino-4-((4-((2-amino-4-carbamoyl-6-methoxyphenyl) amino) butyl) amino)-2,2 dimethyl-2,3-dihydrobenzofuran-7-formamide (compound 1D) as a light yellow solid with a yield of 63%. $^1$H NMR (300 MHz, DMSO-$d_6$) δ 7.61 (s, 1H), 6.97 (d, J=15.0 Hz, 4H), 6.85 (s, 1H), 6.78 (s, 1H), 4.64 (s, 2H), 4.05 (s, 2H), 3.73 (s, 3H), 3.20 (s, 2H), 3.05 (s, 2H), 2.94 (s, 2H), 1.49 (s, 4H), 1.39 (d, J=6.0 Hz, 6H).

Step e: Synthesis of 1-(4-(5-carbamoyl-2-(1-ethyl-3-methyl-1H-pyrazol-5-formamido)-7-methoxy-1H-benzo[d]imidazol-1-yl)butyl)-2-(1-ethyl-3-methyl-1H-pyrazol-5-formamido)-7,7-dimethyl-7,8-dihydro-1H-benzofuran[4,5-d]imidazol-5-formamide Compound 1D (0.55 g, 1.2 mmol) was dissolved in N,N-dimethylformamide (5 mL) solution, a solution of 0.4 M 1-ethyl-3-methyl-1H-pyrazol-5-carbonyl isothiocyanate in dioxane (4 mL, 1.6 mmol) was added, and stirred under ice bath for 10 minutes, another 0.4 M solution of 1-ethyl-3-methyl-1H-pyrazol-5-carbonyl isothiocyanate in dioxane (1 mL, 0.4 mmol) was added, and after stirring for fifteen minutes under an ice bath, another 0.4 M solution of 1-ethyl-3-methyl-1H-pyrazol-5-carbonyl isothiocyanate in dioxane (1 mL, 0.4 mmol) was added, and the reaction was continued to react under an ice bath for half an hour, then 1-ethyl-(3-dimethylaminopropyl) carbodiimide hydrochloride (0.58 mg, 3.01 mmol) and triethylamine (1 mL, 7.23 mmol) were added. The reaction solution was continued to be stirred for ten minutes under an ice bath, and then transferred to room temperature to react overnight. The reaction was monitored by TLC until it was completed. The reaction solution was slowly added into water (20 mL), and a white insoluble substance was precipitated. It was filtered by suction, and the filter cake was collected and dried, separated and purified by column chromatography (dichloromethane: methanol=20: 1-5: 1) to obtain 1-(4-(5-carbamoyl-2-(1-ethyl-3-methyl-1H-pyrazol-5-formamido)-7-methoxy-1H-benzo[d]imidazol-1-yl)butyl)-2-(1-ethyl-3-methyl-1H-pyrazol-5-formamido)-7,7-dimethyl-7,8-dihydro-1H-benzofur an [4,5-d]imidazol-5-formamide (Example Compound 1), as a gray-white solid with a yield of 78%. ESI-MS (m/z): 779.37[M+H]$^+$; $^1$H NMR (300 MHz, DMSO-$d_6$) δ 12.84 (s, 1H), 12.66 (s, 1H), 8.01 (s, 1H), 7.81 (s, 1H), 7.63 (s, 2H), 7.36 (s, 3H), 6.59 (s, 2H), 4.57 (s, 4H), 4.39 (s, 2H), 4.18 (s, 2H), 3.89 (s, 3H), 3.27 (s, 2H), 2.09 (s, 6H), 1.89 (s, 2H), 1.77 (s, 2H), 1.45 (s, 6H), 1.30 (s, 6H)

Example 2
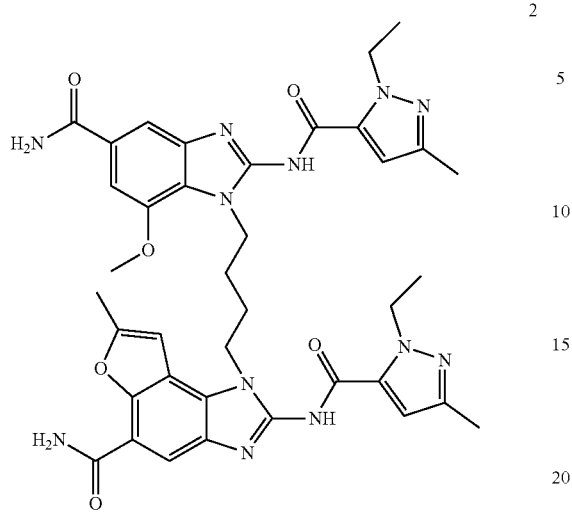
The operation procedures and reaction conditions were the same as those of Example 1, except that the raw material in step c was 4-chloro-2-methyl-5-nitrobenzofuran-7-formamide as a light yellow solid with a yield of 68%. ESI-MS (m/z): 763.34[M+H]$^+$; $^1$H NMR (300 MHz, DMSO-d$_6$) δ 12.85 (s, 1H), 12.70 (s, 1H), 7.98 (d, J=18.0 Hz, 2H), 7.82 (s, 2H), 7.65 (s, 1H), 7.54 (s, 1H), 7.39 (s, 1H), 7.30 (s, 1H), 6.90 (s, 1H), 6.61 (s, 1H), 6.54 (s, 1H), 4.56 (s, 4H), 4.39 (s, 2H), 4.31 (s, 2H), 3.81 (s, 3H), 2.10 (d, J=10.4 Hz, 6H), 1.88 (s, 4H), 1.30 (d, J=8.0 Hz, 6H).
Example 3
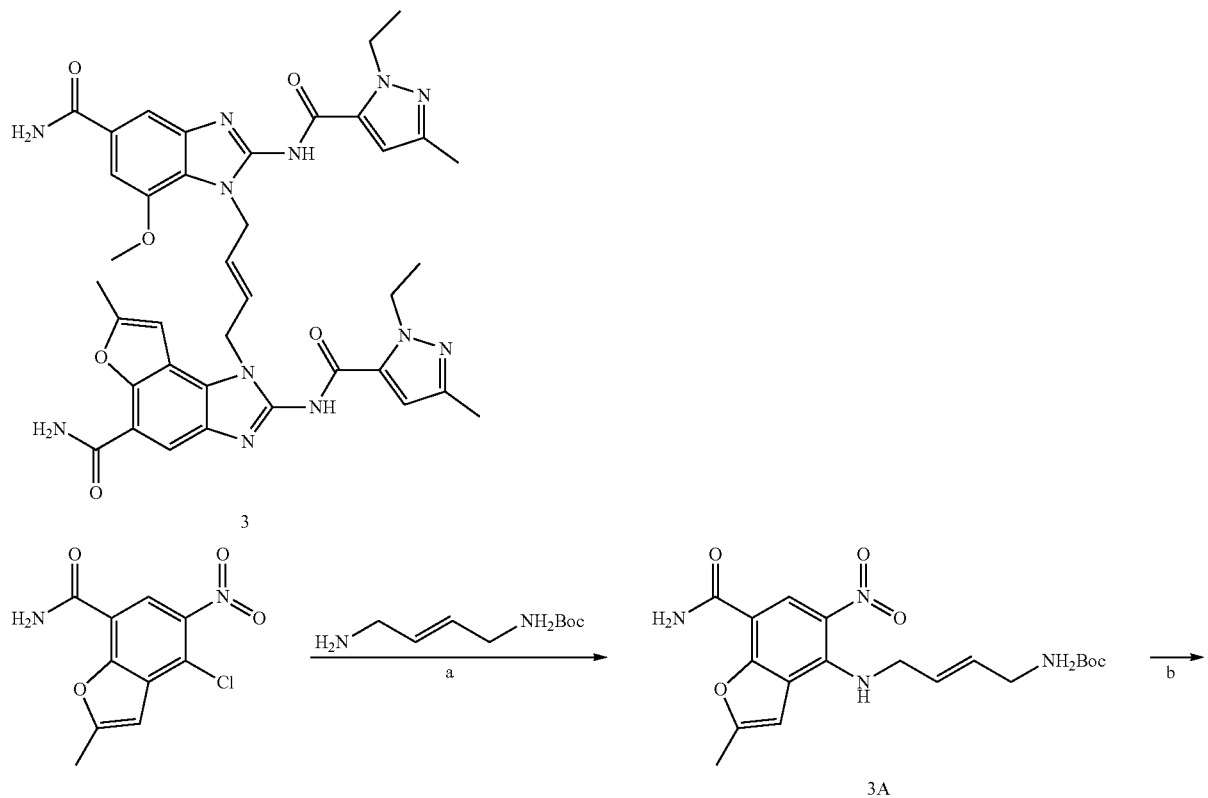

-continued
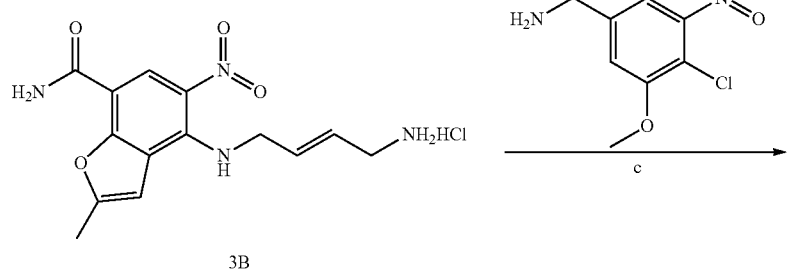
3B
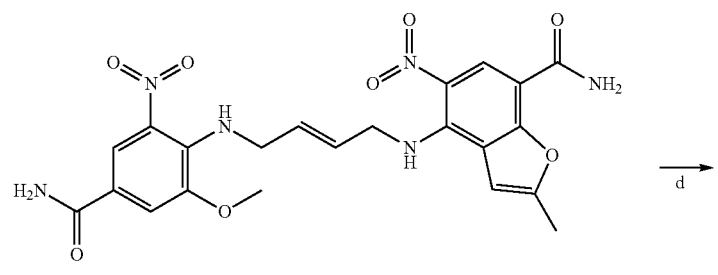
3C
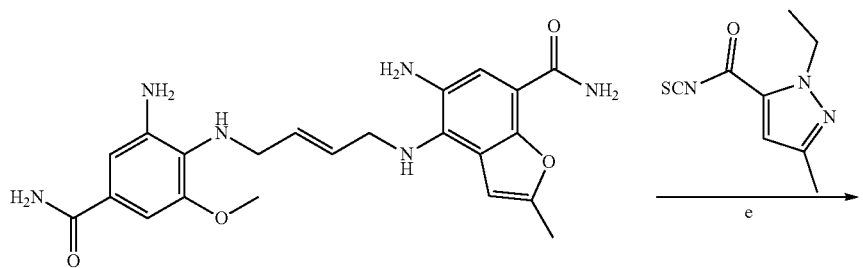
3D
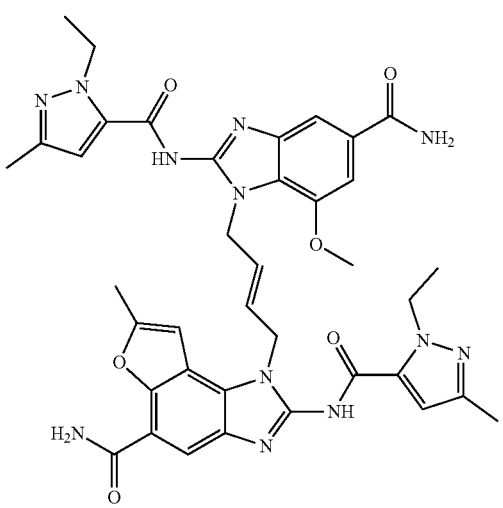
3

Step a: Synthesis of tert-butyl (E)-(4-((7-carbamoyl-2-methyl-5-nitrobenzofuran-4-yl)amino) but-2-ene-1-yl) carbamate Compound 4-chloro-2-methyl-5-nitrobenzofuran-7-formamide (1 g, 3.93 mmol) was dissolved in n-butanol (10 mL) solution, and stirred at room temperature, and then tert-butyl (E)-(4-aminobutan-2-en-1-yl) carbamate (0.88 g, 4.71 mmol) and N,N-diisopropylethylamine (2.06 mL, 11.78 mmol) were added to the above reaction solution. The temperature in the sealed tube was raised to 110° C., the reaction solution was reacted for 12 hours. The reaction solution was filtered by suction the next day, and washed with an appropriate amount of ethyl acetate to obtain tert-butyl (E)-(4-((7-carbamoyl-2-methyl-5-nitrobenzofuran-4-yl)amino) but-2-en-1-yl) carbamate (compound 3A) as a reddish-brown solid with a yield of 69%. $^1$H NMR (300 MHz, DMSO) δ 9.08 (s, 1H), 8.53 (s, 1H), 7.63 (d, J=52.0 Hz, 2H), 7.04 (s, 2H), 5.83-5.62 (m, 2H), 4.36 (s, 2H), 4.11 (s, 2H), 2.48 (s, 3H), 1.37 (s, 9H).

Step b: Synthesis of (E)-4-((4-aminobutan-2-ene-1-yl)amino)-2-methyl-5-nitrobenzofuran-7-formamide hydrochloride Compound 1A (1.6 g, 3.93 mmol) was dispersed in ethyl acetate (20 mL) solution, stirred under an ice bath for 10 minutes, and the newly prepared HCl gas was introduced into the above solution to saturation. After continuing reacting for 10 minutes under the ice bath, the ice bath was removed and reacted at room temperature for 2 hours. The reaction was monitored by TLC until it was completed. Ethyl acetate was removed by distilling under reduced pressure. Ether (15 mL) was added to the residue, stirred at room temperature for two hours, and filtered by suction to obtain (E)-4-((4-aminobutan-2-ene-1-yl)amino)-2-methyl-5-nitrobenzofuran-7-formamide hydrochloride (compound 1B) as a reddish-brown solid with a yield of 93%. $^1$H NMR (300 MHz, DMSO) δ 9.13 (s, 1H), 8.54 (s, 1H), 7.95 (s, 3H), 7.66 (d, J=53.1 Hz, 2H), 7.02 (s, 1H), 6.09 (d, J=15.5 Hz, 1H), 5.82-5.64 (m, 1H), 4.43 (s, 2H), 3.18 (s, 2H), 2.49 (s, 3H).

Step c: Synthesis of (E)-4-((4-((4-carbamoyl-2-methoxy-6-nitrophenyl) amino) butyl-2-en-1-yl) amino)-2-methyl-5-nitrobenzofuran-7-formamide Compound 3B (1 g, 2.93 mmol) was dissolved in n-butanol (10 mL) solution, stirred at room temperature, and then 4-chloro-3-methoxy-5-nitrobenzamide (0.812 g, 3.52 mmol) and N,N-diisopropylethylamine (1.54 mL, 8.8 mmol) were added to the above reaction solution. The temperature in the sealed tube was raised to 110° C., and the reaction solution was reacted for 12 hours. The reaction solution was filtered by suction the next day, and washed with an appropriate amount of ethyl acetate to obtain (E)-4-((4-((4-carbamoyl-2-methoxy-6-nitrophenyl)amino) but-2-en-1-yl)amino)-2-methyl-5-nitrobenzofuran-7-formamide (compound 3C) as a reddish-brown solid with a yield of 69%. $^1$H NMR (400 MHz, DMSO) δ 9.06 (t, J=5.9 Hz, 1H), 8.51 (s, 1H), 8.15 (s, 1H), 8.03 (s, 1H), 7.76 (t, J=5.8 Hz, 1H), 7.70 (s, 1H), 7.51 (s, 2H), 7.34 (s, 1H), 6.91 (s, 1H), 5.81-5.73 (m, 2H), 4.32 (s, 2H), 4.13 (s, 2H), 3.81 (s, 3H), 2.41 (s, 3H).

Step d: Synthesis of (E)-5-amino-4-((4-((2-amino-4-carbamoyl-6-methoxyphenyl)amino) but-2-en-1-yl) amino)-2-methylbenzofuran-7-formamide Compound 3C (1 g, 2.01 mmol) was dispersed in methanol (30 mL) solution, sodium dithionite (3.49 g, 20.06 mmol) and ammonia (2 mL) were added to the above reaction solution, stirred at room temperature for 10 minutes. Then the reaction solution was transferred to an oil bath to be heated to 60° C. and reacted for 4 hours. The reaction was monitored by TLC until it was completed. The reaction solution was filtered by suction, and the filter cake was washed with methanol. The collected filtrates were combined. It was distilled under reduced pressure and concentrated to make sand, separated and purified by column chromatography (dichloromethane: methanol=30: 1-7: 1) to obtain (E)-5-amino-4-((4-((2-amino-4-carbamoyl-6-methoxyphenyl)amino) but-2-en-1-yl)amino)-2-methylbenzofuran-7-formamide (compound 3D) as a light yellow solid with a yield of 62%. $^1$H NMR (400 MHz, DMSO) δ 7.62 (s, 1H), 7.28 (s, 1H), 7.15 (s, 1H), 7.10 (s, 1H), 6.97 (s, 1H), 6.86 (d, J=1.8 Hz, 1H), 6.78 (d, J=1.8 Hz, 1H), 6.61 (d, J=1.0 Hz, 1H), 5.76 (s, 2H), 5.08 (t, J=5.9 Hz, 1H), 4.65 (s, 2H), 4.56 (s, 1H), 4.10 (d, J=5.2 Hz, 1H), 3.98 (s, 2H), 3.71 (s, 3H), 3.55 (s, 2H), 3.37 (s, 1H), 2.38 (s, 3H).

Step e: Synthesis of (E)-1-(4-(5-carbamoyl-2-(1-ethyl-3-methyl-1H-pyrazol-5-formamido)-7-methoxy-1H-benzo[d]imidazol-1-yl) but-2-en-1-yl)-2-(1-ethyl-3-methyl-1H-pyrazol-5-formamido)-7-methyl-1H-benzofuran[4,5-d]imidazol-5-formamide The operation procedures and reaction conditions were the same as those of step e in Example 1, except that the raw material was compound 3D, as a light yellow solid with a yield of 70%. ESI-MS (m/z): 761.32[M+H]$^+$; $^1$H NMR (300 MHz, DMSO-d$_6$) δ 12.91 (s, 1H), 12.82 (s, 1H), 8.00 (s, 1H), 7.88 (s, 1H), 7.81 (s, 1H), 7.64 (s, 1H), 7.53 (s, 1H), 7.38 (s, 1H), 7.24 (s, 1H), 6.67 (s, 1H), 6.58 (s, 1H), 6.44 (s, 1H), 5.83 (s, 2H), 4.97 (s, 2H), 4.85 (s, 2H), 4.52 (s, 4H), 3.60 (s, 3H), 2.29 (s, 3H), 2.11 (d, J=13.0 Hz, 6H), 1.26 (s, 6H).

Example 4

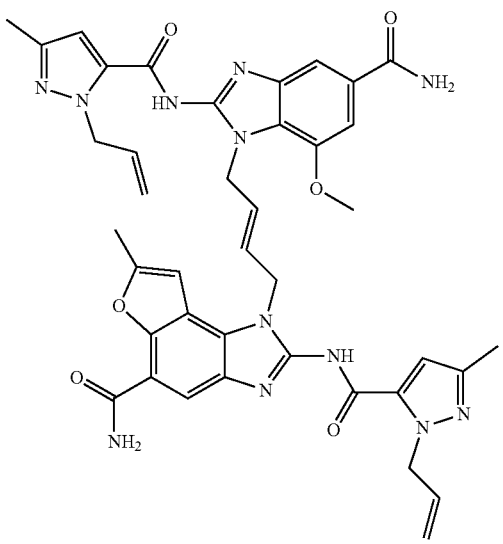

The operation procedures and reaction conditions were the same as those of Example 3, except that the raw material was 1-allyl-3-methyl-1H-pyrazol-5-carbonylisothiocyanate, as a light yellow solid with a yield of 66%. ESI-MS (m/z): 785.4[M+H]$^+$; $^1$H NMR (400 MHz, DMSO) δ 12.84 (d, J=37.3 Hz, 2H), 7.99 (s, 1H), 7.90 (s, 1H), 7.79 (s, 1H), 7.65 (s, 1H), 7.53 (s, 1H), 7.35 (s, 1H), 7.25 (s, 1H), 6.66 (d, J=16.1 Hz, 2H), 6.50 (s, 1H), 6.04-5.89 (m, 3H), 5.85 (d, J=2.6 Hz, 2H), 5.17 (dd, J=25.3, 4.2 Hz, 4H), 5.01 (dd, J=10.5, 1.4 Hz, 4H), 4.88 (s, 4H), 3.61 (s, 3H), 2.31 (s, 3H), 2.15 (s, 3H), 2.11 (s, 3H).

Example 5

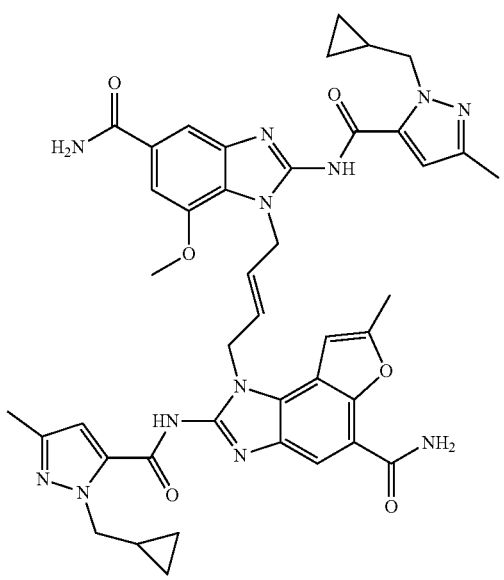

The operation procedures and reaction conditions were the same as those of Example 3, except that the raw material was 1-(cyclopropylmethyl)-3-methyl-1H-pyrazol-5-carbonylisothiocyanate, as a light yellow solid with a yield of 55%. ESI-MS (m/z):813.5[M+H]$^+$; $^1$H NMR (400 MHz, DMSO) δ 12.84 (d, J=37.5 Hz, 2H), 7.97 (s, 1H), 7.89 (s, 1H), 7.78 (s, 1H), 7.64 (s, 1H), 7.51 (s, 1H), 7.34 (s, 1H), 7.24 (s, 1H), 6.67 (s, 1H), 6.62 (s, 1H), 6.47 (s, 1H), 5.85 (d, J=4.1 Hz, 2H), 5.00 (s, 2H), 4.87 (s, 2H), 4.44 (d, J=6.8 Hz, 2H), 4.37 (d, J=6.7 Hz, 2H), 3.59 (s, 3H), 2.29 (s, 3H), 2.14 (s, 3H), 2.10 (s, 3H), 1.31 (dd, J=15.0, 6.7 Hz, 2H), 0.38 (t, J=8.1 Hz, 4H), 0.30 (dd, J=13.9, 4.1 Hz, 4H).

Example 6

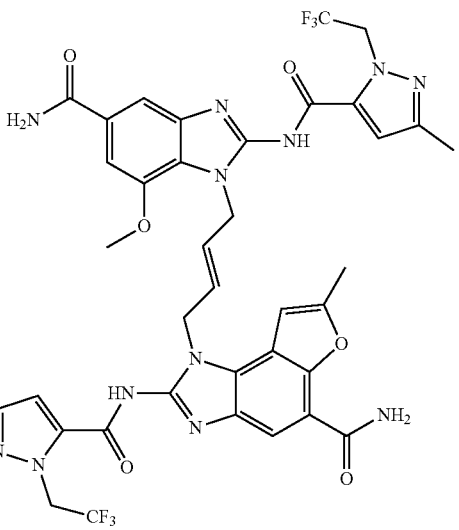

The operation procedures and reaction conditions were the same as those of Example 3, except that the raw material was 3-methyl-1-(2,2,2-trifluoroethyl)-1H-pyrazol-5-carbonylisothiocyanate, as a gray-white solid with a yield of 72%. ESI-MS (m/z): 867.3[M−H]$^−$; $^1$H NMR (400 MHz, DMSO) δ 12.93 (s, 1H), 12.83 (s, 1H), 7.99 (s, 1H), 7.90 (s, 1H), 7.81 (s, 1H), 7.67 (d, J=1.0 Hz, 1H), 7.53 (s, 1H), 7.37 (s, 1H), 7.26 (s, 1H), 6.77 (s, 1H), 6.66 (s, 1H), 6.57 (s, 1H), 5.88 (s, 2H), 5.60 (dd, J=17.8, 8.8 Hz, 2H), 5.56-5.48 (m, 2H), 5.02 (s, 2H), 4.89 (s, 3H), 3.60 (s, 3H), 2.28 (s, 3H), 2.18 (s, 3H), 2.12 (s, 3H).

Example 7

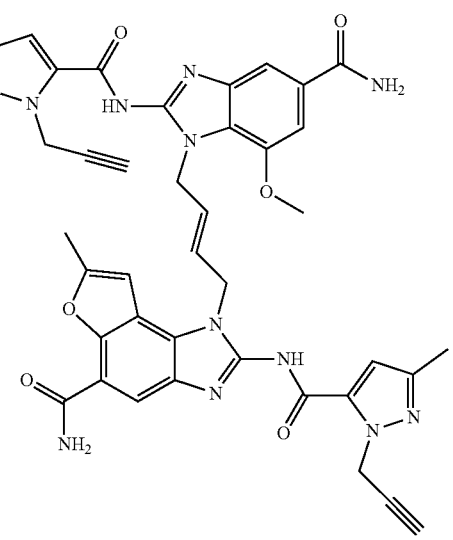

The operation procedure and reaction conditions were the same as those of Example 3, except that the raw material was 1-propargyl-3-methyl-1H-pyrazol-5-carbonylisothiocyanate, as a gray-white solid with a yield of 71%. ESI-MS (m/z):782.4[M+H]+; 1H NMR (300 MHz, DMSO) δ 12.92 (d, J=27.5 Hz, 1H), 8.04 (s, 1H), 7.92 (s, 1H), 7.84 (s, 1H), 7.68 (s, 1H), 7.56 (s, 1H), 7.41 (s, 1H), 7.25 (s, 1H), 6.69 (s, 2H), 6.53 (s, 1H), 5.91 (s, 2H), 5.43 (d, J=21.7 Hz, 4H), 4.99 (d, J=36.9 Hz, 4H), 3.60 (s, 3H), 3.27 (d, J=7.2 Hz, 2H), 2.30 (s, 3H), 2.19 (s, 3H), 2.14 (s, 3H).
Example 8
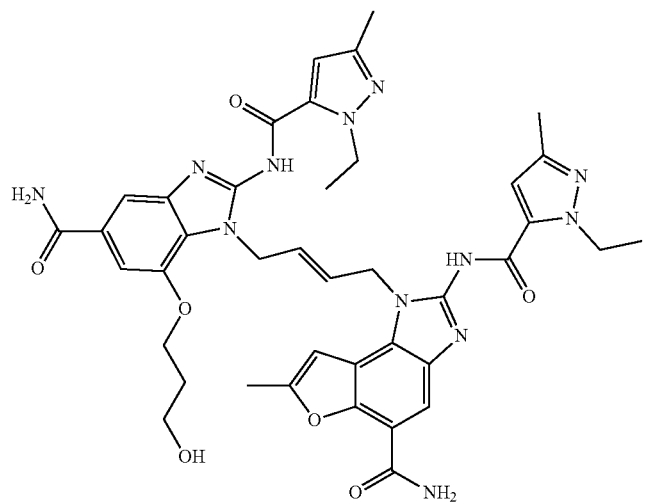
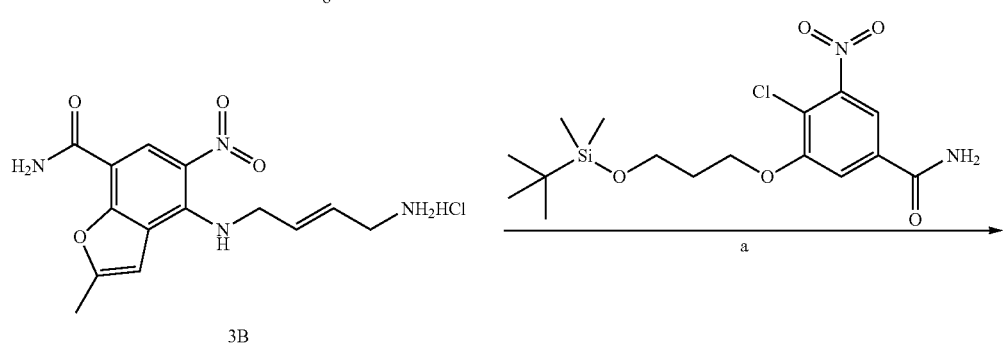
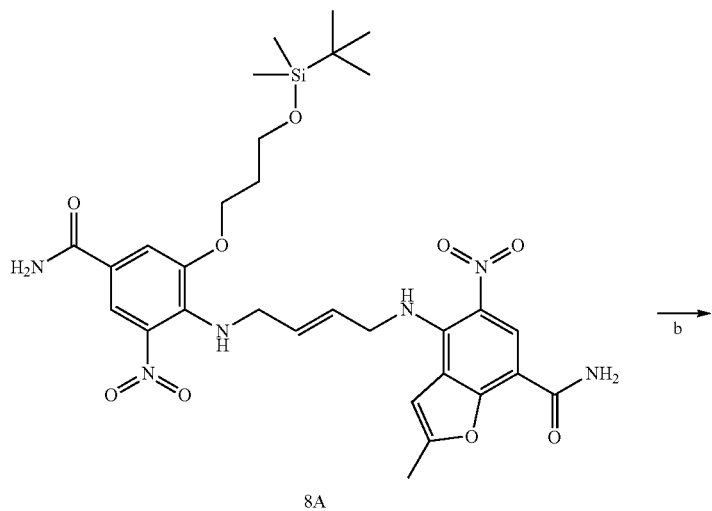

-continued
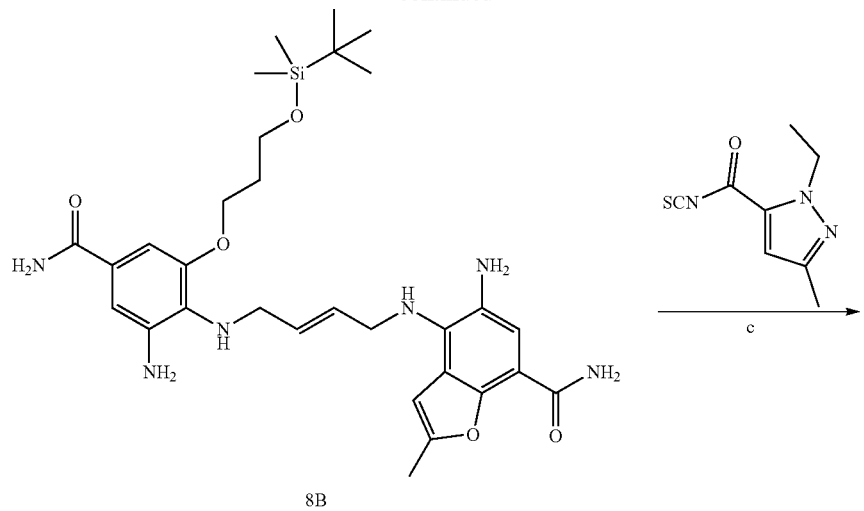
8B
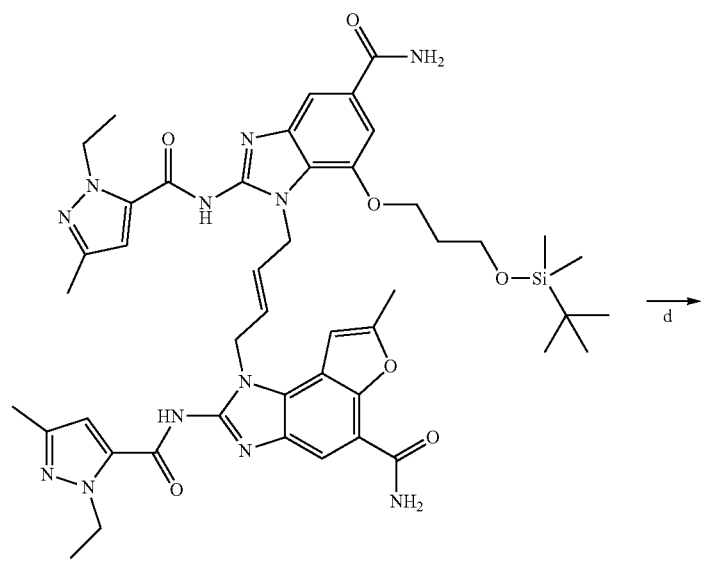
8C
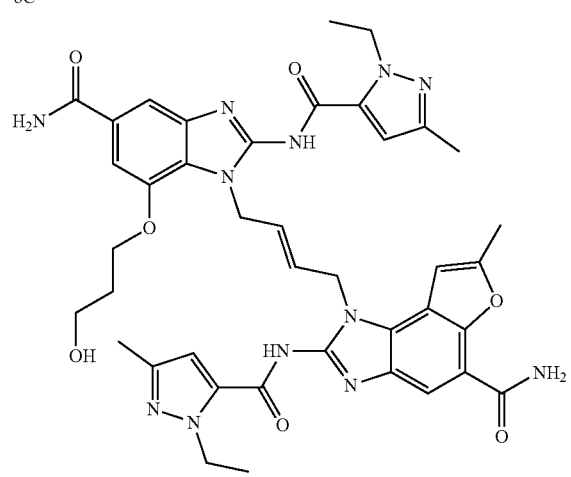
8

Step a: Synthesis of (E)-4-((4-((2-(3-((tert-butyldimethylsilyl)oxy) propoxy)-4-carbamoyl-6-nitrophenyl) amino) butyl-2-ene-1-yl) amino)-2-methyl-5-nitrobenzofuran-7-formamide Compound 3B (1 g, 2.93 mmol) was dissolved in n-butanol (10 mL) solution, stirred at room temperature, and then 3-(3-((tert-butyldimethylsilyl)oxy) propoxy)-4-chloro-5-nitrobenzamide (1.37 g, 3.52 mmol) and N,N-diisopropylethylamine (1.46 mL, 8.8 mmol) were added to the above reaction solution. The temperature in the sealed tube was raised to 110° C., and the reaction solution was reacted for 12 hours. The reaction solution was filtered by suction the next day, and washed with an appropriate amount of ethyl acetate to obtain (E)-4-((4-((2-((3-(tert-butyldimethylsilyl)oxy) propoxy)-4-carbamoyl-6-nitrophenyl)amino) but-2-ene-1-yl)amino)-2-methyl-5-nitrobenzofuran-7-formamide (compound 8A) as a reddish-brown solid with a yield of 66%. MS (ESI) m/z=657[M+H]$^+$.

Step b: Synthesis of (E)-5-amino-4-((4-((2-amino-6-(3-((tert-butyldimethylsilyl)oxy) propoxy)-4-carbamoylphenyl)amino) but-2-en-1-yl)amino)-2-methylbenzofuran-7-formamide Compound 8A (1 g, 1.52 mmol) was dispersed in methanol (30 mL) solution, sodium dithionite (2.65 g, 15.2 mmol) and ammonia (2 mL) were respectively added to the above reaction solution, stirred at room temperature for 10 minutes. Then the reaction solution was transferred to an oil bath to be heated to 60° C. and reacted for 4 hours. The reaction was monitored by TLC until it was completed. The reaction solution was filtered by suction, and the filter cake was washed with methanol. The collected filtrates were combined. It was distilled under reduced pressure and concentrated to make sand, separated and purified by column chromatography (dichloromethane: methanol=30: 1-7: 1) to obtain (E)-5-amino-4-((4-((2-amino-6-(3-((tert-butyldimethylsilyl)oxy) propoxy)-4-carbamoylphenyl)amino) but-2-en-1-yl)amino)-2-methylbenzofuran-7-formamide (compound 8B) as a light yellow solid with a yield of 61%. MS (ESI) m/z=597[M+H]$^+$.

Step c: synthesis of ((E)-1-(4-(7-(3-((tert-butyldimethylsilyl)oxy) propoxy)-5-carbamoyl-2-(1-ethyl-3-methyl-1H-pyrazol-5-formamido)-1H-benzo[d]imidazol-1-yl)but-2-ene-1-yl)-2-(1-ethyl-3-methyl-1H-pyrazol-5-formamido)-7-methyl-1H-benzofuran[4,5-d]imidazol-5-formamide The operation procedure and reaction conditions were the same as those of step e in Example 1, except that the raw material was compound 8B, as a light yellow solid with a yield of 58%. MS (ESI) m/z=919[M+H]$^+$ Step d: Synthesis of (E)-1-(4-(5-carbamoyl-2-(1-ethyl-3-methyl-1H-pyrazol-5-formamido)-7-(3-hydroxypropoxy)-1H-benzo[d]imidaziperazin-1-yl) but-2-ene-1-yl)-2-(1-ethyl-3-methyl-1H-pyrazol-5-formamido)-7-methyl-1H-benzofuran[4,5-d]imidazol-5-formamide Compound 8C (0.5 g, 0.54 mmol) was dispersed in a solution of 4 M HCl in dioxane (5 mL), and stirred at room temperature for 30 minutes. The reaction was monitored by TLC until it was completed. The solvent was removed by distilling under reduced pressure. Ether (5 mL) was added, and stirred at room temperature for 30 minutes. The reaction solution was filtered by suction, and the filter cake was collected, and dried to obtain (E)-1-(4-(5-carbamoyl-2-(1-ethyl-3-methyl-1H-pyrazol-5-formamido)-7-(3-hydroxypropoxy)-1H-benzo[d]imidaziperazin-1-yl) but-2-ene-1-yl)-2-(1-ethyl-3-methyl-1H-pyrazol-5-formamido)-7-methyl-1H-benzofuran[4,5-d]imidazol-5-formamide (Example Compound 8) as a gray-white solid with a yield of 89%. ESI-MS (m/z): 805.4[M+H]$^+$; $^1$H NMR (400 MHz, DMSO) δ 8.02 (s, 1H), 7.90 (s, 1H), 7.81 (s, 1H), 7.66 (s, 1H), 7.53 (s, 1H), 7.34 (s, 1H), 7.26 (s, 1H), 6.68 (s, 1H), 6.62 (s, 1H), 6.46 (s, 1H), 5.86 (s, 2H), 5.00 (s, 2H), 4.91 (s, 2H), 4.61-4.46 (m, 6H), 3.89 (t, J=6.1 Hz, 2H), 3.58 (s, 1H), 2.30 (s, 3H), 2.15 (s, 3H), 2.11 (s, 3H), 1.59-1.54 (m, 2H), 1.33-1.28 (m, 6H).

Example 9

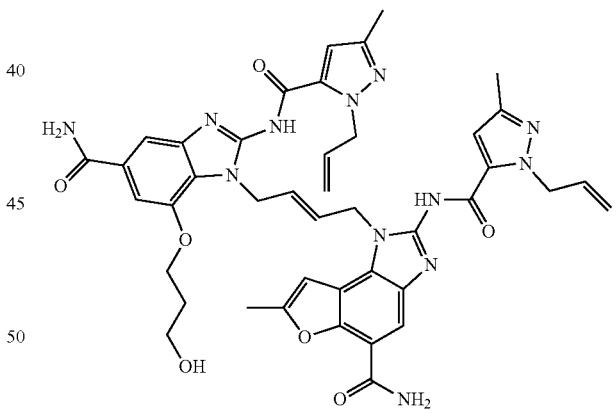

9

The operation procedures and reaction conditions were the same as those of Example 8, except that the raw material was 1-allyl-3-methyl-1H-pyrazol-5-carbonylisothiocyanate, as a gray-white solid with a yield of 88%. ESI-MS (m/z): 829.5[M+H]$^+$; $^1$H NMR (400 MHz, DMSO) δ 8.02 (s, 1H), 7.90 (s, 1H), 7.81 (s, 1H), 7.66 (s, 1H), 7.53 (s, 1H), 7.38 (d, J=10.0 Hz, 1H), 7.27 (s, 1H), 6.67 (d, J=3.6 Hz, 2H), 6.50 (s, 1H), 6.02-5.93 (m, 2H), 5.85 (s, 2H), 5.19 (d, J=3.9 Hz, 2H), 5.12 (d, J=3.8 Hz, 2H), 5.06-4.98 (m, 5H), 4.90 (d, J=10.4 Hz, 5H), 3.89 (s, 2H), 3.80 (s, 1H), 3.38 (d, J=8.6 Hz, 5H), 2.29 (s, 3H), 2.15 (s, 3H), 2.11 (s, 3H), 1.59-1.52 (m, 2H).

Example 10

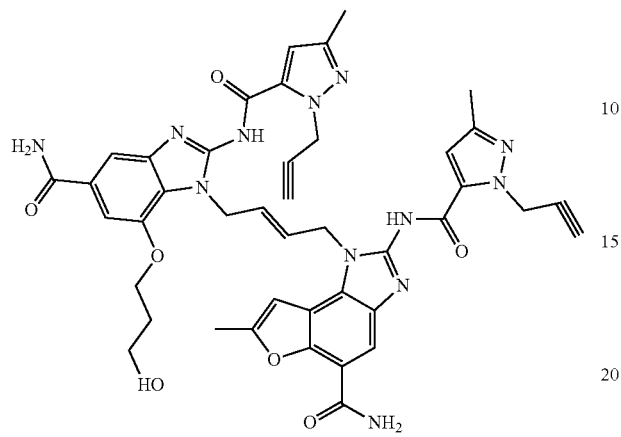

10

The operation procedures and reaction conditions were the same as those of Example 8, except that the raw material was 1-propargyl-3-methyl-1H-pyrazol-5-carbonylisothiocyanate, as a gray-white solid with a yield of 84%. ESI-MS (m/z):825.4[M+H]$^+$; $^1$H NMR (400 MHz, DMSO) δ 8.09-7.97 (m, 1H), 7.90 (s, 1H), 7.81 (s, 1H), 7.66 (s, 1H), 7.52 (s, 1H), 7.34 (s, 1H), 7.24 (s, 1H), 6.66 (d, J=9.1 Hz, 2H), 6.51 (s, 1H), 5.88 (s, 2H), 5.42 (s, 2H), 5.36 (s, 2H), 5.03 (s, 2H), 4.93 (s, 2H), 3.86 (d, J=6.0 Hz, 2H), 3.57 (s, 1H), 3.37 (d, J=5.9 Hz, 2H), 3.24 (d, J=2.0 Hz, 2H), 2.27 (s, 3H), 2.16 (s, 3H), 2.12 (s, 3H), 1.55-1.51 (m, 2H).

Example 11

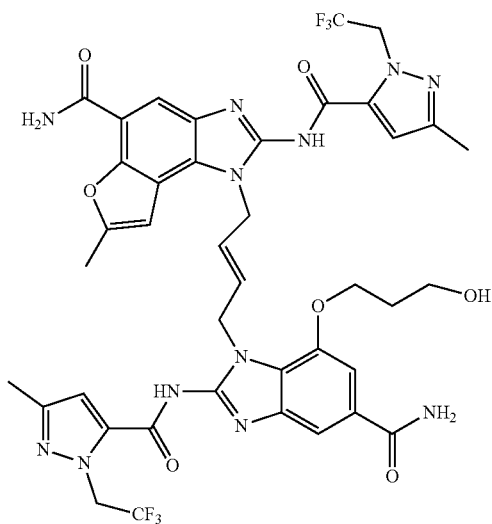

11

The operation procedures and reaction conditions were the same as those of Example 8, except that the raw material was 3-methyl-1-(2,2,2-trifluoroethyl)-1H-pyrazol-5-carbonylisothiocyanate, as a gray-white solid with a yield of 84%. ESI-MS (m/z): 911.3[M−H]$^-$; $^1$H NMR (400 MHz, DMSO) δ 12.85 (d, J=41.7 Hz, 2H), 8.02 (s, 1H), 7.89 (s, 1H), 7.79 (s, 1H), 7.65 (s, 1H), 7.53 (s, 1H), 7.34 (s, 1H), 7.23 (s, 1H), 6.75 (s, 1H), 6.61 (s, 1H), 6.55 (s, 1H), 5.85 (s, 2H), 5.63-5.46 (m, 4H), 4.99 (s, 2H), 4.89 (s, 2H), 4.58 (t, J=5.1 Hz, 1H), 3.85 (t, J=6.4 Hz, 2H), 3.51 (d, J=0.8 Hz, 2H), 2.26 (s, 3H), 2.17 (s, 3H), 2.12 (s, 3H), 1.58-1.48 (m, 2H).

Example 12

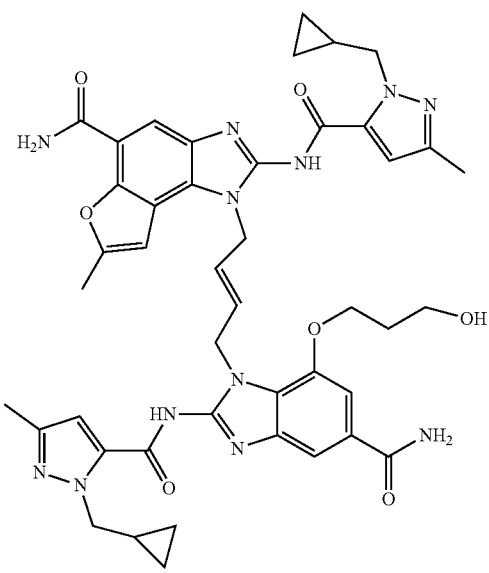

12

The operation procedures and reaction conditions were the same as those of Example 8, except that the raw material was 1-(cyclopropylmethyl)-3-methyl-1H-pyrazol-5-carbonyl isothiocyanate, as a gray-white solid with a yield of 82%. ESI-MS (m/z):855.4[M−H]$^-$; $^1$H NMR (400 MHz, DMSO) δ 12.83 (d, J=33.7 Hz, 2H), 8.01 (s, 1H), 7.90 (s, 1H), 7.79 (s, 1H), 7.65 (s, 1H), 7.51 (d, J=6.3 Hz, 1H), 7.33 (s, 1H), 7.24 (s, 1H), 6.64 (d, J=12.9 Hz, 2H), 6.49 (s, 1H), 5.85 (s, 2H), 5.00 (s, 2H), 4.89 (s, 2H), 4.52 (d, J=21.5 Hz, 1H), 4.44 (d, J=6.6 Hz, 2H), 4.38 (d, J=6.9 Hz, 2H), 3.86 (s, 4H), 2.29 (s, 3H), 2.15 (s, 3H), 2.11 (s, 3H), 1.59-1.47 (m, 2H), 1.30 (dd, J=12.2, 7.3 Hz, 2H), 0.39 (s, 4H), 0.31 (dd, J=9.6, 4.3 Hz, 4H).

Example 13

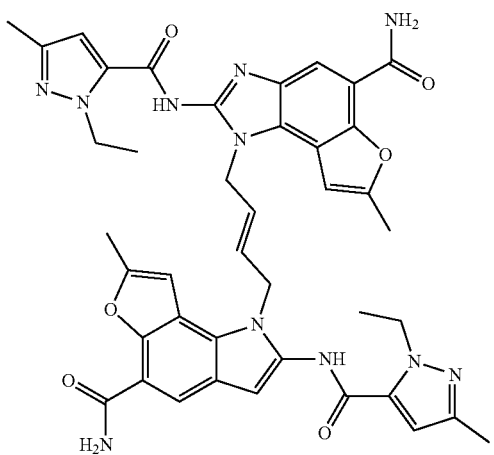

13

The operation procedures and reaction conditions were the same as those of Example 3, except that the raw material in step c was 4-chloro-2-methyl-5-nitrobenzofuran-7-formamide, as a gray-white solid with a yield of 61%. ESI-MS (m/z): 785.4[M+H]$^+$; $^1$H NMR (400 MHz, DMSO) δ 12.91 (s, 2H), 7.91 (s, 2H), 7.79 (s, 2H), 7.53 (s, 2H), 6.56 (d, J=3.3 Hz, 4H), 5.92 (s, 2H), 4.95 (s, 4H), 4.56 (d, J=7.0 Hz, 4H), 2.21 (s, 6H), 2.15 (s, 6H), 1.31 (t, J=7.0 Hz, 7H).

Example 14

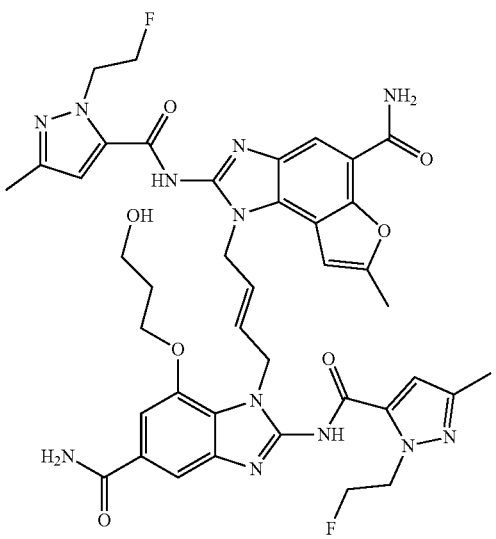

14

The operation procedure and reaction conditions were the same as those of Example 8, except that the raw material was 1-(2-fluoroethyl)-3-methyl-1H-pyrazol-5-carbonyl isothiocyanate, as a gray-white solid with a yield of 76%. ESI-MS (m/z):839.4[M−H]$^−$; $^1$H NMR (300 MHz, DMSO) δ 8.01 (s, 1H), 7.90 (s, 1H), 7.80 (s, 1H), 7.65 (s, 1H), 7.52 (s, 1H), 7.34 (s, 1H), 7.24 (s, 1H), 6.66 (d, J=4.7 Hz, 2H), 6.51 (s, 1H), 5.84 (s, 2H), 4.99 (s, 2H), 4.85 (dd, J=13.3, 9.0 Hz, 10H), 4.70-4.63 (m, 2H), 3.39-3.34 (m, 2H), 2.28 (s, 3H), 2.13 (d, J=12.2 Hz, 6H), 1.53 (s, 2H).

Example 15

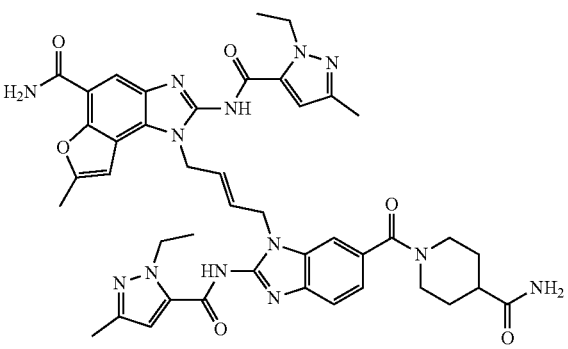

15

The operation procedures and reaction conditions were the same as those of Example 2, except that the raw material was 1-(4-chloro-3-nitrobenzoyl) piperidin-4-formamide, as a white solid with a yield of 78%. ESI-MS (m/z):842.5[M+H]$^+$; $^1$H NMR (400 MHz, DMSO-d$_6$) δ 12.76 (s, 2H), 7.88 (s, 1H), 7.79 (s, 1H), 7.52 (d, J=9.1 Hz, 2H), 7.42-7.32 (m, 2H), 7.09 (d, J=8.1 Hz, 1H), 6.84 (s, 1H), 6.75 (s, 1H), 6.61 (d, J=9.6 Hz, 1H), 6.48 (s, 1H), 6.04 (d, J=16.1 Hz, 1H), 5.80 (d, J=21.4 Hz, 1H), 5.01 (s, 2H), 4.88-4.73 (m, 2H), 4.62-4.43 (m, 4H), 2.90 (s, 4H), 2.38 (d, J=16.7 Hz, 3H), 2.14 (t, J=11.7 Hz, 6H), 1.91 (s, 1H), 1.73 (s, 2H), 1.56-1.42 (m, 2H), 1.23 (d, J=10.5 Hz, 6H).

Example 16

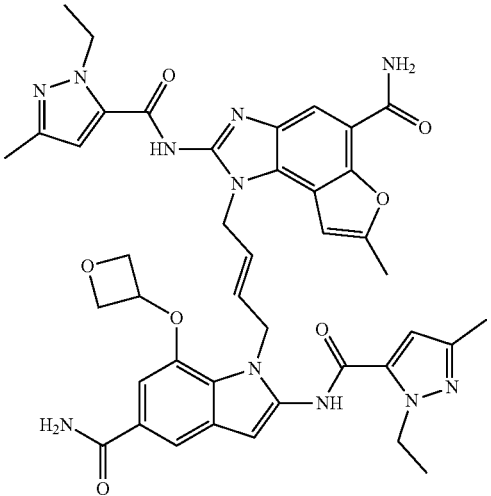

16

The operation procedures and reaction conditions were the same as those of Example 3, except that the raw material in step c was 4-chloro-3-nitro-5-(oxetan-3-yloxy)benzamide, as a gray-white solid with a yield of 69%. ESI-MS (m/z):803.5[M+H]$^+$: $^1$H NMR (400 MHz, DMSO-d$_6$) δ 12.88 (d, J=16.9 Hz, 2H), 8.06-7.85 (m, 2H), 7.80 (s, 1H), 7.69 (d, J=7.2 Hz, 1H), 7.54 (s, 1H), 7.38 (s, 1H), 6.82 (d, J=7.7 Hz, 1H), 6.73 (d, J=8.2 Hz, 1H), 6.59 (d, J=7.7 Hz, 1H), 6.48 (d, J=7.6 Hz, 1H), 5.90 (s, 2H), 5.00 (t, J=21.9 Hz, 4H), 4.77-4.63 (m, 2H), 4.53 (dq, J=14.6, 7.3 Hz, 4H), 4.44-4.31 (m, 2H), 3.08 (d, J=7.5 Hz, 1H), 2.30 (d, J=7.1 Hz, 3H), 2.24-2.06 (m, 6H), 1.31-1.24 (m, 6H).

Example 17

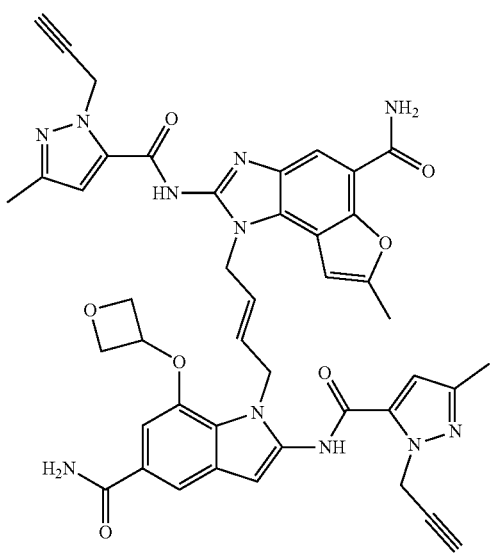

17

The operation procedures and reaction conditions were the same as those of Example 16, except that the raw material was 3-methyl-1-(prop-2-yn-1-yl)-1H-pyrazol-5-carbonyl isothiocyanate, as a light yellow solid with a yield of 82%. ESI-MS (m/z): 823.5[M+H]$^+$; $^1$H NMR (400 MHz, DMSO) δ 12.90 (s, 2H), 7.93 (d, J=17.4 Hz, 2H), 7.73 (d, J=29.6 Hz, 2H), 7.35 (s, 1H), 7.19 (s, 1H), 6.81 (s, 1H), 6.68 (s, 1H), 6.64 (s, 1H), 6.52 (s, 1H), 5.93 (s, 2H), 5.40 (d, J=20.5 Hz, 4H), 5.01 (d, J=14.1 Hz, 5H), 4.67 (s, 2H), 4.35 (s, 2H), 3.21 (s, 2H), 2.27 (s, 3H), 2.18-2.10 (m, 6H).

Example 18

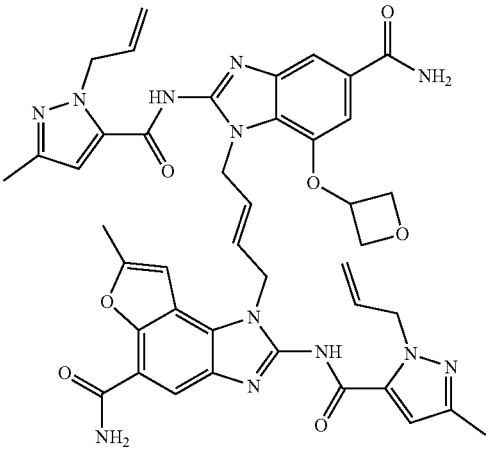

18

The operation procedure and reaction conditions were the same as those of Example 16, except that the raw material was 1-allyl-3-methyl-1H-pyrazol-5-carbonylisothiocyanate, as a light yellow solid with a yield of 78%. ESI-MS (m/z): 849.5[M+Na]*; $^1$H NMR (400 MHz, DMSO) δ 12.87 (d, J=16.5 Hz, 2H), 7.93 (d, J=19.0 Hz, 2H), 7.80 (s, 1H), 7.69 (s, 1H), 7.53 (s, 1H), 7.38 (s, 1H), 6.81 (s, 1H), 6.71 (s, 1H), 6.63 (s, 1H), 6.52 (s, 1H), 5.93 (d, J=20.1 Hz, 4H), 5.18 (d, J=18.0 Hz, 4H), 5.02 (d, J=15.5 Hz, 5H), 4.91 (dd, J=25.2, 14.8 Hz, 4H), 4.69 (s, 2H), 4.36 (s, 2H), 2.29 (s, 3H), 2.13 (d, J=9.7 Hz, 6H).

Example 19

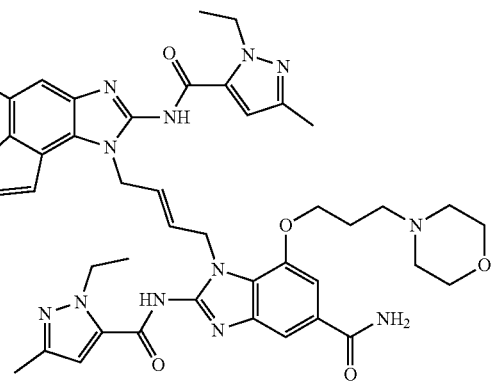

19

The operation procedures and reaction conditions were the same as those of Example 2, except that the raw material was 4-chloro-3-(3-morpholinopropoxy)-5-nitrobenzamide, as a white solid with a yield of 78%. ESI-MS (m/z): 874.3450[M+H]$^+$; $^1$H NMR (400 MHz, DMSO-d$_6$) δ 12.90 (d, J=29.2 Hz, 2H), 7.99 (s, 1H), 7.91 (s, 1H), 7.82 (s, 1H), 7.67 (s, 1H), 7.56 (s, 1H), 7.36 (s, 1H), 7.16 (s, 1H), 6.64 (s, 1H), 6.59 (d, J=9.7 Hz, 1H), 6.52 (s, 1H), 5.80 (d, J=22.4 Hz, 2H), 4.96 (d, J=13.1 Hz, 2H), 4.89 (s, 2H), 4.56 (p, J=7.8, 7.3 Hz, 4H), 3.71 (s, 4H), 3.61-3.49 (m, 2H), 3.07 (dt, J=13.3, 5.9 Hz, 4H), 2.26 (s, 2H), 2.15 (d, J=5.1 Hz, 9H), 1.31 (q, J=6.5 Hz, 8H).

Example 20

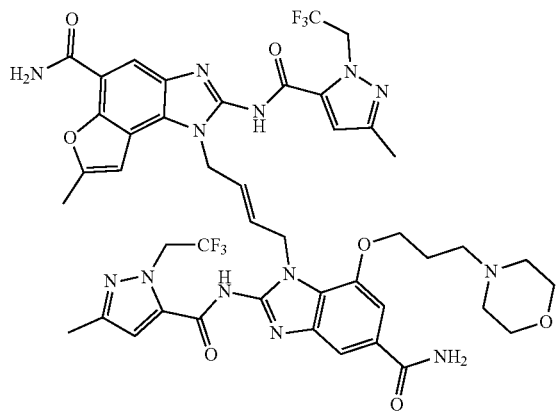

The operation procedures and reaction conditions were the same as those of Example 19, except that the raw material was 3-methyl-1-(2,2,2-trifluoroethyl)-1H-pyrazol-5-carbonylisothiocyanate, as a white solid with a yield of 78%. ESI-MS (m/z): 982.3543[M+H]$^+$; $^1$H NMR (400 MHz, DMSO-d$_6$) δ 12.93 (d, J=32.4 Hz, 2H), 8.00 (s, 1H), 7.91 (s, 1H), 7.84 (s, 1H), 7.69 (s, 1H), 7.58 (s, 1H), 7.39 (s, 1H), 7.21 (s, 1H), 6.83-6.72 (m, 1H), 6.62 (s, 2H), 5.99 (s, 2H), 5.65-5.51 (m, 4H), 5.00 (s, 2H), 4.91 (s, 2H), 4.12 (s, 2H), 3.75 (s, 4H), 3.12-3.06 (m, 4H), 2.39-1.92 (m, 11H), 1.77 (s, 2H).

Example 21

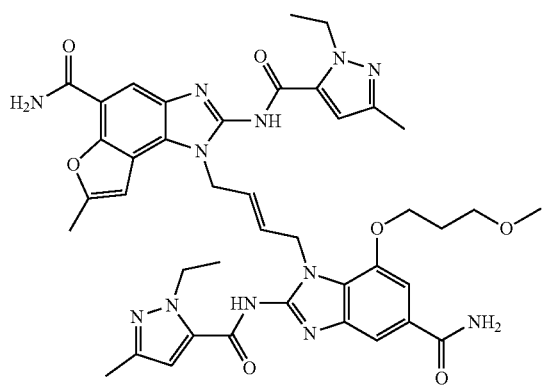

The operation procedures and reaction conditions were the same as those of Example 2, except that the raw material was 4-chloro-3-(3-methoxypropoxy)-5-nitrobenzamide, as a white solid with a yield of 78%. ESI-MS (m/z):819.5[M+H]$^+$; $^1$H NMR (400 MHz, DMSO-d$_6$) δ 12.87 (d, J=34.2 Hz, 2H), 8.00 (s, 1H), 7.90 (s, 1H), 7.81 (s, 1H), 7.65 (s, 1H), 7.55 (d, J=15.0 Hz, 1H), 7.35 (d, J=10.1 Hz, 2H), 6.68 (d, J=10.7 Hz, 1H), 6.58 (s, 1H), 6.47 (d, J=16.6 Hz, 1H), 5.83 (s, 2H), 4.91 (dd, J=43.4, 19.8 Hz, 4H), 4.54 (dq, J=14.8, 7.7, 7.0 Hz, 4H), 3.80 (d, J=6.7 Hz, 2H), 3.20 (d, J=6.4 Hz, 2H), 3.12 (s, 3H), 2.29 (s, 3H), 2.13 (d, J=8.0 Hz, 6H), 1.71-1.53 (m, 2H), 1.29 (q, J=9.7, 8.1 Hz, 6H).

Example 22

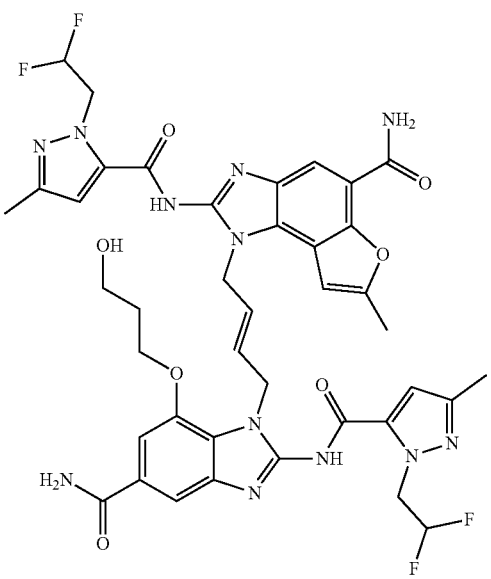

The operation procedures and reaction conditions were the same as those of Example 8, except that the raw material was 1-(2,2-difluoroethyl)-3-methyl-1H-pyrazol-5-carbonyl isothiocyanate, as a light yellow solid with a yield of 78%.

Example 23: Activation Effect of Compound on Type I Interferon Pathway (ISG) Produced by Human Peripheral Blood Mononuclear Cell Line PBMC Cells In this experiment, the function of STING agonist was evaluated by detecting the changes of type I interferon IFN β produced by compound stimulating human peripheral blood mononuclear cell line PBMC cells (AllCells, Cat #: PB005F). Before use, cryopreserved PBMCs were thawed in RPMI1640 medium and resuscitated overnight. The test compound was dissolved into DMSO and formulated as a mother liquor with a concentration of 10 mM. Before testing, the compound was diluted to 100 times of the working concentration (the working concentration was 30, 10, 3.33, 1.11, 0.370, 0.123, 0.0412, 0.0137 uM, respectively). PBMCs were collected and adjusted to a cell concentration of 5×10^5/ml. LPS was added to PBMCs at a final concentration of 10 ng/ml. In the 96-well cell culture plate, 200 ul PBMCs (1×10^5 cells per well) were added to each well. Then 2 ul diluted compound per well (duplicate wells, the final concentration of DMSO in each well was 1%) was added. Then a pipette was used to carefully mix the cells and the compound evenly. 2 ul DMSO (1% of final concentration) was added to the negative control. The cells were cultured overnight in an incubator at 37° C. The cell culture supernatant was collected to detect the concentration of type I interferon IFN β. The concentration of IFNβ was determined by ELISA kit of solid-phase antibody R&D-MAB8144-100 and detecting antibody R&D-MAB8143-100 (Biotinylated), converted into IP10 concentration according to standard curve, and EC$_{50}$ value was calculated by GraphPad 5.0 fitting calibration curve. The compound of the present invention can strongly stimulate human PBMCs cells to release IFN β, and the EC50 value was less than 10 μM. The experimental results were shown in Table 1.

TABLE 1

List of Results for Cell Experiment

| Example | EC$_{50}$(μM) |
|---|---|
| 1 | 0.3615 |
| 2 | 0.1033 |
| 3 | 0.004919 |

The experimental results show that the compound prepared by the present invention has an activation effect on STING and can be used to prepare a medicament for activating STING or medicament for diseases related to STING activity.

Example 24: Activation Effect of Compound on Type I Interferon Pathway (ISG) in Human THP1-Dual Cells In this experiment, the ability of compounds to activate STING was evaluated by detecting the ability of compounds to stimulate the production of IFN-β in human peripheral blood mononuclear cell line THP1-Dual cells. THP1-Dual cells in the experiment were purchased from InvivoGen company. The compound was dissolved with DMSO into 10 mM. Each well in the 96-well cell culture plate was added with 20 μL of compound diluted with DMSO/normal saline at a concentration of 100 μM and a positive control ADU-S100 at a concentration of 100 μM. The control group without drug was added with 20 μl of normal saline containing 1% DMSO. 3 duplicate wells were set for each. THP1-Dual cells were counted, cell concentration was adjusted to be 1×10$^6$/ml, and 180 μl of cells was added to each well for incubation. Therefore, the final volume of each test well was 200 μl, the content of DMSO was 0.1%, and the test concentration of the compound was 10 μM. The final concentration of positive control ADU-S100 was 10 μM, and incubated for 24 hours. In addition, the blank group was added with 200 μl of culture solution. After 24 hours, 20 μl of culture solution was took from each well to a new bottom transparent 96-well plate, and 50 μl luciferase detection reagent QUANTI-Luc™ was added, the fluorescence value was immediately determined. Compound 3 reported in (Nature 0.2018 December; 564(7736):439-443) and compound 1 reported in WO2019069275 were used as positive control compounds. The data were described by the ratio of the LUM of compound to the LUM of blank control. The experimental results were shown in Table 2.

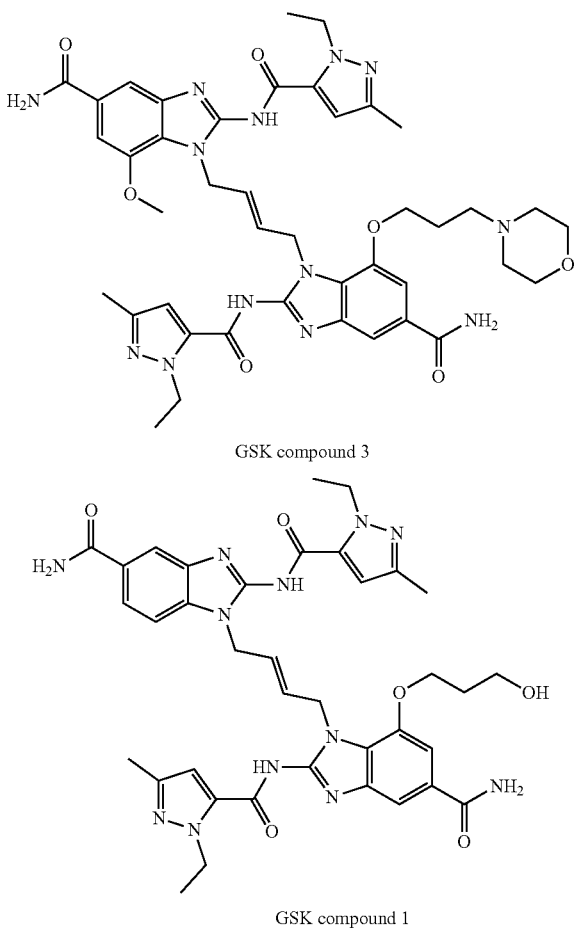

GSK compound 3

GSK compound 1

TABLE 2

List of Results for Cell Experiment

| Example | Fold change (Ratio to control) |
|---|---|
| 2 | 53.15 |
| 3 | 62.82 |
| 5 | 66.65 |
| 6 | 86.31 |
| 9 | 148.64 |
| 10 | 13.14 |
| 16 | 147.24 |
| 17 | 4.30 |
| 18 | 175.49 |
| 19 | 90.48 |
| 20 | 159.71 |
| ADU-S100 | 49.93 |
| GSK compound 3 | 70.83 |
| GSK compound 1 | 80.54 |

The experimental results show that the activation effect of the compound prepared by the present invention on STING is better or equivalent to that of the positive control (ADU-S100, GSK compound 3, or GSK compound 1), especially compounds 16, 18, and 20. Compared with the positive control ADU-S100, the activation effect of them on STING is 2-3 times or more than that of the positive control, and compared with GSK compound 3, the activation effect of them on STING is more than 2 times than that of the positive control. Therefore, the compound of the present invention can be used to prepare a medicament for activating STING or medicament for diseases related to STING activity.

Example 25: The Efficacy Study of the Compound of the Present Invention in the CT26 Colon Cancer Subcutaneous Transplantation Tumor Model 1. Experimental Method In this experiment, 4-6 weeks old Balb/C female mice were used, and CT26 cells ($2.5*10^5$) were injected subcutaneously into axils of each mouse. The tumor growth of mice was observed. Grouping was started when the tumor volume was 50-100 mm³. The compound 19 of the present invention and the negative control were administrated. The compound 19 of the present invention and the negative control were administrated on 1st, 4th and 7th days after grouping. The dosage of the compound 19 in each group was 0.1 mg/kg and 0.3 mg/kg respectively. The experimental results were evaluated in the form of tumor volume growth curves, and the experimental results were shown in FIG. 1.

2. Experimental Results

In the CT26 colon cancer tumor model of the Balb/C strain, the compound 19 of the present invention has a significant anti-tumor effect compared to the negative control.

Figure 2:
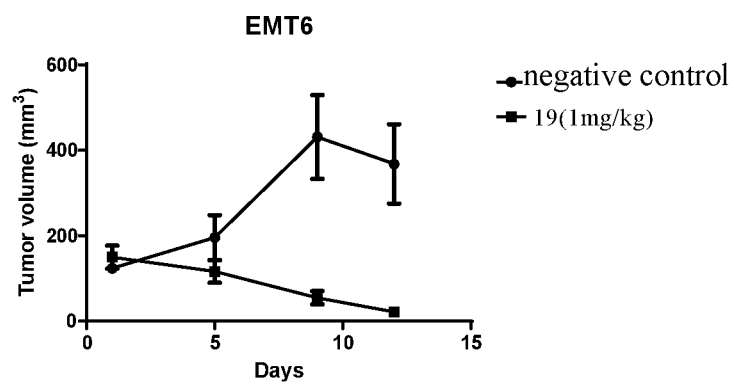
FIG. 2 shows the in vivo anti-tumor activity of compound 19 in an EMT6 breast cancer orthotopic transplanted tumor model.

Example 26: The Efficacy Study of the Compound of the Present Invention in the EMT6 Breast Cancer Orthotopic Transplantation Tumor Model 1. Experimental Method In this experiment, 4-6 weeks old Balb/C female mice were used, and EMT6 cells ($2.5*10^5$) were injected subcutaneously into axils of each mouse. The tumor growth of mice was observed. Grouping was started when the tumor volume was 50-100 mm³. The compound 19 of the present invention and the negative control were administrated on 1st, 4th and 9th days after grouping. The dosage of compound 19 of the present invention was 1 mg/kg. The experimental results were evaluated in the form of tumor volume growth curves, and the experimental results were shown in FIG. 2.

2. Experimental Results

In the EMT6 breast cancer orthotopic transplantation tumor model of the Balb/C strain, the compound 19 of the present invention has a significant anti-tumor effect compared to the negative control.

The invention claimed is:

1. A compound of Formula I:

Formula I or a pharmaceutically acceptable salt thereof, wherein:

$R^B$ is H, halogen, $C_1$-$C_6$ alkyl, $C(O)R^f$, $C(O)NR^fR^g$, $C(O)OR^f$, $NR^fR^g$, or $OR^f$, wherein the $C_1$-$C_6$ alkyl is optionally substituted by 1, 2, 3, or 4 independently selected $R^h$ substituents;

$R^1$ is H, halogen, CN, $C_1$-$C_6$ alkyl, $C_1$-$C_6$ haloalkyl, $C(O)NR^aR^b$, $C(O)OR^d$, $NR^dR^e$, $OR^d$, $SO_2NH_2$, or -$L_1$-$L_2$-$C(O)NR^aR^b$; or $R^B$ and $R^1$, together with the carbon atoms to which they are connected, cyclize to form a saturated or unsaturated 4- to 6-membered carbocyclic ring or saturated or unsaturated 4- to 6-membered heterocyclic ring, wherein the 4- to 6-membered carbocyclic ring or 4- to 6-membered heterocyclic ring is optionally substituted by 1, 2, 3, or 4 independently selected $R^x$ substituents;

$R^2$ is H, halogen, CN, $C_1$-$C_6$ alkyl, $C_1$-$C_6$ haloalkyl, $C(O)NR^aR^b$, $C(O)OR^d$, $NR^dR^e$, $OR^d$, $S(O)_2NH_2$, or -$L_1$-$L_2$-$C(O)NR^aR^b$;

$R^3$ is H, halogen, CN, $C_1$-$C_6$ alkyl, $C_1$-$C_6$ haloalkyl, $C(O)NR^aR^b$, $C(O)OR^d$, $NR^dR^e$, $OR^d$, $S(O)_2NH_2$, or -$L_1$-$L_2$-$C(O)NR^aR^b$;

$R^4$ is H, halogen, or $C_1$-$C_6$ alkyl;

ring B is $R^{5'}$ is H, $C_1$-$C_6$ alkyl, $C_1$-$C_6$ haloalkyl, —$(CH_2)_s$-$L_3$, $C_3$-$C_6$ alkenyl, $C_3$-$C_6$ alkynyl, or $C_3$-$C_6$ cycloalkyl;

$R^{6'}$ is H, halogen, $NO_2$, $C_1$-$C_6$ alkyl, or $C_1$-$C_6$ haloalkyl;

$R^{7'}$ is H, halogen, $NO_2$, $C_1$-$C_6$ alkyl, or $C_1$-$C_6$ haloalkyl; or $R^6$ and $R^{7'}$, together with the carbon atoms to which they are connected, cyclize to form a saturated or unsaturated 4- to 6-membered carbocyclic ring or saturated or unsaturated 4- to 6-membered heterocyclic ring, wherein the 4- to 6-membered carbocyclic ring or 4- to 6-membered heterocyclic ring is optionally substituted by 1, 2, 3, or 4 independently selected $R^t$ substituents;

$R^f$ is H, $C_1$-$C_6$ alkyl, $C_3$-$C_6$ cycloalkyl, or 3- to 6-membered heterocycloalkyl;

wherein the $C_1$-$C_6$ alkyl is optionally substituted by 1, 2, 3, or 4 independently selected $R^h$ substituents; and wherein the $C_3$-$C_6$ cycloalkyl or 3- to 6-membered heterocycloalkyl is optionally substituted by 1, 2, 3, or 4 independently selected $R^i$ substituents;

$R^g$ is H, $C_1$-$C_6$ alkyl, $C_3$-$C_6$ cycloalkyl, or 3- to 6-membered heterocycloalkyl;

wherein the $C_1$-$C_6$ alkyl is optionally substituted by 1, 2, 3, or 4 independently selected $R^h$ substituents; and wherein the $C_3$-$C_6$ cycloalkyl or 3- to 6-membered heterocycloalkyl is optionally substituted by 1, 2, 3, or 4 independently selected $R^i$ substituents;

each $R^h$ is independently halogen, $C(O)R^j$, $C(O)NR^jR^k$, $C(O)OR^k$, $NR^jR^k$, $NR^jC(O)R^k$, $OR^j$, $C_3$-$C_6$ cycloalkyl, or 3- to 6-membered heterocycloalkyl, wherein each $C_3$-$C_6$ cycloalkyl and 3- to 6-membered heterocycloalkyl is optionally and independently substituted by 1, 2, 3, or 4 independently selected $R^i$ substituents;

each $R^j$ is independently H or $C_1$-$C_6$ alkyl;

each $R^k$ is independently H or $C_1$-$C_6$ alkyl;

L is $C_4$-$C_6$ alkylene, $C_4$-$C_6$ alkenylene, or $C_4$-$C_6$ alkynylene;

wherein 1, 2, 3, or 4-$CH_2$-groups of the $C_4$-$C_6$ alkylene, $C_4$-$C_6$ alkenylene, or $C_4$-$C_6$ alkynylene is optionally replaced by 1, 2, 3, or 4 atoms or groups independently selected from the group consisting of —$NR^m$—, —O—, and —S—; and wherein the $C_4$-$C_6$ alkylene, $C_4$-$C_6$ alkenylene, or $C_4$-$C_6$ alkynylene is optionally substituted by 1, 2, 3, or 4 independently selected $R^n$ substituents;

each $R^m$ is independently H or $C_1$-$C_6$ alkyl;

each $R^n$ is independently halogen, $C_1$-$C_6$ alkyl, $C_1$-$C_6$ haloalkyl, $NH_2$, $NHC_1$-$C_6$ alkyl, OH, or $OC_1$-$C_6$ alkyl;

$R^{2'}$ is H, halogen, CN, $C_1$-$C_6$ alkyl, $C_1$-$C_6$ haloalkyl, $C(O)NR^aR^b$, $C(O)OR^d$, $NR^dR^e$, $OR^d$, $S(O)_2NH_2$, or -$L_1$-$L_2$-$C(O)NR^aR^b$;

$R^{3'}$ is H, halogen, CN, $C_1$-$C_6$ alkyl, $C_1$-$C_6$ haloalkyl, $C(O)NR^aR^b$, $C(O)OR^d$, $NR^dR^e$, $OR^d$, $S(O)_2NH_2$, or -$L_1$-$L_2$-$C(O)NR^aR^b$;

$R^{4'}$ is H, halogen, or $C_1$-$C_6$ alkyl;

ring A is

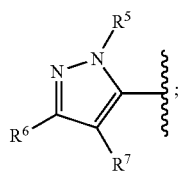

$R^5$ is H, $C_1$-$C_6$ alkyl, $C_1$-$C_6$ haloalkyl, —$(CH_2)_s$-$L_3$, $C_3$-$C_6$ alkenyl, $C_3$-$C_6$ alkynyl, or $C_3$-$C_6$ cycloalkyl;

$R^6$ is H, halogen, $NO_2$, $C_1$-$C_6$ alkyl, or $C_1$-$C_6$ haloalkyl;

$R^7$ is H, halogen, $NO_2$, $C_1$-$C_6$ alkyl, or $C_1$-$C_6$ haloalkyl; or $R^6$ and $R^7$, together with the carbon atoms to which they are connected, cyclize to form a saturated or unsaturated 4- to 6-membered carbocyclic ring or saturated or unsaturated 4- to 6-membered heterocyclic ring, wherein the 4- to 6-membered carbocyclic ring or 4- to 6-membered heterocyclic ring is optionally substituted by 1, 2, 3, or 4 independently selected $R^t$ substituents;

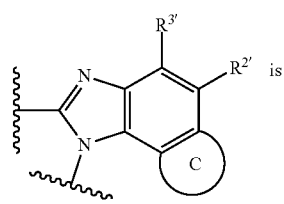

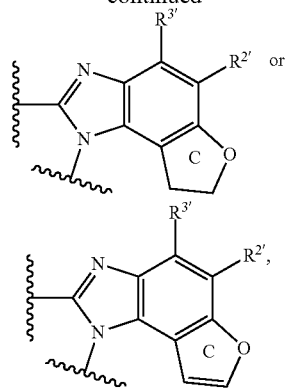

wherein ring C is optionally substituted by 1, 2, 3, or 4 independently selected $R^x$ substituents;

each s is independently 1, 2, or 3;

each $L_3$ is independently $C_3$-$C_6$ cycloalkyl or 3- to 6-membered heterocyclyl;

each $L_1$ is independently —$(CH_2)_t$—, —$C(O)$—, or —$S(O)_2$—;

each t is independently 0, 1, 2, or 3;

each $L_2$ is independently $C_1$-$C_6$ alkylene, $C_2$-$C_6$ alkenylene, $C_2$-$C_6$ alkynylene, $C_3$-$C_6$ cycloalkylene, or 3- to 6-membered heterocyclylene;

each $R^a$ is independently H or $C_1$-$C_6$ alkyl;

each $R^b$ is independently H or $C_1$-$C_6$ alkyl;

each $R^d$ is independently H or $C_1$-$C_6$ alkyl;

each $R^e$ is independently H or $C_1$-$C_6$ alkyl;

each $R^i$ is independently halogen, CN, $C_1$-$C_6$ alkyl, $C_1$-$C_6$ haloalkyl, $NH_2$, $NHC_1$-$C_6$ alkyl, OH, or $OC_1$-$C_6$ alkyl;

each $R^t$ is independently $C_1$-$C_6$ alkyl, $C_1$-$C_6$ haloalkyl, or $OC_1$-$C_6$ alkyl; and each $R^x$ is independently halogen, $C_1$-$C_6$ alkyl, $C_1$-$C_6$ haloalkyl, $NH_2$, or OH.

2. The compound of claim 1, or a pharmaceutically acceptable salt thereof, wherein:

$R^B$ is H or $OR^f$;

$R^f$ is H, $C_1$-$C_6$ alkyl, $C_3$-$C_6$ cycloalkyl, or 3- to 6-membered heterocycloalkyl;

wherein the $C_1$-$C_6$ alkyl is optionally substituted by 1, 2, 3, or 4 independently selected $R^h$ substituents; and wherein the $C_3$-$C_6$ cycloalkyl or 3- to 6-membered heterocycloalkyl is optionally substituted by 1, 2, 3, or 4 independently selected $R^i$ substituents;

each $R^h$ is independently halogen, $C(O)R^j$, $C(O)NR^jR^k$, $C(O)OR^k$, $NR^jR^k$, $NR^jC(O)R^k$, $OR^j$, $C_3$-$C_6$ cycloalkyl, or 3- to 6-membered heterocycloalkyl, wherein the $C_3$-$C_6$ cycloalkyl or 3- to 6-membered heterocycloalkyl is optionally substituted by 1, 2, 3, or 4 independently selected $R^i$ substituents;

each $R^j$ is independently H or $C_1$-$C_6$ alkyl;

each $R^k$ is independently H or $C_1$-$C_6$ alkyl; and each $R^i$ is independently halogen, $C_1$-$C_6$ alkyl, $NH_2$, or OH.

3. The compound of claim 1, or a pharmaceutically acceptable salt thereof, wherein $R^B$ is H, $CH_2CH_2CH_2$-morpholin-4-yl, $OCH_3$, $OCH_2CH_2CH_2OH$, $OCH_2CH_2CH_2OCH_3$, $OCH_2CH_2CH_2$-morpholin-4-yl, or O(oxetan-3-yl).

4. The compound of claim 1, or a pharmaceutically acceptable salt thereof, wherein:
ring B is

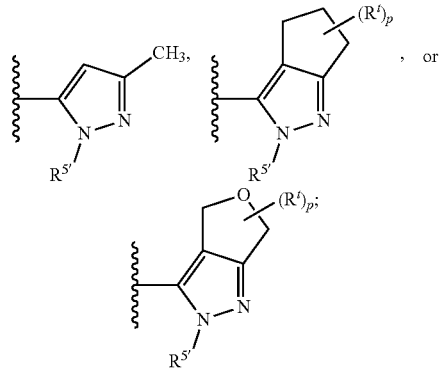

, or ring A is

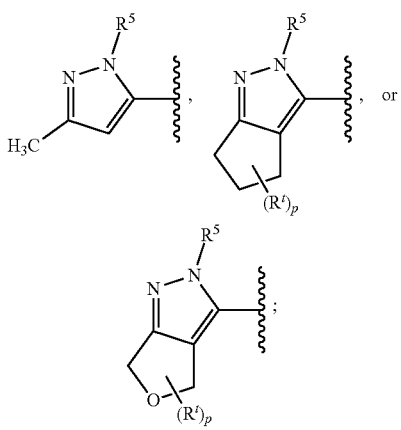

and
each p is independently 0, 1, 2, 3, or 4.

5. The compound of claim 1, or a pharmaceutically acceptable salt thereof, wherein:
ring B is

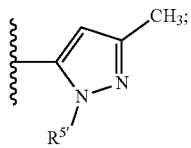

$R^{5'}$ is H, $C_1$-$C_6$ alkyl, $C_1$-$C_6$ haloalkyl, or $C_3$-$C_6$ alkenyl;
ring A is

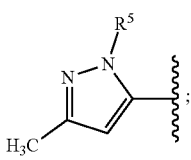

and
$R^5$ is H, $C_1$-$C_6$ alkyl, $C_1$-$C_6$ haloalkyl, or $C_3$-$C_6$ alkenyl.

6. The compound of claim 1, or a pharmaceutically acceptable salt thereof, wherein

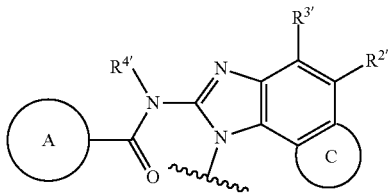

is:

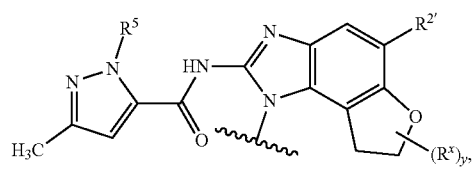

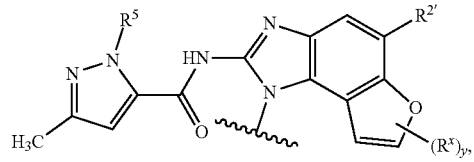

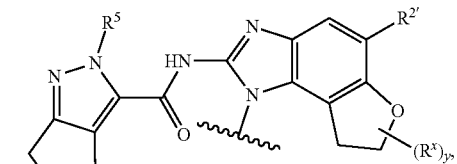

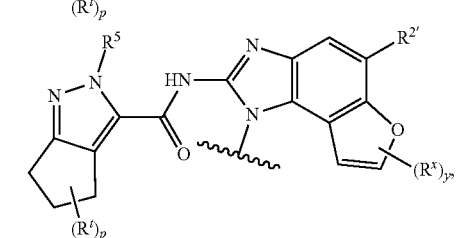

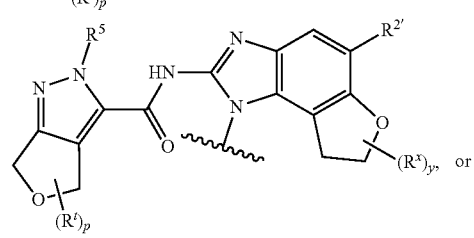

, or

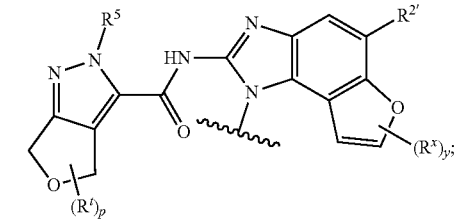

each $R^x$ is independently halogen, $C_1$-$C_6$ alkyl, $C_1$-$C_6$ haloalkyl, $NH_2$, or OH;

each $R^t$ is independently $C_1$-$C_6$ alkyl, $C_1$-$C_6$ haloalkyl, or $OC_1$-$C_6$ alkyl;

p is 0, 1, 2, 3, or 4; and y is 0, 1, 2, 3, or 4.

7. The compound of claim 1, or a pharmaceutically acceptable salt thereof, wherein

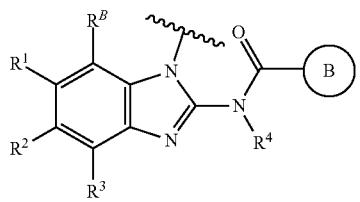

is:

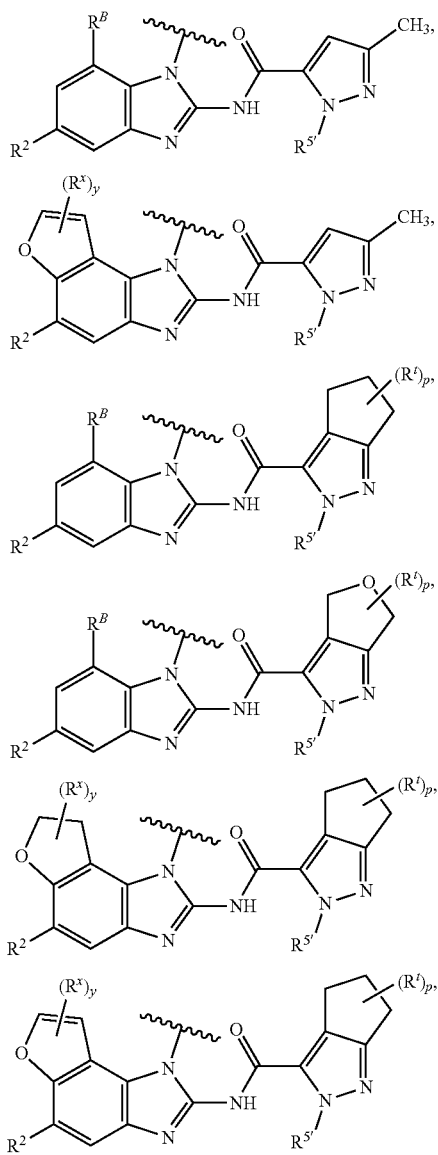

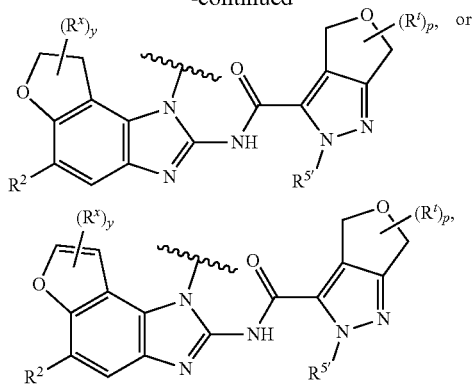

$R^B$ is H or $OR^f$;

$R^f$ is H, $C_1$-$C_6$ alkyl, $C_3$-$C_6$ cycloalkyl, or 3- to 6-membered heterocycloalkyl;
  wherein the $C_1$-$C_6$ alkyl is optionally substituted by 1, 2, 3, or 4 independently selected $R^h$ substituents; and
  wherein the $C_3$-$C_6$ cycloalkyl or 3- to 6-membered heterocycloalkyl is optionally substituted by 1, 2, 3, or 4 independently selected $R^i$ substituents;

each $R^h$ is independently halogen, $C(O)R^j$, $C(O)NR^jR^k$, $C(O)OR^k$, $NR^jR^k$, $NR^jC(O)R^k$, $OR^j$, $C_3$-$C_6$ cycloalkyl, or 3- to 6-membered heterocycloalkyl, wherein the $C_3$-$C_6$ cycloalkyl or 3- to 6-membered heterocycloalkyl is optionally substituted by 1, 2, 3, or 4 independently selected $R^i$ substituents;

each $R^i$ is independently halogen, $C_1$-$C_6$ alkyl, $NH_2$, or OH;

each $R^j$ is independently H or $C_1$-$C_6$ alkyl;

each $R^k$ is independently H or $C_1$-$C_6$ alkyl;

$R^2$ is H, $C(O)NR^aR^b$, or $S(O)_2NH_2$;

$R^a$ is H or $C_1$-$C_6$ alkyl;

$R^b$ is H or $C_1$-$C_6$ alkyl;

$R^{5'}$ is H, $C_1$-$C_6$ alkyl, $C_1$-$C_6$ haloalkyl, or $C_3$-$C_6$ alkenyl;

each $R^t$ is independently $C_1$-$C_6$ alkyl, $C_1$-$C_6$ haloalkyl, or $OC_1$-$C_6$ alkyl;

each $R^x$ is independently halogen, $C_1$-$C_6$ alkyl, $C_1$-$C_6$ haloalkyl, $NH_2$, or OH;

p is 0, 1, 2, 3, or 4; and y is 0, 1, 2, 3, or 4.

8. The compound of claim 1, or a pharmaceutically acceptable salt thereof, wherein:

$R^B$ is H, $C_1$-$C_6$ alkyl, or $OR^f$, wherein the $C_1$-$C_6$ alkyl is optionally substituted by 1, 2, 3, or 4 independently selected $R^h$ substituents;

$R^1$ is H, $C_1$-$C_6$ alkyl, or $OR^d$;

$R^2$ is H, $C(O)NR^aR^b$, or $S(O)_2NH_2$;

$R^3$ is H, $C_1$-$C_6$ alkyl, or $OR^d$;

$R^4$ is H;

ring B is

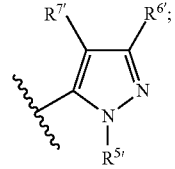

$R^{5'}$ is H, $C_1$-$C_6$ alkyl, $C_1$-$C_6$ haloalkyl, $C_3$-$C_6$ alkenyl, $C_3$-$C_6$ alkynyl, or $C_3$-$C_6$ cycloalkyl;

$R^{6'}$ is H or $C_1$-$C_6$ alkyl;
$R^{7'}$ is H or $C_1$-$C_6$ alkyl; or
$R^6$ and $R^{7'}$, together with the carbon atoms to which they are connected, cyclize to form a saturated or unsaturated 4- to 6-membered carbocyclic ring or saturated or unsaturated 4- to 6-membered heterocyclic ring;
$R^f$ is H, $C_1$-$C_6$ alkyl, $C_3$-$C_6$ cycloalkyl, or 3- to 6-membered heterocycloalkyl;
    wherein the $C_1$-$C_6$ alkyl is optionally substituted by 1, 2, 3, or 4 independently selected $R^h$ substituents; and
    wherein the $C_3$-$C_6$ cycloalkyl or 3- to 6-membered heterocycloalkyl is optionally substituted by 1, 2, 3, or 4 independently selected $R^i$ substituents;
each $R^h$ is independently halogen, $C(O)R^j$, $C(O)NR^jR^k$, $C(O)OR^k$, $NR^jR^k$, $NR^jC(O)R^k$, $OR^j$, $C_3$-$C_6$ cycloalkyl, or 3- to 6-membered heterocycloalkyl, wherein each $C_3$-$C_6$ cycloalkyl and 3- to 6-membered heterocycloalkyl is optionally and independently substituted by 1, 2, 3, or 4 independently selected $R^i$ substituents;
each $R^j$ is independently H or $C_1$-$C_6$ alkyl;
each $R^k$ is independently H or $C_1$-$C_6$ alkyl;
L is $C_4$-$C_6$ alkylene or $C_4$-$C_6$ alkenylene;
$R^{2'}$ is H, $C(O)NR^aR^b$, or $S(O)_2NH_2$;
$R^{3'}$ is H, $C_1$-$C_6$ alkyl, or $OR^d$;
$R^{4'}$ is H;
ring A is

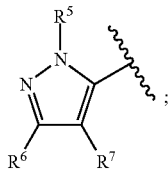
;

$R^5$ is H, $C_1$-$C_6$ alkyl, $C_1$-$C_6$ haloalkyl, $C_3$-$C_6$ alkenyl, $C_3$-$C_6$ alkynyl, or $C_3$-$C_6$ cycloalkyl;
$R^6$ is H or $C_1$-$C_6$ alkyl;
$R^7$ is H or $C_1$-$C_6$ alkyl; or
$R^6$ and $R^7$, together with the carbon atoms to which they are connected, cyclize to form a saturated or unsaturated 4- to 6-membered carbocyclic ring or saturated or unsaturated 4- to 6-membered heterocyclic ring;
each $R^a$ is independently H or $C_1$-$C_6$ alkyl;
each $R^b$ is independently H or $C_1$-$C_6$ alkyl;
each $R^d$ is independently H or $C_1$-$C_6$ alkyl; and
each $R^i$ is independently halogen, $C_1$-$C_6$ alkyl, $NH_2$, or OH.

9. The compound of claim 1, or a pharmaceutically acceptable salt thereof, wherein:
$R^B$ is H or $OR^f$;
$R^1$ is H or $C_1$-$C_6$ alkyl;
$R^2$ is H, $C(O)NH_2$, or $S(O)_2NH_2$;
$R^3$ is H or $C_1$-$C_6$ alkyl;
ring B is

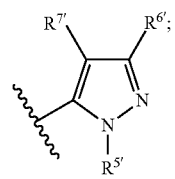
;

$R^{6'}$ is H or $C_1$-$C_6$ alkyl;
$R^{7'}$ is H or $C_1$-$C_6$ alkyl;
$R^f$ is H, $C_1$-$C_6$ alkyl, $C_3$-$C_6$ cycloalkyl, or 3- to 6-membered heterocycloalkyl;
    wherein the $C_1$-$C_6$ alkyl is optionally substituted by 1, 2, 3, or 4 independently selected $R^h$ substituents; and
    wherein the $C_3$-$C_6$ cycloalkyl or 3- to 6-membered heterocycloalkyl is optionally substituted by 1, 2, 3, or 4 independently selected $R^i$ substituents;
each $R^h$ is independently halogen, $C(O)R^j$, $C(O)NR^jR^k$, $C(O)OR^k$, $NR^jR^k$, $NR^jC(O)R^k$, $OR^j$, $C_3$-$C_6$ cycloalkyl, or 3- to 6-membered heterocycloalkyl, wherein each $C_3$-$C_6$ cycloalkyl and 3- to 6-membered heterocycloalkyl is optionally and independently substituted by 1, 2, 3, or 4 independently selected $R^i$ substituents;
each $R^j$ is independently H or $C_1$-$C_6$ alkyl;
each $R^k$ is independently H or $C_1$-$C_6$ alkyl;
$R^{2'}$ is H, $C(O)NH_2$, or $S(O)_2NH_2$;
$R^{3'}$ is H or $C_1$-$C_6$ alkyl;
ring A is

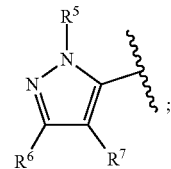
;

$R^6$ is H or $C_1$-$C_6$ alkyl;
$R^7$ is H or $C_1$-$C_6$ alkyl; and
each $R^i$ is independently halogen, $C_1$-$C_6$ alkyl, $NH_2$, or OH.

10. The compound of claim 1, wherein the compound is selected from the group consisting of:

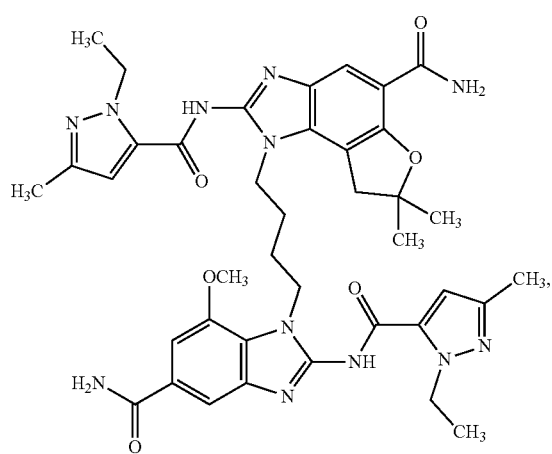

97
-continued
2
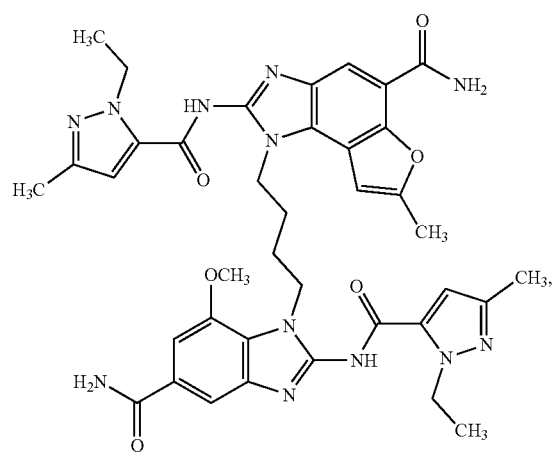
3
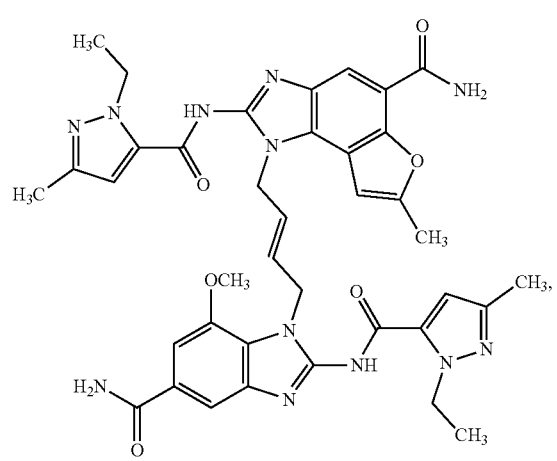
4
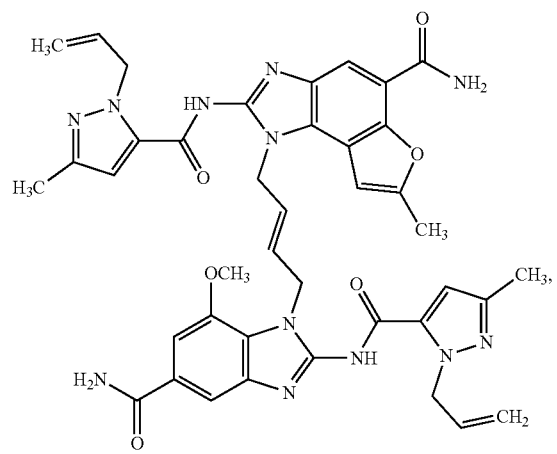
98
-continued
5
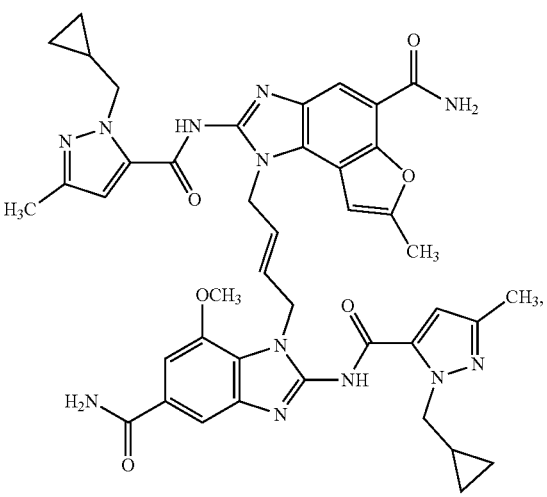
6
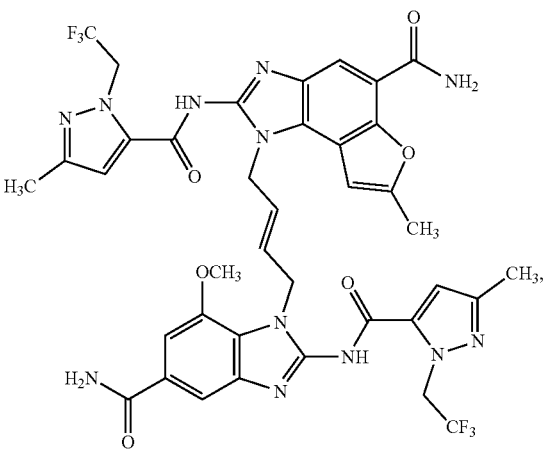
7
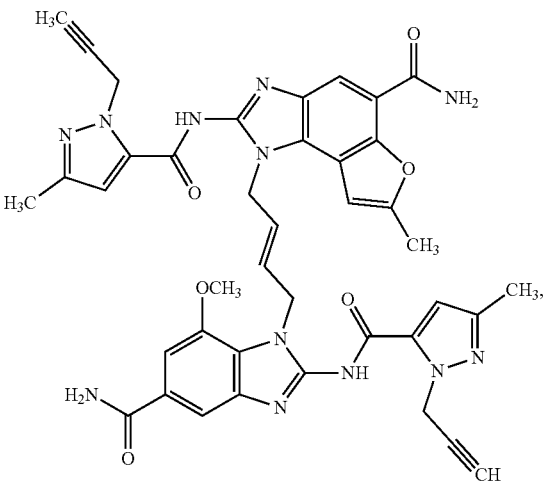

99
-continued
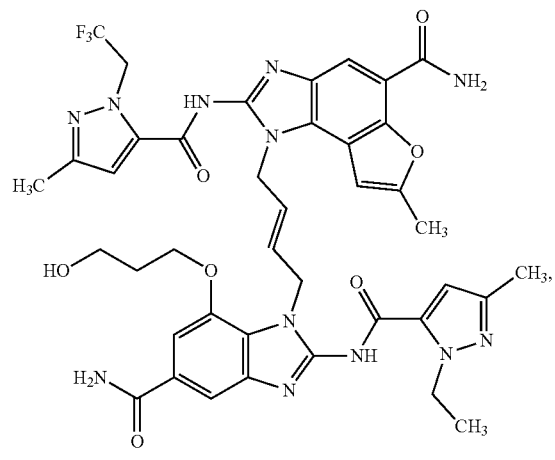
8
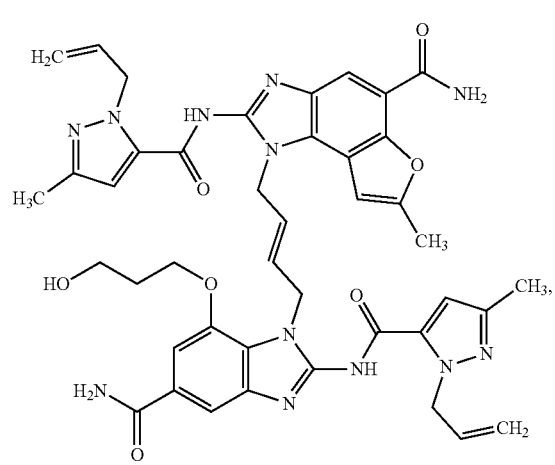
9
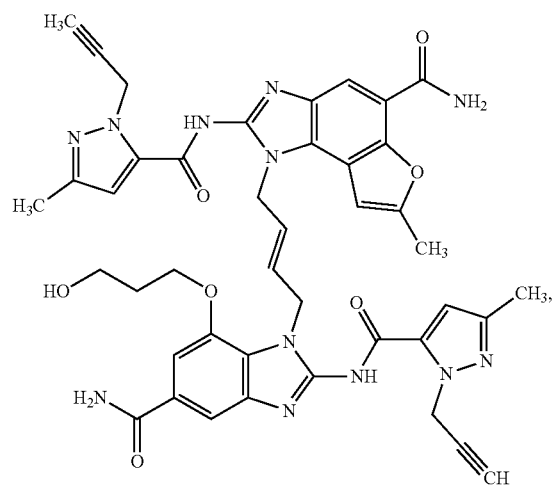
10
100
-continued
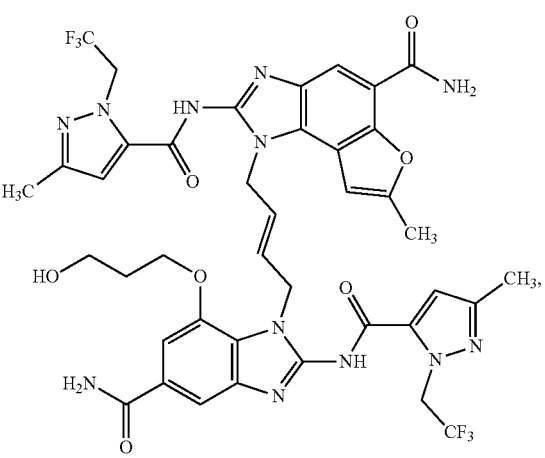
11
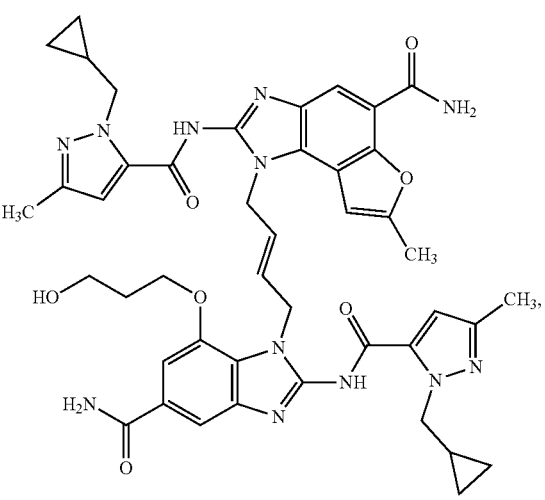
12
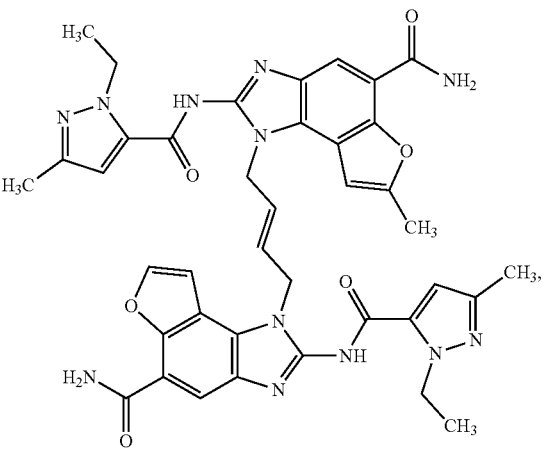
13

101
-continued
14
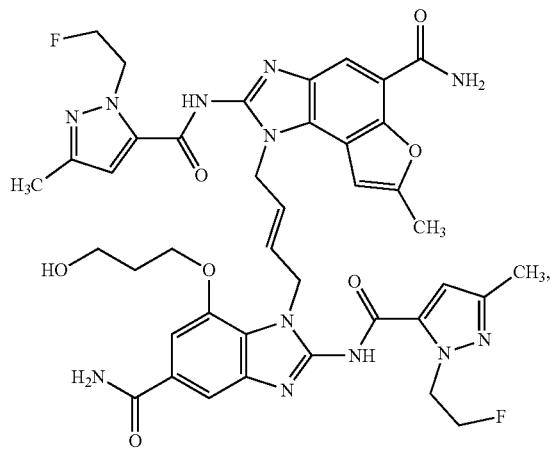
16
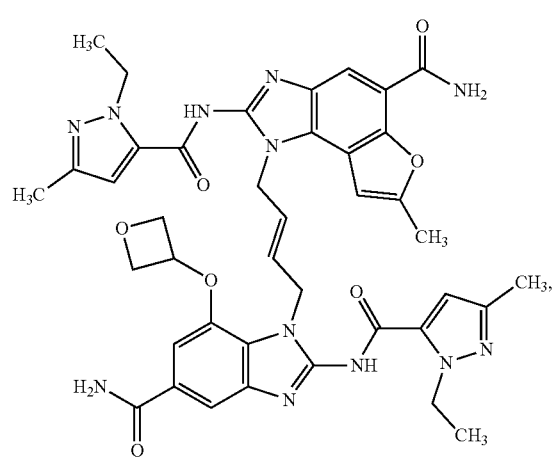
17
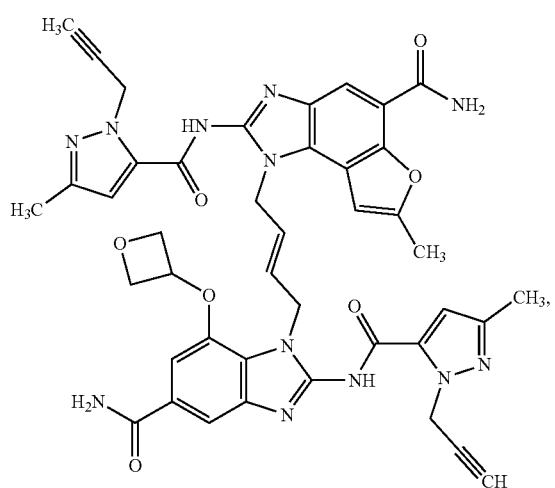
102
-continued
18
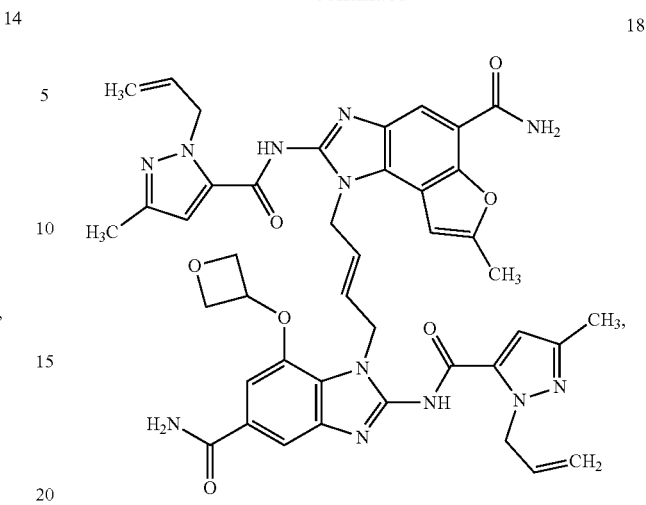
19
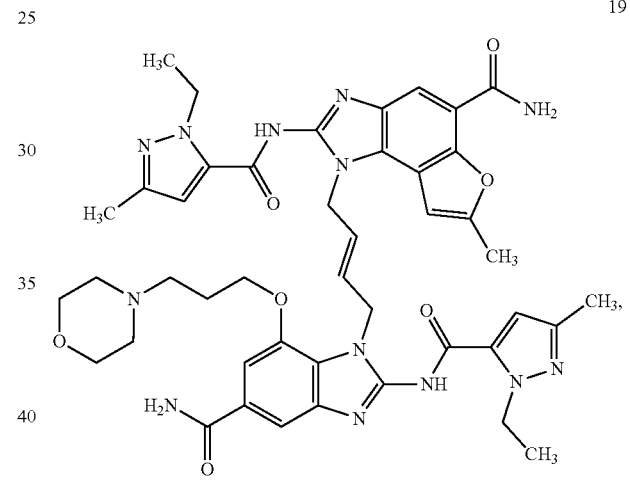
20
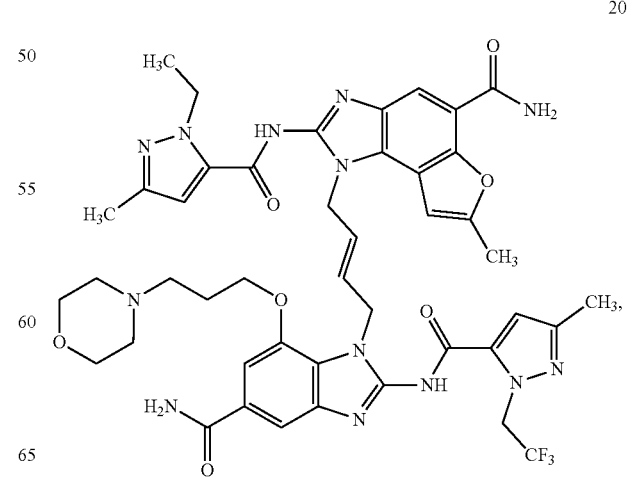

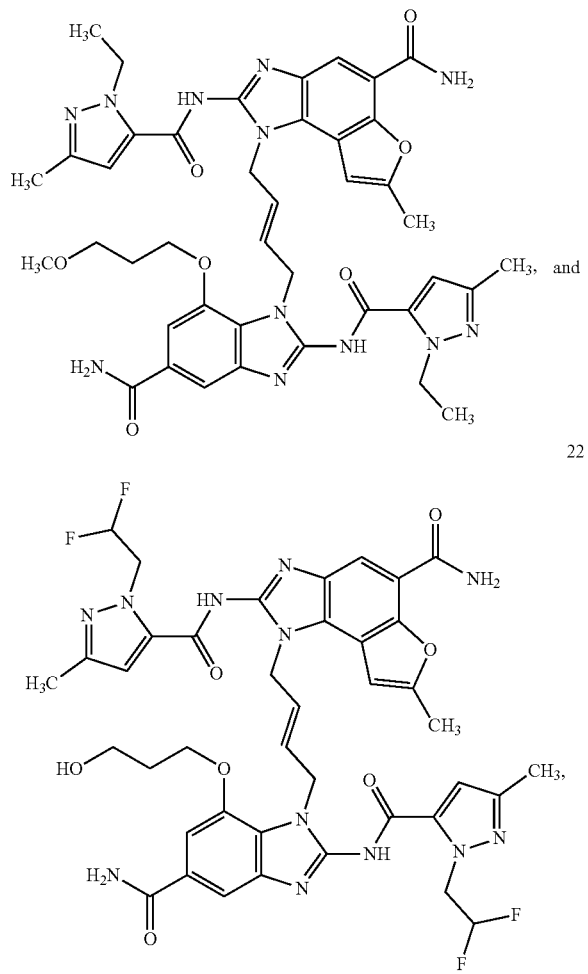

or a pharmaceutically acceptable salt thereof.

11. A pharmaceutical composition comprising a pharmaceutically acceptable carrier and a therapeutically effective amount of a compound of claim 1, or a pharmaceutically acceptable salt thereof.

12. A pharmaceutical composition comprising a pharmaceutically acceptable adjuvant and a therapeutically effective amount of a compound of claim 1, or a pharmaceutically acceptable salt thereof.

13. A method for activating the activity of stimulator of interferon gene (STING) in a somatic cell or somatic tissue, wherein the method comprises contacting the somatic cell or somatic tissue with a compound of claim 1, or a pharmaceutically acceptable salt thereof.

14. A method for modulating the activity of stimulator of interferon gene (STING) in a subject, wherein the method comprises administering to the subject in need thereof a therapeutically effective amount of a compound of claim 1, or a pharmaceutically acceptable salt thereof.

15. The method of claim 14, wherein the subject has at least one disease related to the activity of stimulator of interferon gene (STING) selected from the group consisting of an autoimmune disease, cancer, an infectious disease, a disease related to inflammation, and a precancerous syndrome, or a combination thereof.

16. A compound:

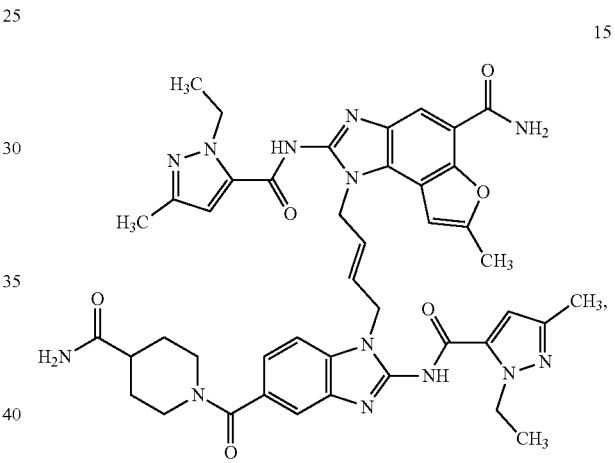

or a pharmaceutically acceptable salt thereof.

* * * * *